United States Patent
Nowinski et al.

(10) Patent No.: US 7,783,132 B2
(45) Date of Patent: Aug. 24, 2010

(54) METHOD AND APPARATUS FOR ATLAS-ASSISTED INTERPRETATION OF MAGNETIC RESONANCE DIFFUSION AND PERFUSION IMAGES

(75) Inventors: Wieslaw Lucjan Nowinski, Singapore (SG); Bhanu Prakash, Singapore (SG); Ihar Volkau, Singapore (SG); Anand Anthanasubramaniam, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 1145 days.

(21) Appl. No.: 11/415,679

(22) Filed: May 2, 2006

(65) Prior Publication Data

US 2007/0014453 A1      Jan. 18, 2007

Related U.S. Application Data

(60) Provisional application No. 60/676,888, filed on May 2, 2005.

(51) Int. Cl.
G06K 9/32 (2006.01)
G06K 9/00 (2006.01)
(52) U.S. Cl. ......................... 382/294; 382/128; 382/131
(58) Field of Classification Search ........................ None
See application file for complete search history.

(56) References Cited

U.S. PATENT DOCUMENTS

| | | | |
|---|---|---|---|
| 5,850,486 A * | 12/1998 | Maas et al. ................. | 382/294 |
| 6,608,631 B1 | 8/2003 | Milliron | |
| 6,740,883 B1 * | 5/2004 | Stodilka et al. ......... | 250/363.04 |
| 6,909,794 B2 * | 6/2005 | Caspi ......................... | 382/128 |
| 2002/0164061 A1 * | 11/2002 | Paik et al. ................... | 382/131 |
| 2006/0182321 A1 * | 8/2006 | Hu et al. ..................... | 382/128 |
| 2006/0239519 A1 * | 10/2006 | Nowinski et al. ........... | 382/128 |
| 2007/0076927 A1 * | 4/2007 | Nagaraja Rao et al. ...... | 382/128 |
| 2007/0276219 A1 * | 11/2007 | K.N. et al. .................. | 600/410 |
| 2007/0280518 A1 * | 12/2007 | Nowinski et al. ........... | 382/131 |

FOREIGN PATENT DOCUMENTS

| WO | WO 01/01346 | | 1/2001 |
|---|---|---|---|
| WO | WO 02/43003 | * | 5/2002 |

OTHER PUBLICATIONS

Arad, N. et al, "Image Warping by Radial Basis Functions: Application to Facial Expressions" CVGIP: Graphical Models and Image Processing, vol. 56, No. 2, Mar. 1994, pp. 161-172.

(Continued)

*Primary Examiner*—Yubin Hung
*Assistant Examiner*—Avinash Yentrapati
(74) *Attorney, Agent, or Firm*—Calfee, Halter & Griswold LLP

(57) ABSTRACT

The present invention discloses a method for registering a measured MRI volume image with appropriate anatomical and blood supply territory Atlases to enable Atlas information to be mapped onto the measured MRI volume image. The disclosed arrangements provide an efficient method for mapping brain Atlas information (including gross anatomy and blood supply territories) into magnetic resonance perfusion and diffusion images.

8 Claims, 21 Drawing Sheets

OTHER PUBLICATIONS

Bookstein, FL et al., "Principal Warps: Thin-Plate Splines and the Decomposition of Deformations", IEEE Transactions on Pattern Analysis and Mechine Intelligence, vol. 11, No. 6, Jun. 1989, pp. 567-585.

Bookstein, FL et al "Landmark methods for forms without landmarks: morphometrics of group differences in outline shape" Medical Image Analysis, vol. 1, No. 3, pp. 225-243, Jul. 1996.

Chan, KH et al., "Contour-Based Warping", Graphical Models and Image Processing, 60, pp. 331-348, 1998, Article No. IP980476.

Chui, H et al., "A New Algorithm for Non-Rigid Point Matching", Computer Vision and Patent Recognition, 2000, Proceedings IEEE, pp. 1-7.

Frederick, C. et al., "Confirmal Image Warping", IEEE Computer Graphics and Applications, Mar. 1990, pp. 54-61.

Kanai, T. et al., "Three-dimensional geometric metamorphosis based on harmonic maps", The Visual Computer, 14, pp. 166-176, 1998.

Rohr, K et al, "Spline-based elastic image registration: integration of landmark errors and orientation attributes" Computer Vision and Image Understanding, 90, 153-168, 2003.

Wolberg, G., "Image morphing: a survey", The Visual Computer, 14, 360-372, 1998.

* cited by examiner

1000'
volume image set
(2 of 2)

US 7,783,132 B2

METHOD AND APPARATUS FOR ATLAS-ASSISTED INTERPRETATION OF MAGNETIC RESONANCE DIFFUSION AND PERFUSION IMAGES

CROSS-REFERENCE TO RELATED APPLICATIONS

This application claims priority to U.S. Provisional Patent Application Ser. No. 60/676,888 filed on May 2, 2005, for METHOD AND APPARATUS FOR ATLAS-ASSISTED INTERPRETATION OF MAGNETIC RESONANCE DIFFUSION AND PERFUSION IMAGES, the entire disclosure of which is fully incorporated herein by reference.

FIELD OF THE INVENTION

The present invention relates to interpretation of magnetic resonance diffusion and perfusion images.

BACKGROUND

Stroke is a major killer and a cause of severe neurological deficits and disability. Due to the narrow time window available to manage the stroke patient, the processing of stroke images must be done very rapidly. Magnetic resonance diffusion and perfusion imaging (also referred to as Magnetic Resonance Imaging or MRI) plays a key role in the assessment of infarcted tissues, and those at risk.

Diffusion imaging is an imaging technique where image contrast is related to the diffusion coefficient of the molecules being imaged. Perfusion imaging maps distribution of blood in the tissue.

Magnetic resonance diffusion and perfusion images have usually low resolution, high noise, and substantial intensity inhomogeneity. Moreover, some parts of the brain region may be missing due to susceptibility artifacts. Therefore, it is difficult to arrive at a reliable diagnosis based purely on image processing and analysis techniques. More importantly, the underlying anatomy and blood supply territories are not available for perfusion and diffusion images.

SUMMARY

It is an object of the present invention to substantially overcome, or at least ameliorate, one or more disadvantages of existing arrangements.

Disclosed are arrangements, referred to in this specification as Atlas-assisted MRI methods, which seek to address the above problems by registering the volume image measured from the patient with appropriate anatomical and blood supply territory atlases and then mapping the atlas data onto the volume image. The "volume image" refers to the set of slice images generated by performing an MRI scan of a patient. The disclosed arrangements thus provide a fast automatic method for mapping brain atlases (containing gross anatomy and blood supply territories, among other information) into magnetic resonance perfusion and diffusion images.

According to a first aspect of the present invention, there is provided a method of processing a volume image comprising a plurality of slices, said method comprising the steps of:
establishing the midsagittal plane of the volume image;
defining a sub-volume for Atlas mapping;
identifying the most superior plane and the most inferior plane of the sub-volume;
determining for each slice the shape of the corresponding sub-volume profile in the plane of the slice; and
registering, for each slice, the determined shape of the corresponding sub-volume profile to a slice in the Atlas.

According to another aspect of the present invention, there is provided an apparatus for processing a volume image comprising a plurality of slices, said apparatus comprising:
means for establishing the midsagittal plane of the volume image;
means for defining a sub-volume for Atlas mapping;
means for identifying the most superior plane and the most inferior plane of the sub-volume;
means for determining for each slice the shape of the corresponding sub-volume profile in the plane of the slice; and
means for registering, for each slice, the determined shape of the corresponding sub-volume profile to a slice in the Atlas.

According to another aspect of the present invention, there is provided a computer program product including a computer readable medium having recorded thereon a computer program for directing a processor to execute a method for processing an image, said program comprising:
code for establishing the midsagittal plane of the volume image;
code for defining a sub-volume for Atlas mapping;
code for identifying the most superior plane and the most inferior plane of the sub-volume;
code for determining for each slice the shape of the corresponding sub-volume profile in the plane of the slice; and
code for registering, for each slice, the determined shape of the corresponding sub-volume profile to a slice in the Atlas.

Other aspects of the invention are also disclosed.

BRIEF DESCRIPTION OF THE DRAWINGS

One or more embodiments of the present invention will now be described with reference to the drawings and Appendices, in which.

Figure 1A:
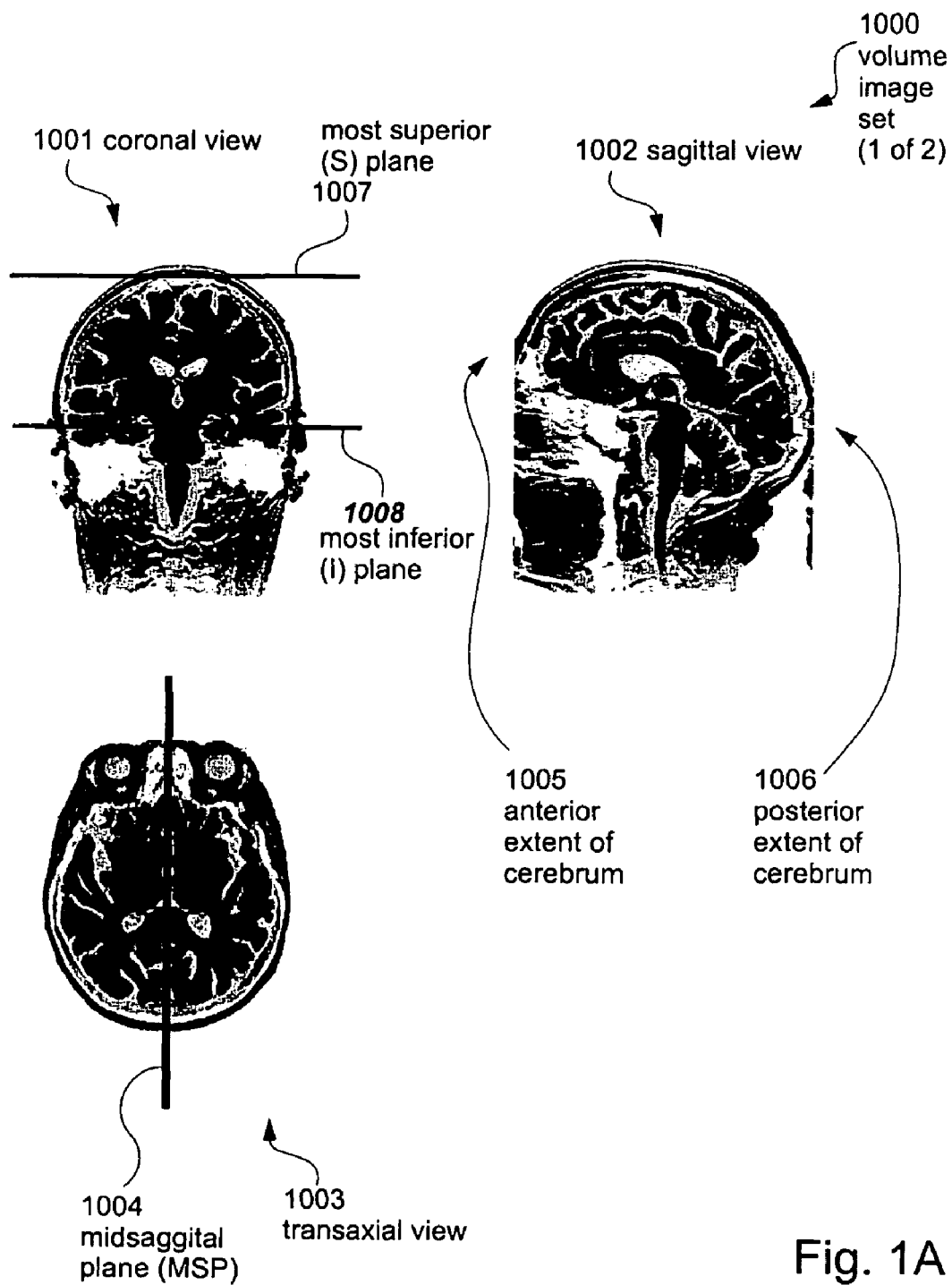
FIGS. 1A and 1B constitute a pictorial glossary of terms used in the specification.

Appendix A contains relevant material from Bhanu Prakash K N, Volkau I, Nowinski W L, Extraction of mid-sagittal plane from MR brain volume—Entropy and energy based approaches. U.S. 60/558,567;

Appendix B contains relevant material from Fitzgibbon A., Pilu M., Fisher R. *Direct least-square fitting of Ellipses*, IEEE Transactions on Pattern Analysis and Machine Intelligence, 21(5), 476-480, May 1999; and Appendix C contains relevant material from Ivanov N, A S Parimal, Nowinski W L, Method and program for non-linear image warping based on specific class of radial functions. PCT/SG2005/000420.

DETAILED DESCRIPTION INCLUDING BEST MODE

It is to be noted that the discussions contained in the "Background" section and that above relating to prior art arrangements relate to discussions of documents or devices which form public knowledge through their respective publication and/or use. The noted discussion should not be interpreted as a representation by the present inventor(s) or patent applicant that such documents or devices in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

The following documents are referred to in this description, and are incorporated by reference herein in their entirety as if fully set forth herein: (a) Bhanu Prakash K N, Volkau I, Nowinski W L, Extraction of mid-sagittal plane from MR brain volume—Entropy and energy based approaches. U.S. Patent Application No. 60/558,567 (b) Fitzgibbon A., Pilu M., Fisher R. *Direct least-square fitting of Ellipses*, IEEE Transactions on Pattern Analysis and Machine Intelligence, 21(5), 476-480, May 1999; and (c) Ivanov N, A S Parimal, Nowinski W L, Method and program for non-linear image warping based on specific class of radial functions. PCT/SG2005/000420

Figure 1B:

FIG. 1A is used as a basis for presenting a partial pictorial glossary 1000 of terms used in the specification. FIG. 1A shows three views of a subject skull, namely a coronal view 1001, a sagittal view 1002, and a transaxial view 1003. FIG. 1A represents a volume image set 1000 comprising three images 1001, 1002 and 1003 (which are also referred to as slices, or slice images). The coronal view 1001 has, nominally superimposed thereon, a most superior plane (S plane) 1007, and a most inferior plane (I plane) 1008. The position of the S plane establishes the most superior extent of the brain segment of interest (the cerebrum in this specification), and the I plane establishes the most inferior extent of the brain segment of interest. The sagittal view 1002 is used to establish the ventral extent 1005, and the dorsal extent 1006 of the brain segment of interest. The transaxial view 1003 shows the mid-sagittal plane 1004 (MSP), which is the vertical plane that divides the brain into two roughly symmetrical halves. The intercommissural plane is a transaxial plane, which also contains the AC and the PC. FIG. 1B depicts the new trans-axial AC-PC plane.

Some portions of the description that follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical and informational quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "scanning", "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present invention also implicitly discloses a computer program, in that it would be apparent to the person skilled in the art that the individual steps of the preferred method described herein are to be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing the spirit or scope of the invention. Furthermore one or more of the steps of the computer program may be performed in parallel rather than sequentially.

Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

Figure 2:
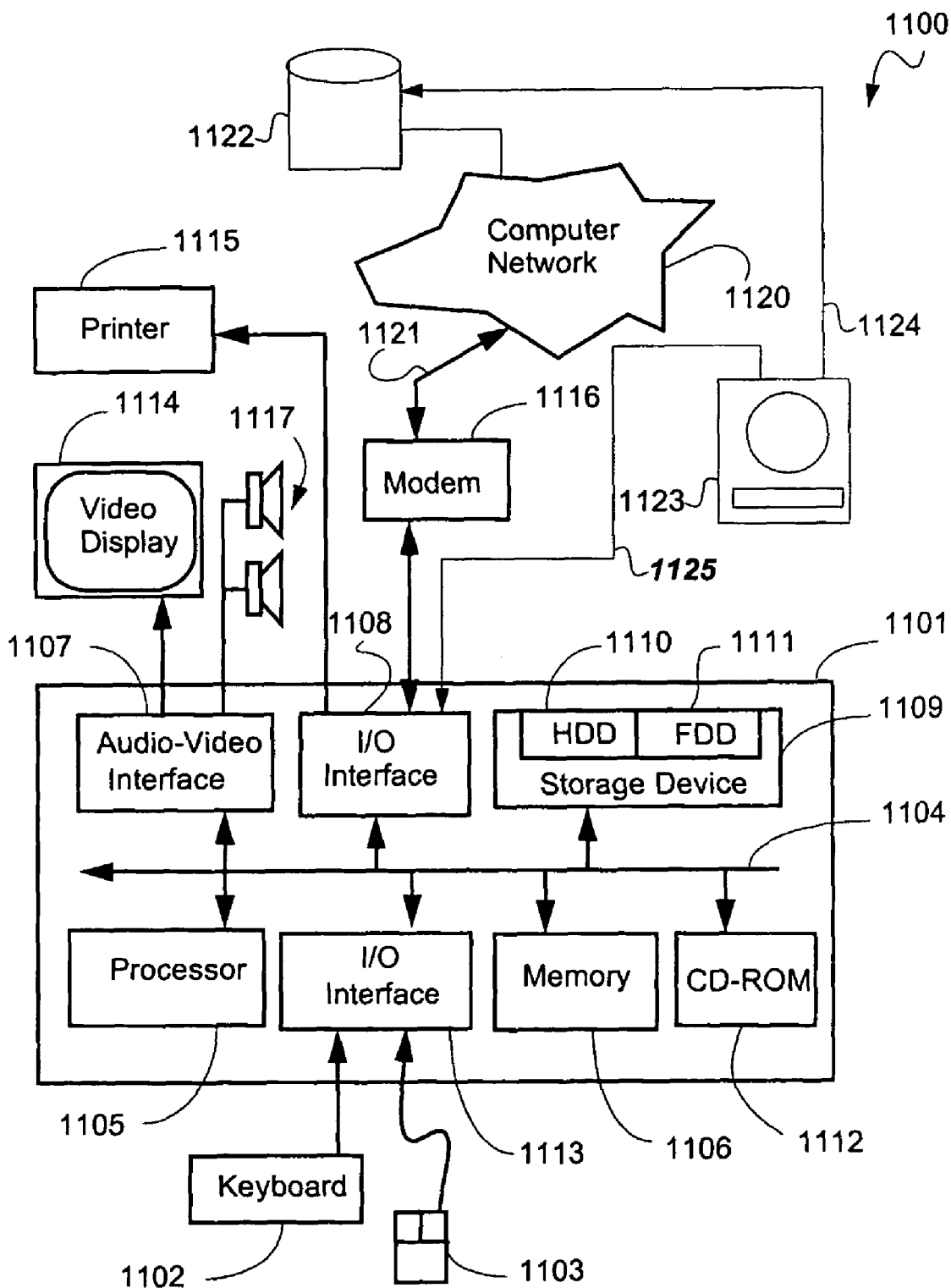
FIG. 2 is a functional block diagram of a general-purpose computer system upon which the described Atlas-assisted MRI methods can be practiced.

FIG. 2 is a functional block diagram of a general-purpose computer system upon which the described Atlas-assisted MRI methods can be practiced. In the example system shown in FIG. 2, an MRI system 1123 sends data either to a database 1122, or directly to a suitable interface 1108 of a computer module 1101. Typically, DICOM (Digital Imaging and Communications in Medicine) is the communication protocol used for the transfer of images between medical imaging systems. The protocol can be used to send a stream of bytes over a network 1120 in the form of messages, which usually include images. DICOM can be used to transport DICOM message groups directly to the computer system 1101 as depicted by an arrow 1125. DICOM can also be used to store DICOM message groups to the database 1122 in a file format, as depicted by an arrow 1124.

The Atlas-assisted MRI processes described in relation to FIG. 3 below may be implemented as software, such as an Atlas-assisted MRI application program executing within the computer system(s) 1100. In particular, the steps of the Atlas-assisted MRI methods are effected by instructions in the software that are carried out by the computer(s).

The instructions may be formed as one or more code modules, each for performing one or more particular tasks. The software may also be divided into two separate parts, in which a first part performs the disclosed Atlas-assisted MRI methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for performing the Atlas-assisted MRI methods.

The computer system 1100 is formed by a computer module 1101, input devices such as a keyboard 1102 and mouse 1103, output devices including a printer 1115, a display device 1114 and loudspeakers 1117. In regard to "dial-up" communications, a Modulator-Demodulator (Modem) transceiver device 1116 can be used by the computer module 1101 for communicating to and from a communications network 1120, for example connectable via a telephone line 1121 or other functional medium. The modem 1116 can be used to obtain access to the Internet, and other network systems, such as a Local Area Network (LAN) or a Wide Area Network (WAN), and may be incorporated into the computer module 1101 in some implementations. Alternately, broadband communication techniques can be used, in which event the modem 1116 and associated modules are replaced by a broadband cable modem or a DSL modem or the like.

The computer module 1101 typically includes at least one processor unit 1105, and a memory unit 1106, for example formed from semiconductor random access memory (RAM) and read only memory (ROM). The module 1101 also includes an number of input/output (I/O) interfaces including an audio-video interface 1107 that couples to the video display 1114 and loudspeakers 1117, an I/O interface 1113 for the keyboard 1102 and mouse 1103 and optionally a joystick (not illustrated), and an interface 1108 for the modem 1116 and printer 1115. In some implementations, the modem 1116 may be incorporated within the computer module 1101, for example within the interface 1108. A storage device 1109 is provided and typically includes a hard disk drive 1110 and a floppy disk drive 1111. A magnetic tape drive (not illustrated) may also be used. A CD-ROM drive 1112 is typically provided as a non-volatile source of data. The components 1105 to 1113 of the computer module 1101, typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations or alike computer systems evolved therefrom.

Typically, the application program is resident on the hard disk drive 1110 and read and controlled in its execution by the processor 1105. Intermediate storage of the program and any data fetched from the network 1120 may be accomplished using the semiconductor memory 1106, possibly in concert with the hard disk drive 1110. In some instances, the application program may be supplied to the user encoded on a CD-ROM or floppy disk and read via the corresponding drive 1112 or 1111, or alternatively may be read by the user from the network 1120 via the modem device 1116. Still further, the software can also be loaded into the computer system 1100 from other computer readable media. The term "computer readable medium" as used herein refers to any storage or transmission medium that participates in providing instructions and/or data to the computer system 1100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1101. Examples of transmission media include radio or infra-red transmission channels as well as a network connection to another computer or networked device, and the Internet or Intranets including e-mail transmissions and information recorded on Websites and the like.

The disclosed Atlas-assisted MRI methods may alternatively be implemented in dedicated hardware such as one or more integrated circuits performing the functions or sub functions of the disclosed Atlas-assisted MRI methods. Such dedicated hardware may include graphic processors, digital signal processors, or one or more microprocessors and associated memories.

Figure 3:
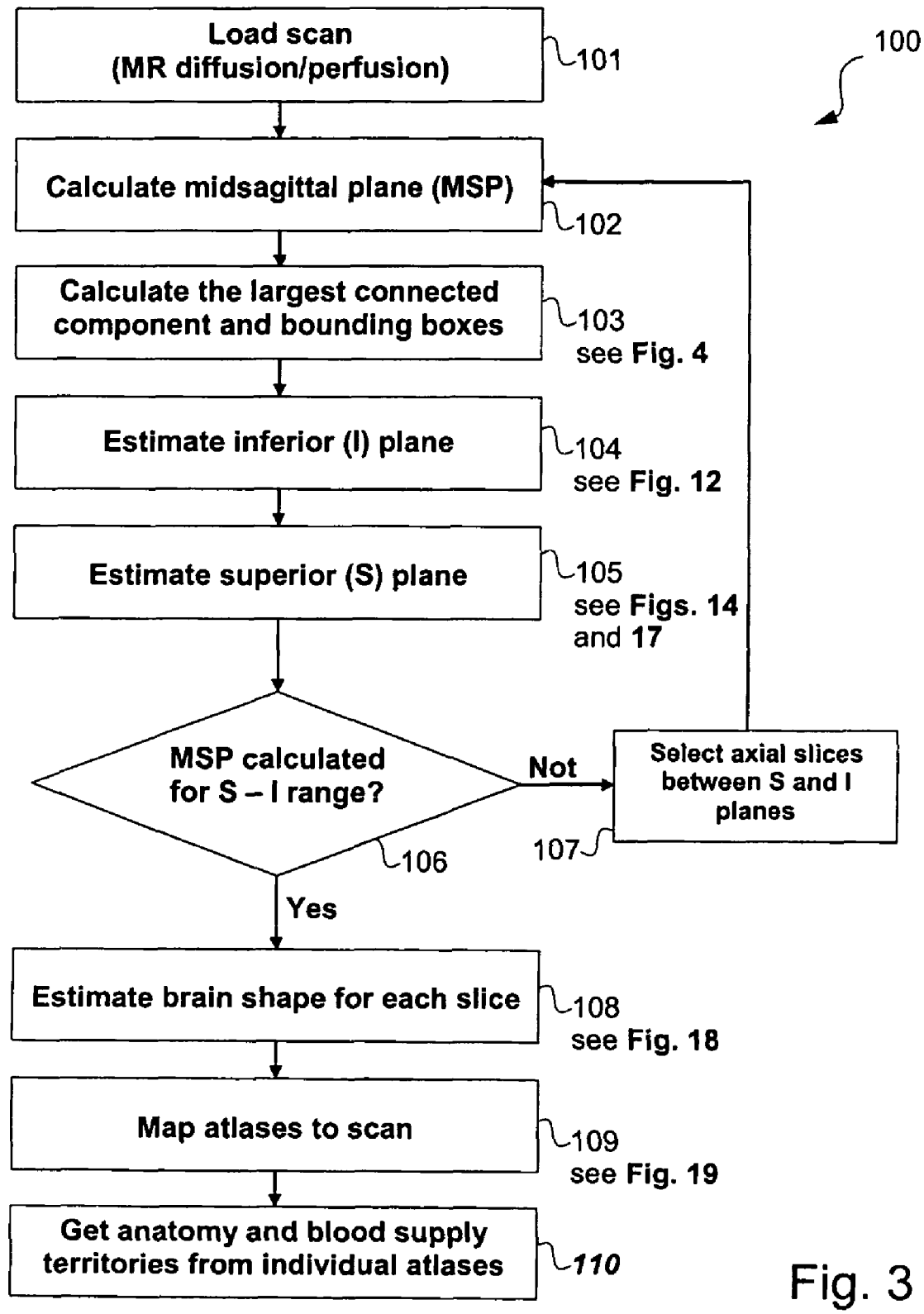
FIG. 3 is a flowchart showing an example overview of the method.

FIG. 3 gives an overview of one example of an Atlas-assisted MRI method. Firstly, a step 101 loads a magnetic resonance (MR) diffusion or perfusion scan (referred to hereinafter as a volume image) from the database 1122 into the computer system 1100, and parameters characterizing the volume image are read. A following step 102 determines the midsagittal plane (MSP) for the entire volume image.

A subsequent step 103 (see FIG. 4 for more details) binarizes the volume data to find the largest connected component which represents the cerebrum (consisting of left and right hemispheres) which is the sub-volume of interest in the present example. Then, subsequent steps 104 (see FIG. 12 for more details) and 105 (see FIGS. 14 and 17 for more details) respectively estimate the most inferior plane (I plane) and the most superior plane (S plane) of the cerebrum. Estimation of the S plane is performed in different manners depending upon whether data explicitly associated with the S plane is present in the volume scan data set or not. In other words, the manner in which the estimation of the S plane is performed is dependent upon the completeness of the MSP in the data. A following step 106 determines if the MSP, the I plane, and the S plane have been recalculated for the axial slices between the S and I planes. If this is not the case, then the method 100 is directed by a NOT arrow back to the step 102. The steps 102-105 are then repeated, but only for that part of the volume image falling between and including the S plane and the I plane that were previously calculated.

Returning to the step 106, if the MSP has been recalculated for the volume image in the range including and between the I plane and the S plane, then the method 100 is directed by a YES arrow to a step 108 (see FIG. 18 for more detail) that estimates the shape of the brain for each slice between the S and I planes. The aforementioned "shape of the brain" is, in the present example, the shape of the profile of the cerebrum lying in the plane of the particular slice in question. A following step 109 (see FIG. 19 for more detail) maps the atlases onto the volume image, based on the calculated extent of the cerebrum. This involves a registration procedure to ensure that the calculated extent of the cerebrum conforms to the corresponding cerebrum representations in the atlases. Finally, a step 110 determines the underlying anatomy and blood supply territories (and other atlas derived information) from the individualized atlases, thereby obtaining labels of structures and blood vessels.

FIG. 3 Step 101—"The Scan Loading Step"

The disclosed Atlas-assisted MRI method is applicable to MR diffusion weighted images (DWI), perfusion weighted images (PWI), and also to the derived perfusion maps including cerebral blood flow (CBF), cerebral blood volume (CBV), mean transit time (MTT), time to peak (TTP), and peak height (PKHT).

From the header (derived from the DICOM communication protocol or any other communication protocol being used for communication between the medical devices) full information for the volume image is read, including number of slices, matrix (ie number "X" of rows, and number of columns), pixel size, slice thickness, and inter-slice gap.

FIG. 3 Step 102—"Calculation of the Midsagittal Plane (MSP)"

The MSP is calculated twice. First, the MSP is calculated for the entire volume image (ie for all slices in the volume image) to determine the dorsal and ventral extents (depicted by 1006 and 1005 respectively in FIG. 1) of the cerebrum. This produces what is referred to as a first version of the MSP. Then, the MSP is calculated for the cerebrum only, i.e., for the axial slices falling between the S and I planes and also including the S and I planes. This produces what is referred to as a second version of the MSP. This recalculation produces a more accurate estimate of the MSP. It is noted that the aforementioned first and second versions of the MSP are performed sequentially. From the first version ie the initial MSP, the dorsal and ventral extents of the brain are determined. Then for these extents, the final second version of the MSP is determined.

The MSP is calculated both for the first iteration, relating to the entire volume image, and for the second iteration, relating to the axial slices including and falling between the S and I planes using a cross-entropy based approach which is described in Bhanu Prakash K N, Volkau I, Nowinski W L, Extraction of mid-sagittal plane from MR brain volume—Entropy and energy based approaches. U.S. 60/558,567. The method is fast in computation, robust with respect to noise and inhomogeneity effects, does not extract anatomical patterns and does not need preprocessing stages like reformatting, and skull stripping. The method is applicable for different pulse sequences and various modalities (MR, CT) and to MR diffusion weighted images (DWI), perfusion weighted images (PWI), and to the derived perfusion maps mentioned.

The current results show that it is modality independent, pulse sequence independent, and handles both normal and pathological cases (where mass-effect is not very significant).

FIG. 3 Step 103—"Calculation of the Largest Connected Component and the Bounding Boxes"

Figure 4:
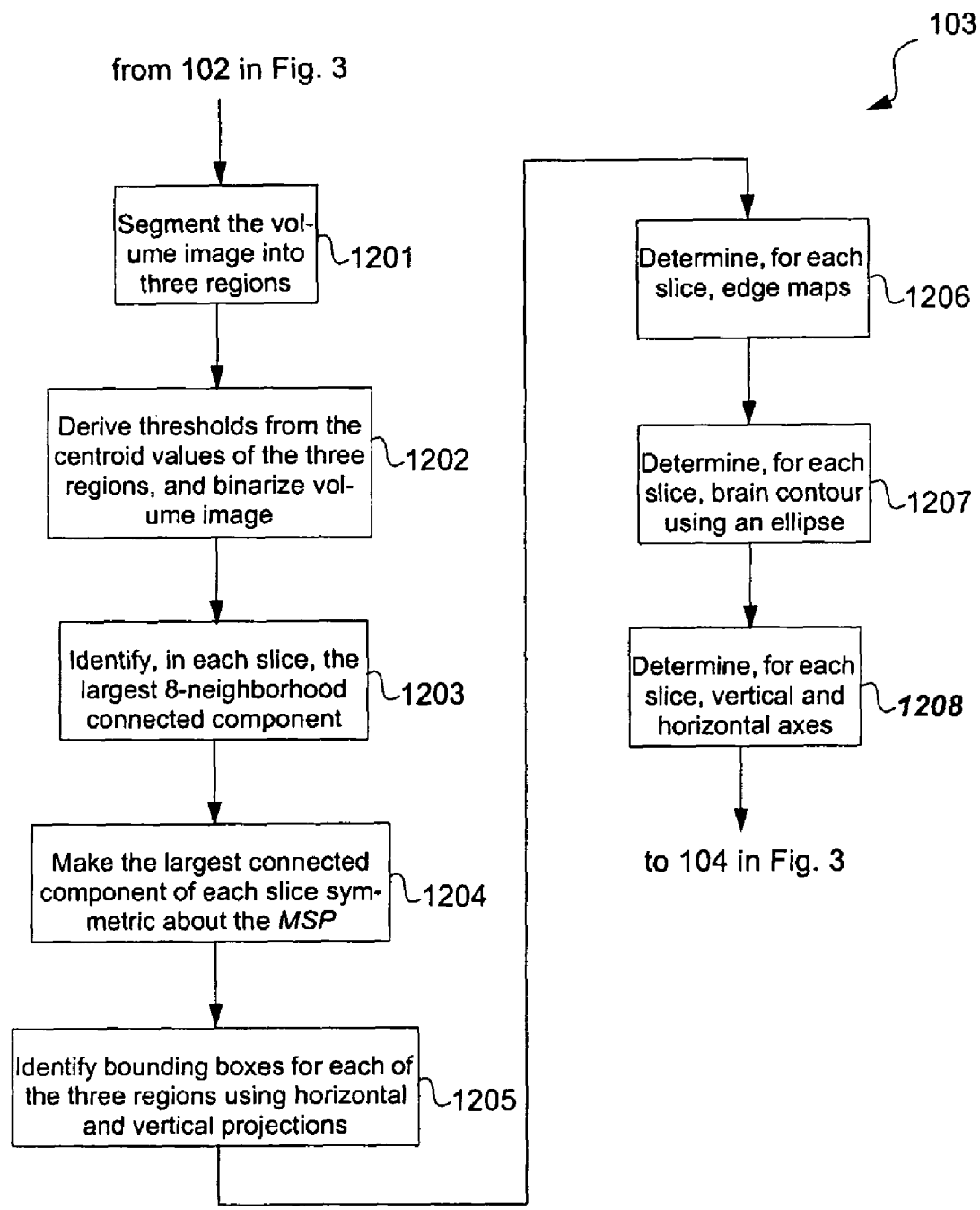
FIG. 4 shows one example of how the step 103 in FIG. 3 finds the largest connected component and its bounding box.

FIG. 4 shows one example of how the step 103 in FIG. 3 finds the largest connected component and its bounding box. A step 1201 segments each slice of the volume image (see FIG. 5 which depicts a sample perfusion volume image 200 comprising a set of images 201-216) into cerebrospinal fluid, gray matter and white matter regions of brain. In the present example, the brain tissue contains grey, white matter and CSF. These manifest themselves differently on the greyscale. In the images 201-216, CSF and stroke regions are seen as white areas, whereas grey matter is seen as dark grey, and white matter as light grey in colour. As a general observation, the grey scale depends upon the perfusion map. As noted in regard to FIG. 3 Step 101, there are in the present example five perfusion maps, these relating to cerebral blood flow (CBF), cerebral blood volume (CBV), mean transit time (MTT), time to peak (TTP), and peak height (PKHT). The step 1201 is performed, for instance, by using the fuzzy c-means algorithm. A subsequent step 1202 binarizes each slice of the volume image using a threshold derived from the centroid values of the three regions.

Figure 5:
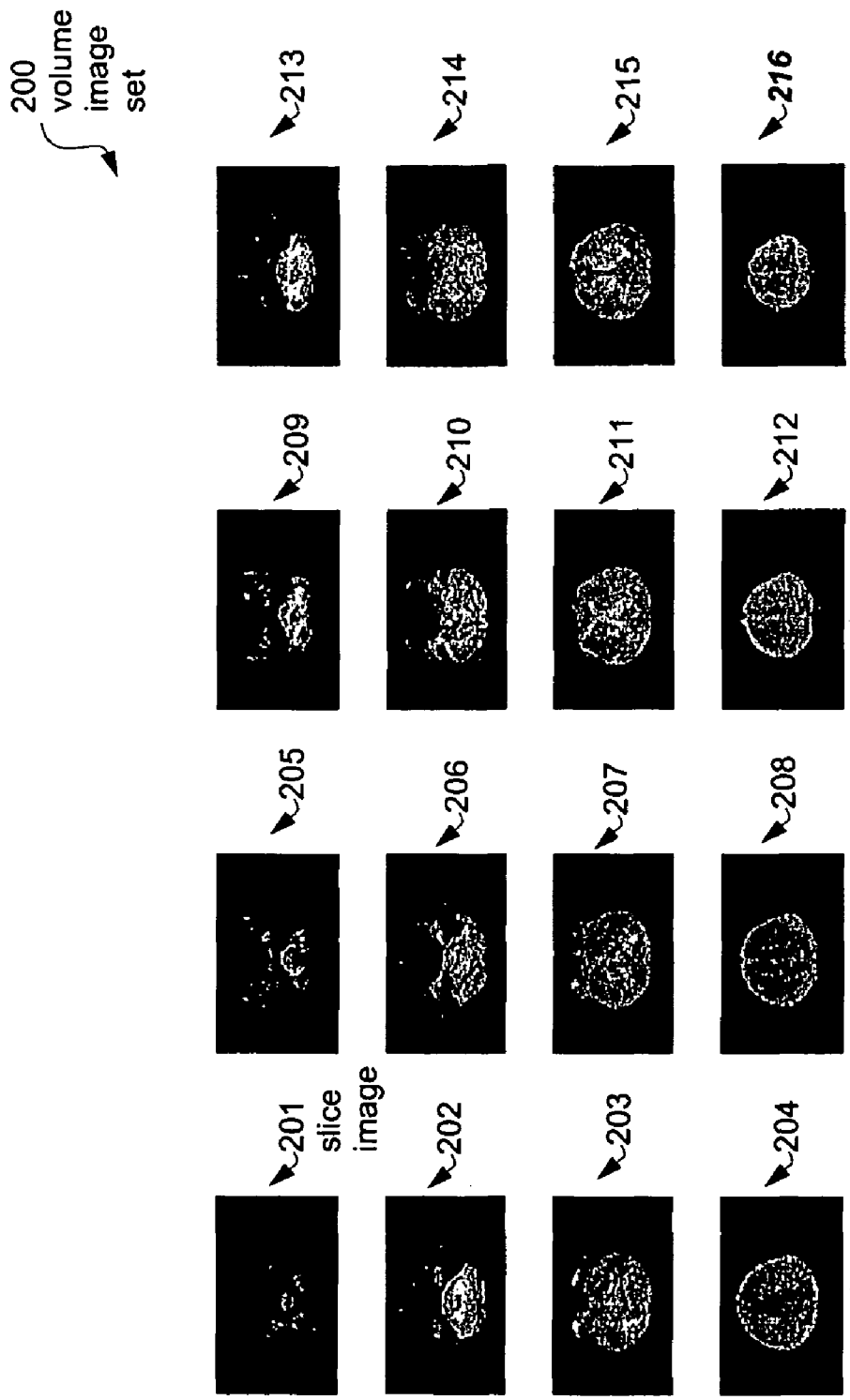
FIG. 5 shows a sample perfusion volume image set.

Thereafter, a step 1203 identifies, in each slice, the largest 8-neighborhood connected component. A following step 1204 positions the largest connected component of each slice symmetrically about the MSP. An example of the symmetrically positioned largest connected components from FIG. 5 are shown as images 301-316 in a set 300 of images in FIG. 6.

Figure 6:
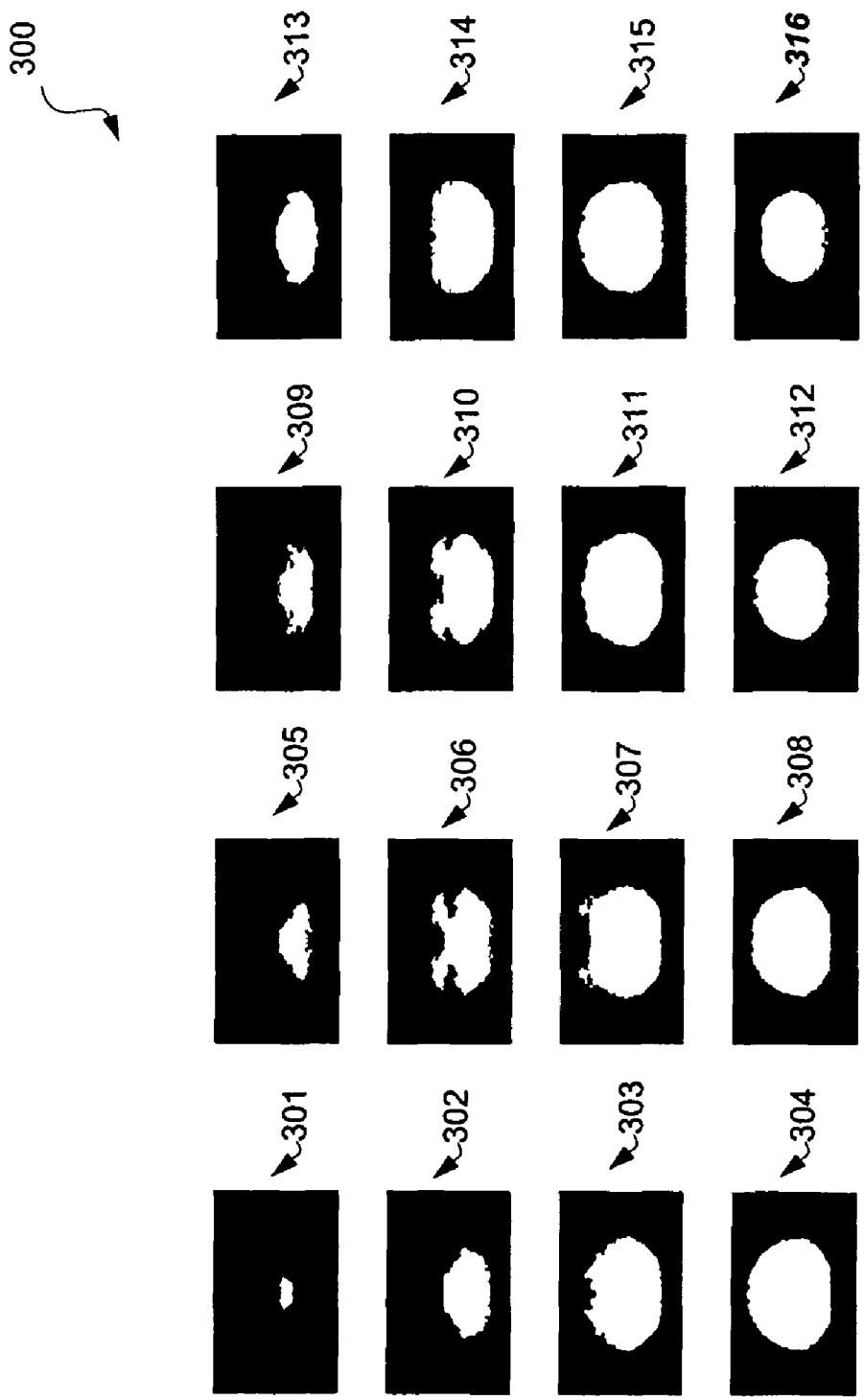
FIG. 6 depicts the binarized volume image data set and the symmetric largest connected component.

FIG. 6 depicts the binarized volume image data set and the symmetric largest connected component.

Returning to FIG. 4, following the step 1204, a following step 1205 identifies bounding boxes for each of these three regions using the horizontal and vertical projections of each of the images. Applying this approach to the images 301-316 in FIG. 6, as is explained in more detail in regard to FIG. 7, produces symmetric largest connected components in bounding boxes, as depicted by 401-416 in FIG. 8.

Figure 8:
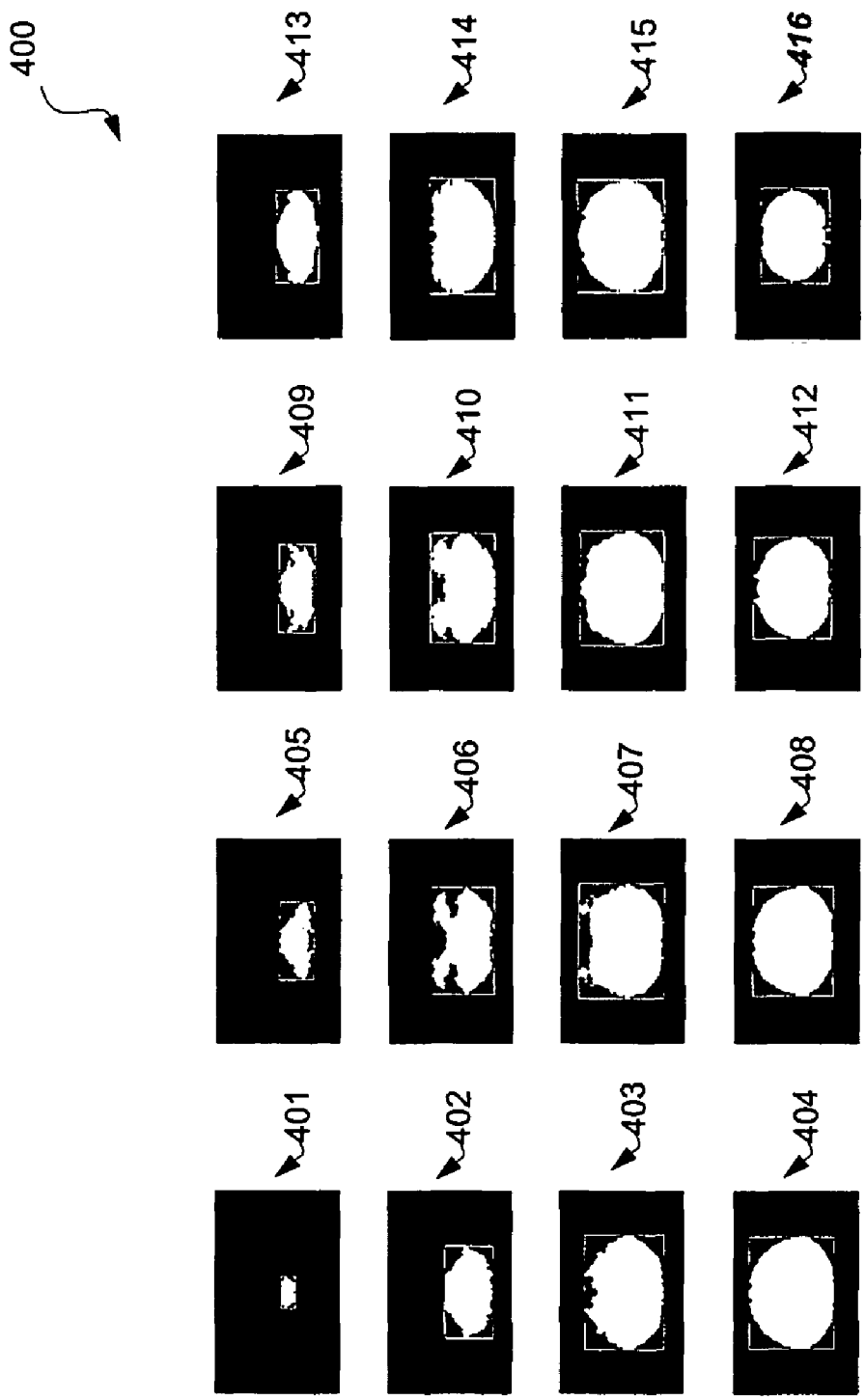
FIG. 8 shows bounding boxes of the symmetric largest connected components.

FIG. 8 shows the symmetrically positioned largest connected components 301-316 from FIG. 6 within their respective bounding boxes.

Returning to FIG. 4, after the step 1205, a subsequent step 1206 determines, for each slice, edge maps by using, for instance, the Sobel operator (which performs a 2-D spatial gradient measurement on an image to emphasize regions of high spatial gradient that correspond to edges). This approach applied to the images in FIG. 8 forms the edge maps of the symmetric largest connected components, as depicted by 501-516 in FIG. 9.

Figure 9:
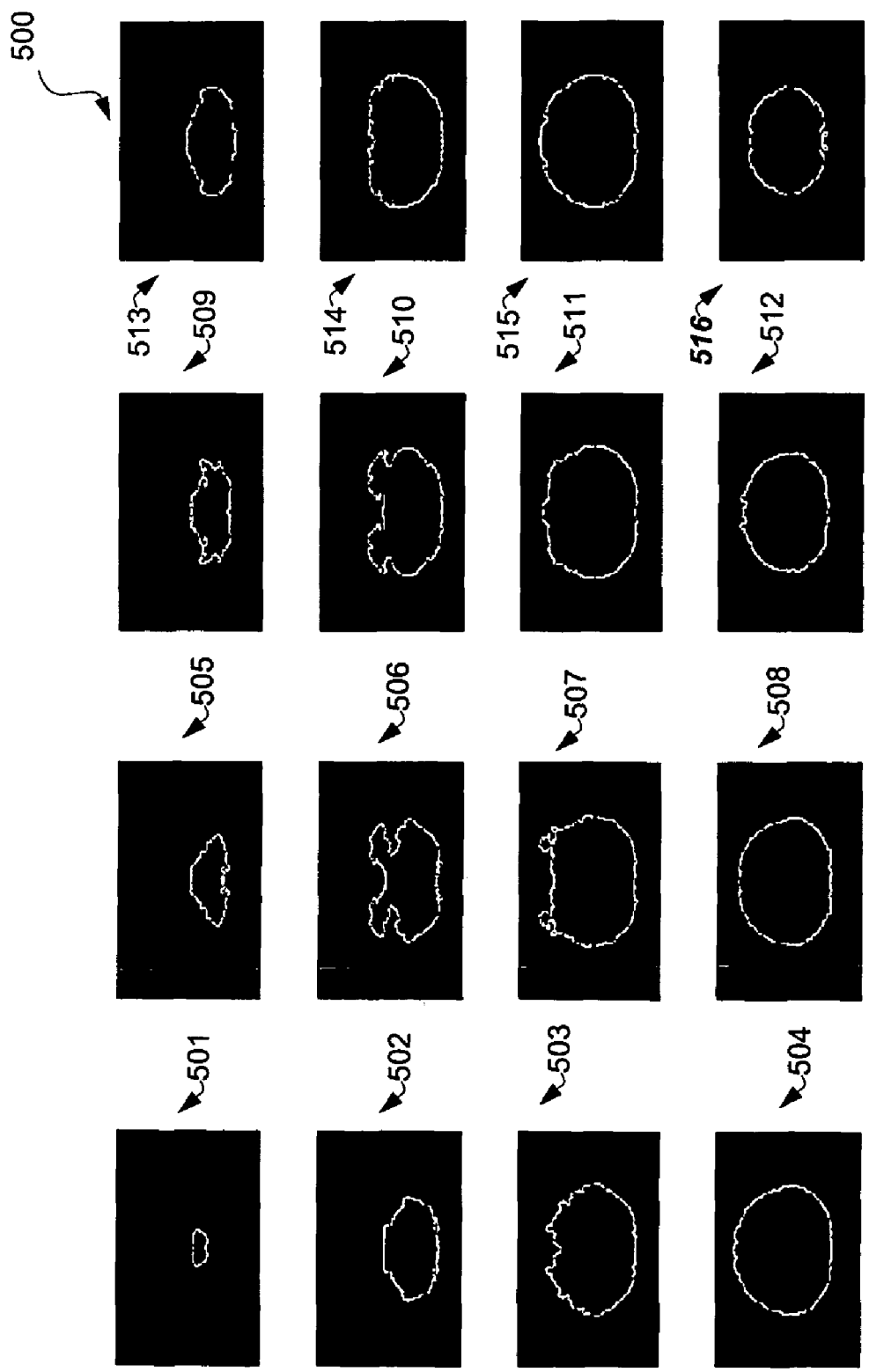
FIG. 9 depicts edge maps of the symmetric largest connected components.

FIG. 9 depicts edge maps of the symmetric largest connected components.

Returning to FIG. 4, after the step 1206, a step 1207 approximates, for each axial slice 501-516 in FIG. 9, the brain image contour using an ellipse as described in Fitzgibbon A., Pilu M., Fisher R. *Direct least-square fitting of Ellipses*, IEEE Transactions on Pattern Analysis and Machine Intelligence, 21(5), 476-480, May 1999. A subsequent step 1208 finds vertical and horizontal axes of each ellipse. It is noted that these major and minor axes of the ellipse do not necessarily coincide with the directions of the coordinate axes of the image. The axis of the ellipse which is closer to the vertical direction is designated the "vertical axis". This approach, applied to the edge maps in FIG. 9 form the edge maps incorporating elipses and vertical axes as depicted by 601-609 in FIG. 10.

Figure 10:
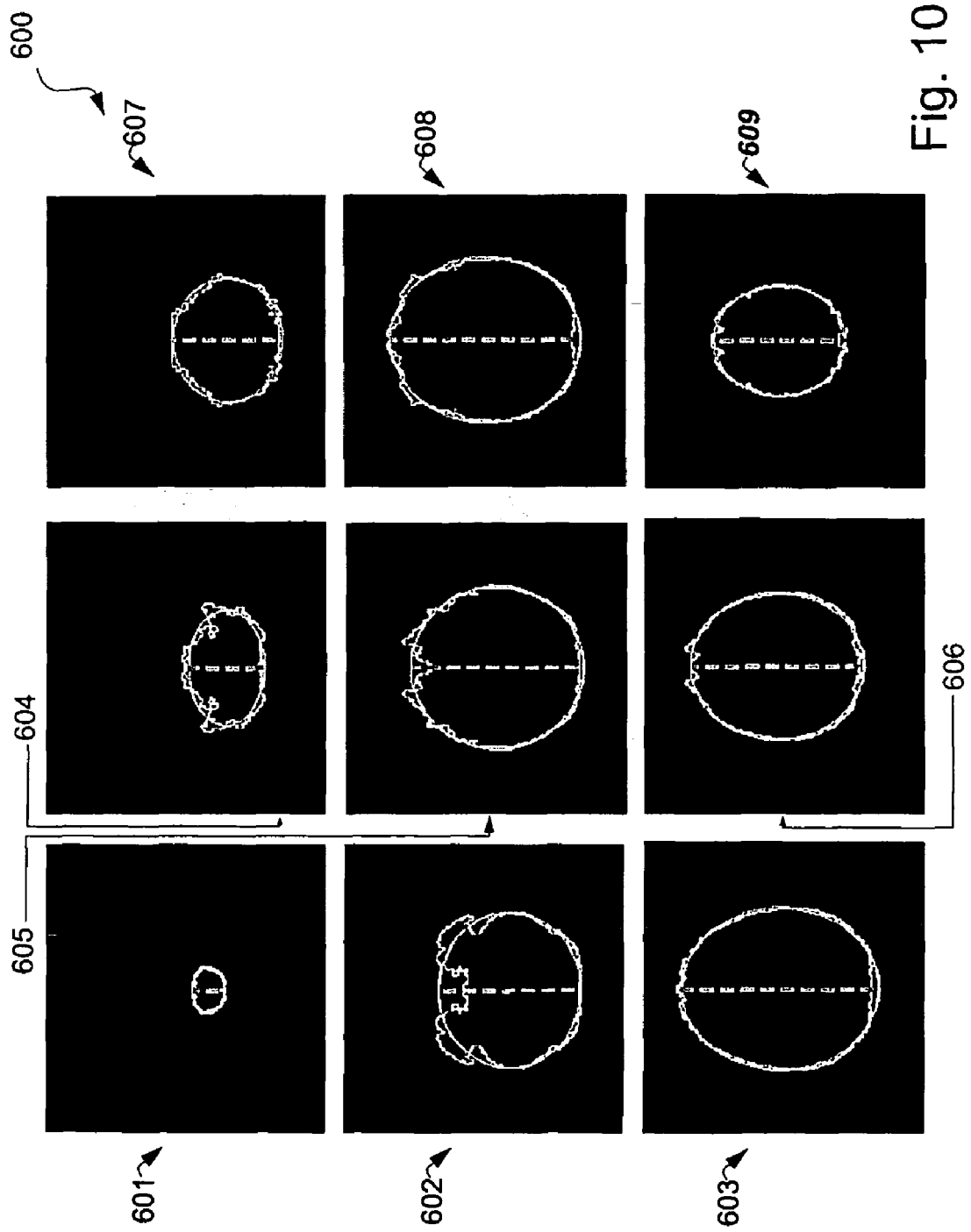
FIG. 10 depicts edge maps, ellipses and the vertical axis.

FIG. 10 depicts edge maps, ellipses and the vertical axis. The ellipses and vertical and horizontal axes in the steps 1207 and 1208 of FIG. 4 are used for calculation of the ellipse that gives the S-point of the brain. The images in FIG. 10 progress from ventral to dorsal as the reference numerals progress from 601-609.

Figure 7:
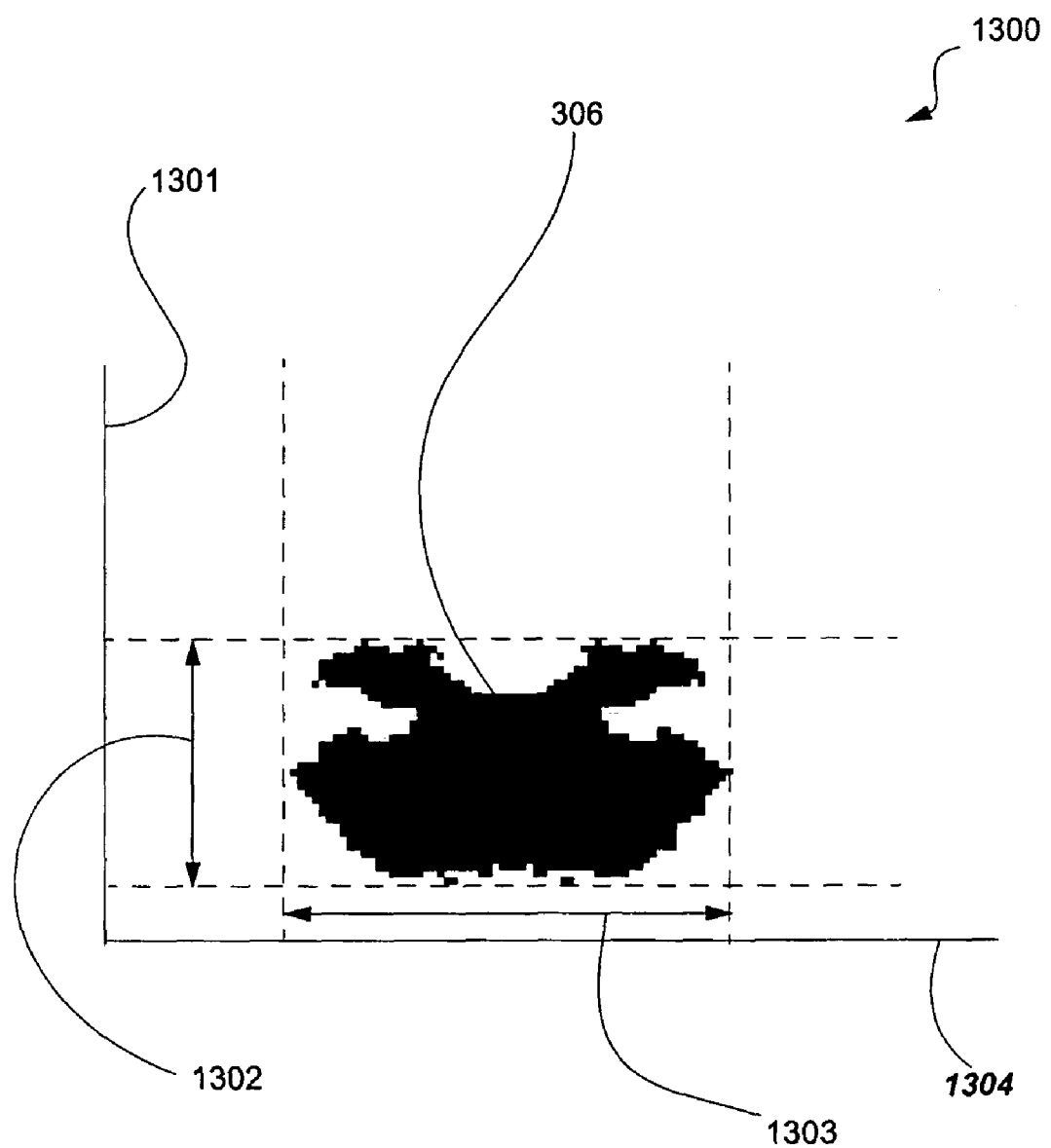
FIG. 7 shows an example of how a bounding box is derived for the slice image 306 of FIG. 6.

FIG. 7 shows an example of how the image 306 in FIG. 6 is projected against a vertical axis 1301 and a horizontal axis 1304 to derive the respective vertical and horizontal sizes 1302, 1303 of the corresponding bounding box. The image 306 bounded by an associated bounding box depicted as 406 in FIG. 8.

Figure 11A:
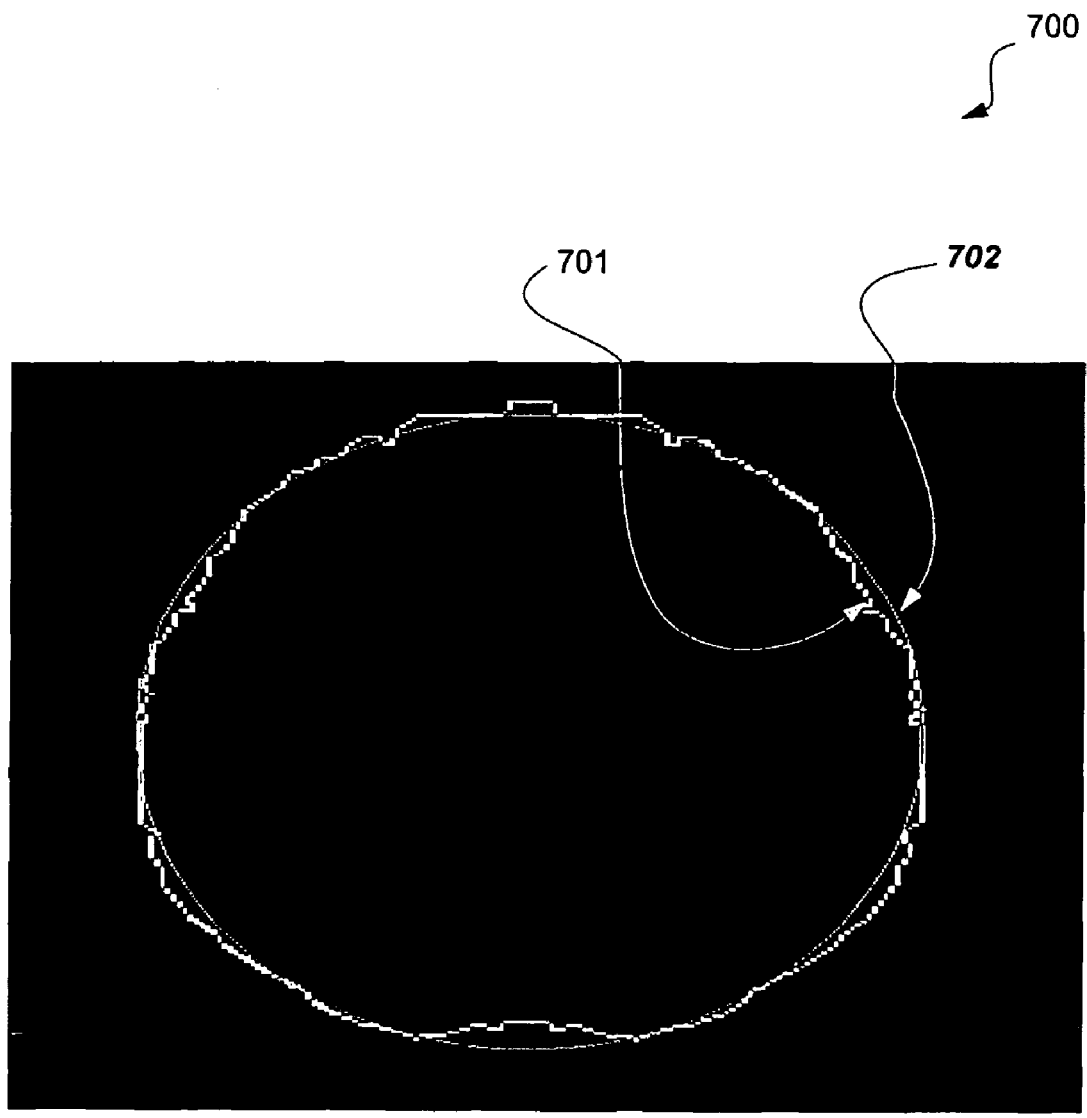
FIG. 11A shows an approximation for slices above AC-PC plane.
Figure 11B:
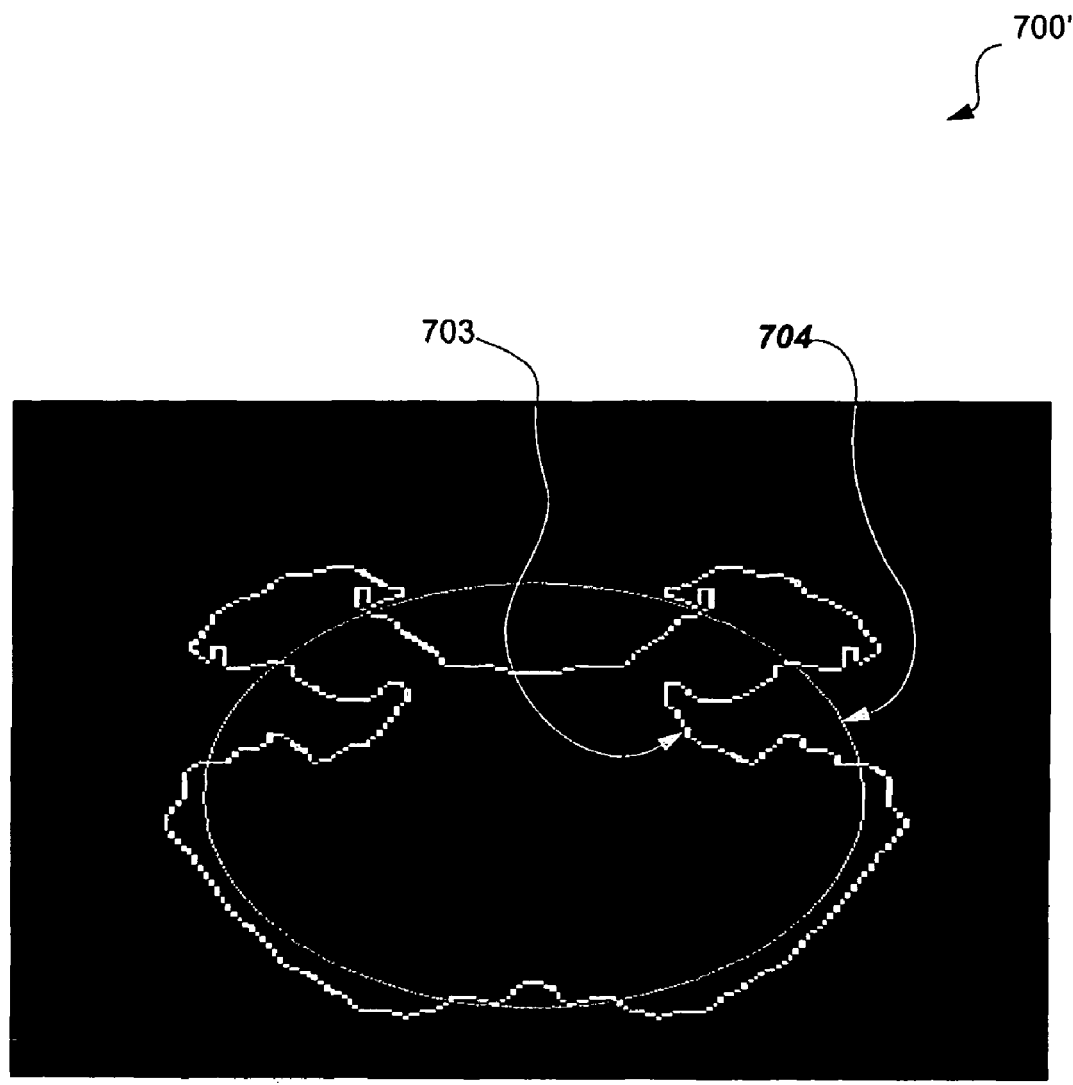
FIG. 11B shows an approximation for slices at the level of base of brain.

FIGS. 11A and 11B show two approximations, one for slices above the anterior commissure-posterior commissure ("AC-PC") plane (FIG. 11A), and one at the level of base of brain (FIG. 11B).

FIG. 11A shows a view 700 of a Contour 701 of the brain on different slices (this being the specific contour for a particular slice), and best fit elliptical approximation 702 for the specific contour.

FIG. 11B demonstrates a "Mickey-mouse" effect. Two "ears" are the ventral part of the left and right temporal lobes. A view 700' shows a contour 703 (this being the specific contour for a particular slice), and the best elliptical approximation 704 for the specific contour.

FIG. 3 Step 104—"Estimation of the Most Inferior Point of the Cerebrum (I Plane)"

In order to establish the location of the most inferior (ventral) plane (ie the I plane depicted by 1008 in FIG. 1), two processing passes are performed. In the first pass, the I-plane is calculated using the entire volume image, namely all slices thereof. In the second pass, the I-plane is recalculated for the slices within the cerebrum only. This increases the accuracy of the calculations. Dorsally (ie from the direction depicted by 1006 in FIG. 1) the shape of the brain (cerebrum) may be approximated by an ellipse whose major axis on axial orientation is close to vertical. Ventrally (ie from the direction depicted by 1005 in FIG. 1) the shape of the brain (cerebellum in this case) is rather approximated by an ellipse whose major axis is close to horizontal. Between these two configurations, there is a "Mickey mouse" (FIG. 11B) type of shape due to the cerebellum and the ventral part of the left and right temporal lobes.

This anatomical and radiological observation along with the changing area of the approximating ellipse serve as the basis for estimation of the I plane.

Figure 12:
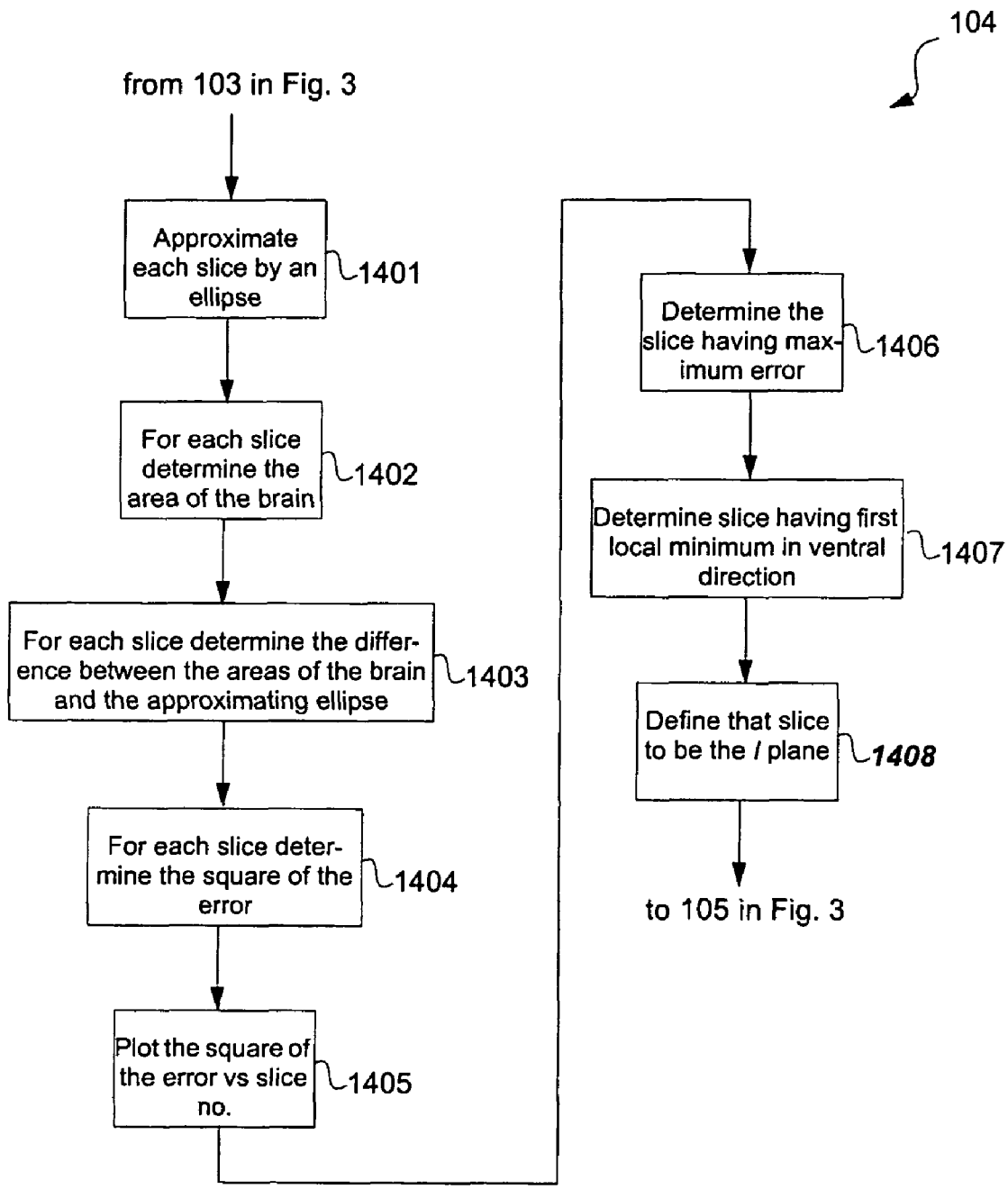
FIG. 12 shows one example of how the step 104 in FIG. 3 estimates the position and orientation of the I plane.

FIG. 12 is a flowchart showing one example of a method for performing the step 104 in FIG. 3, which is a process for estimating the position and orientation of the I plane. Calculations are performed on the axial slices (refer to the "X" axis in FIG. 13). The processing is limited (see steps 1406-1407 in FIG. 12 as described below) to the ventral slices lying below the intercommissural plane, if this is available.

The method 104 commences with a step 1401 that approximates each slice of the brain by an ellipse. A subsequent step 1402 determines, for each slice, the area of the brain. Thereafter, a step 1403 determines, for each slice, the difference between the approximating ellipse and brain area. A step 1404 then determines the square of each difference determined by the step 1403, and a subsequent step 1405 plots the aforementioned square errors against slice number as depicted in FIG. 13.

Figure 13:
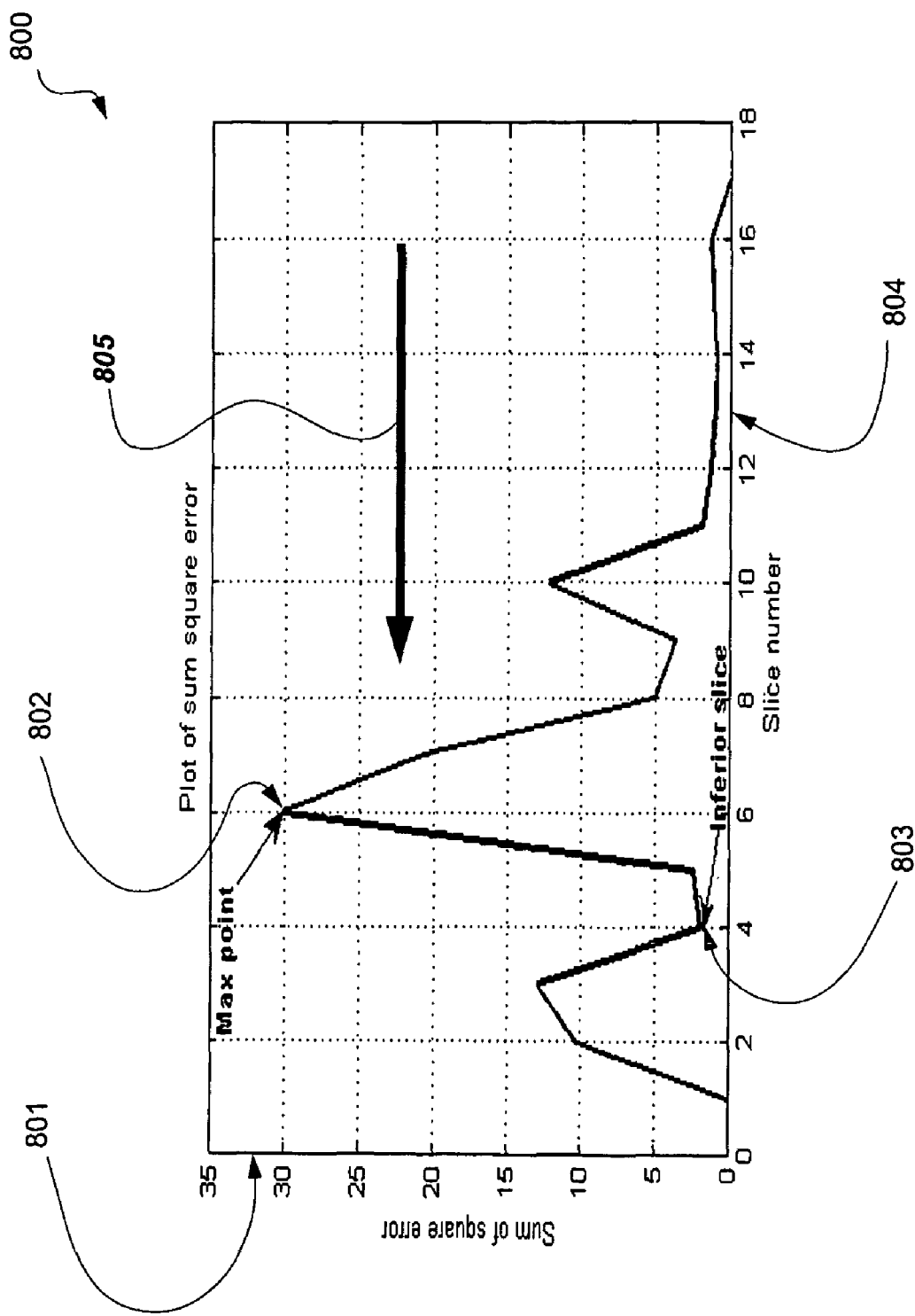
FIG. 13 is a plot of sum of square error of ellipse fit versus slice number.

A following step 1406 identifies the slice associated with the maximum error (see Max point 802 in FIG. 13). Then, a step 1407 moves from the "Max point" slice in the ventral direction (depicted by an arrow 805 in FIG. 13), until the next local minimum point is reached (see 803 in FIG. 13). The local minimum is the inferior point, and the slice associated with this inferior point is defined by a following step 1408 to be the I plane.

FIG. 13 is a plot of the square of the error between the fitted ellipse versus slice number.

FIG. 3 Step 105—"Estimation of the Most Superior Plane of the Cerebrum (S Plane)"

The most superior (dorsal) plane of the cerebrum (ie the S plane depicted by 1007 in FIG. 1) is determined using the data properties When dealing with the S plane, there are two situations that can arise in a clinical situation. In a first case, the volume image does not contain the most superior (S) plane of the cerebrum. In a second case, the volume image contains this S plane, and typically also contains additional slices extending beyond the brain. These slices are usually very noisy.

Case 1—The S Plane not Available in the Scan

Figure 14:
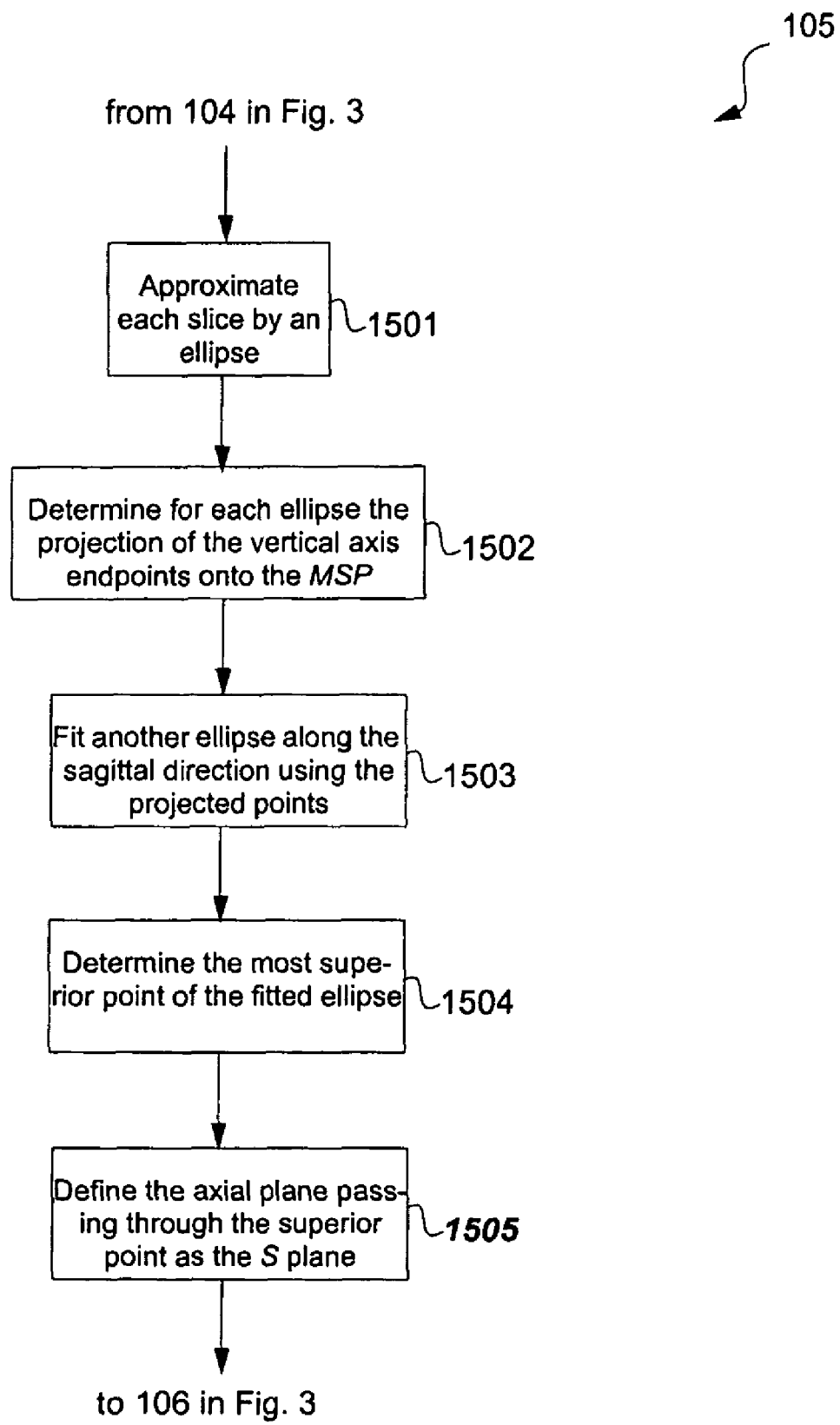
FIG. 14 shows one example of how the step 105 in FIG. 3 estimates the S plane when data associated with the S plane is not explicitly available in the volume image.

FIG. 14 shows a flow chart of one example of a process 1500 for performing the step 105 in FIG. 3 when the S plane is not available in the volume image. A first step 1501 approximates the brain, for each axial slice, by an ellipse. A next step 1502 determines, for each ellipse, the projection of the vertical axis endpoints to the MSP (see FIG. 15 for details).

Figure 15:
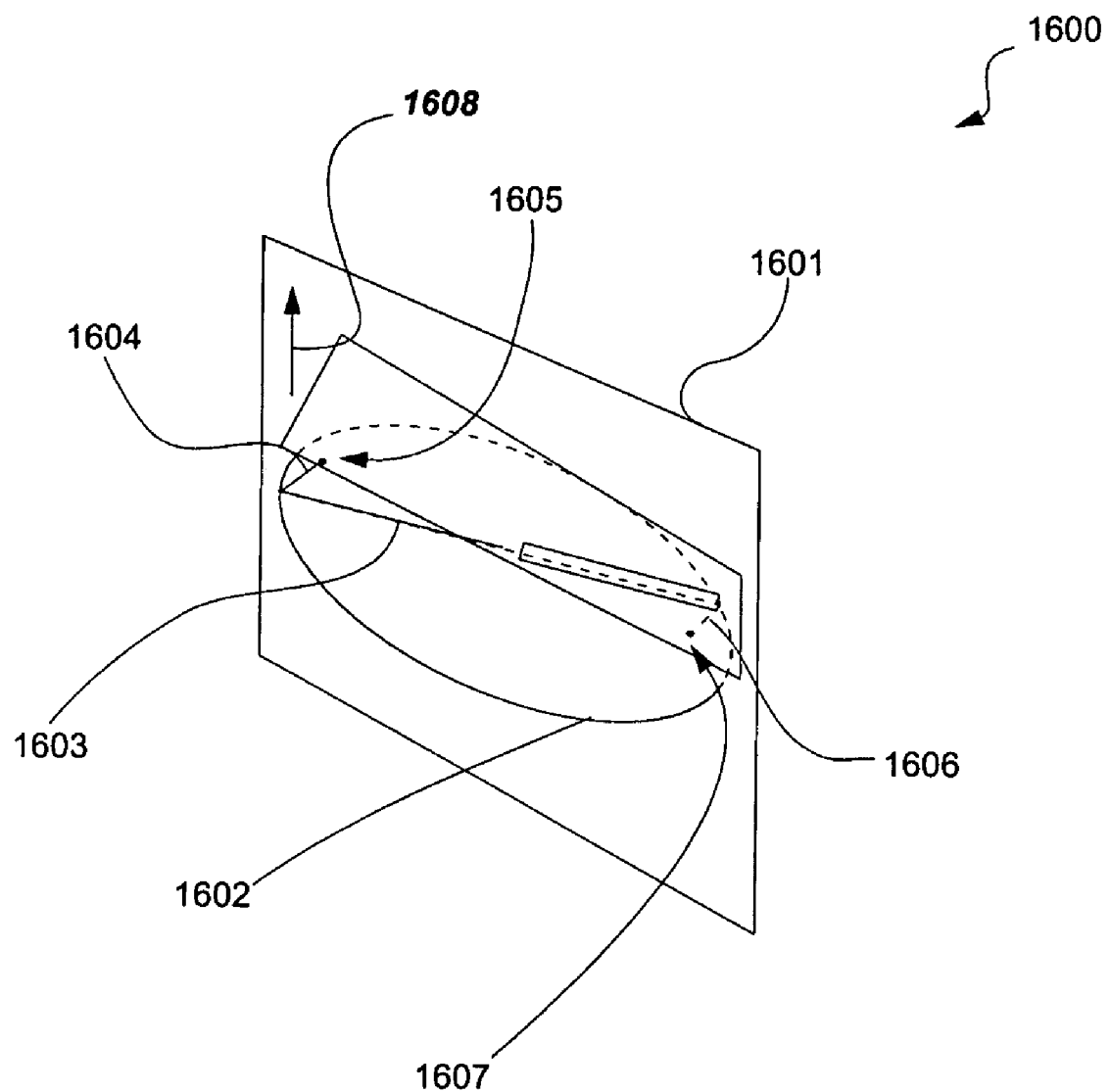
FIG. 15 depicts projection of endpoints of the vertical axis of an axial slice onto the MSP.

FIG. 15 depicts projection of endpoints of the vertical axis of an axial slice onto the MSP. FIG. 15 depicts an MSP 1601, an ellipse 1602 approximating an axial slice (not shown), the vertical axis 1603 of the ellipse 1602, and projections 1604 and 1606 of respective endpoints of the vertical axis 1603 that produce respective projected points 1605 and 1607.

Figure 16:
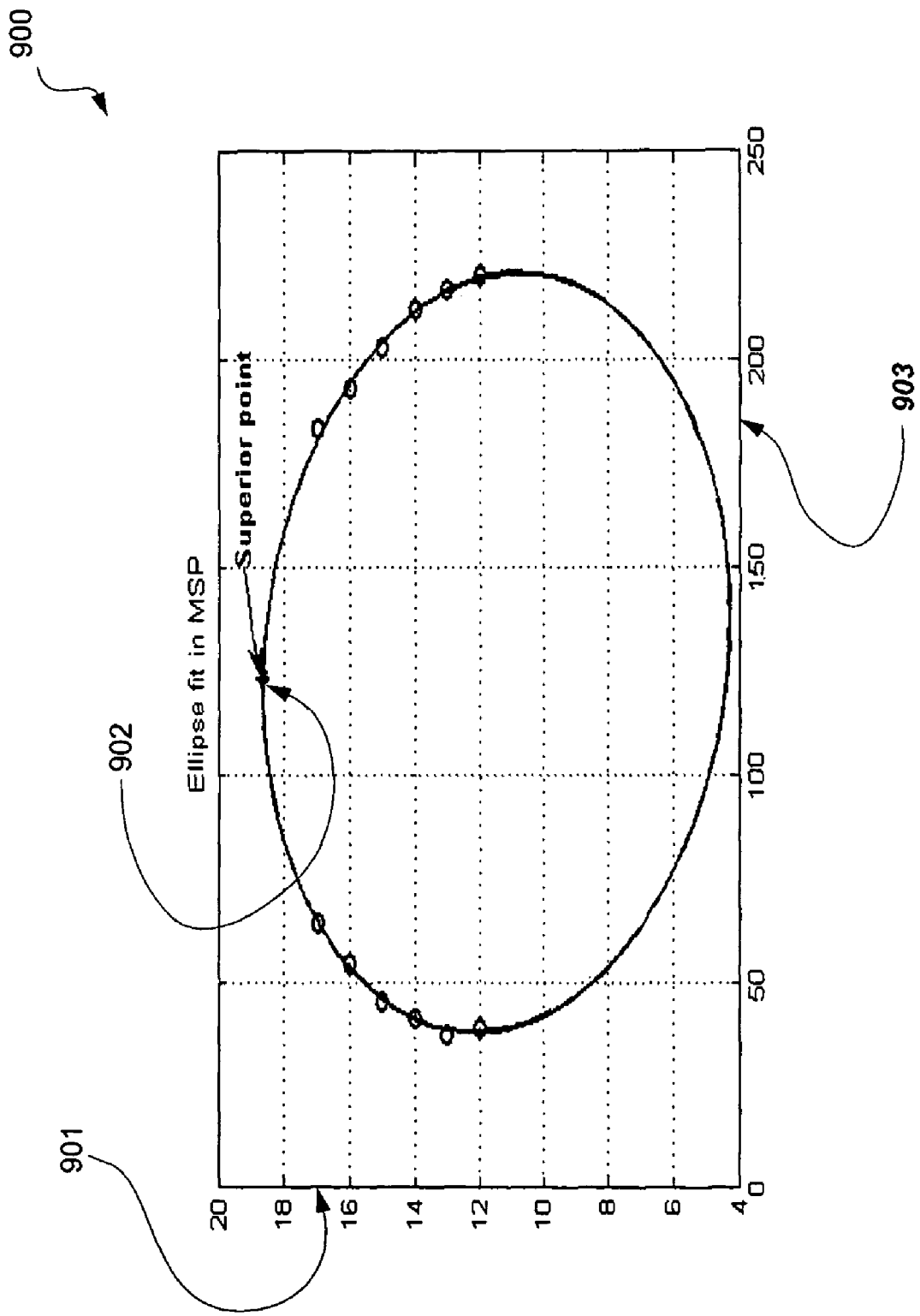
FIG. 16 shows the best elliptical fit from the projections of MSP points to calculate the S-plane.

Returning to FIG. 14, after the step 1502, a step 1503 determines, using the points projected onto the MSP, the superior point by fitting another ellipse (as depicted in FIG. 16) along the sagittal direction (see an arrow 1608 which lies in the MSP 1601). In order to eliminate influence of the ventral points to the dorsal part of the ellipse, the step 1503 uses only the points above the intercommissural (anterior-posterior commissure) plane (if available) for ellipse fitting (the intercommissural plane is the plane with maximum major (vertical in this case) axis of the approximating ellipse). A following step 1504 determines the most superior point of the ellipse fitted along the sagittal direction, and a final step 1505 defines the axial plane passing through the ellipse as the S plane.

FIG. 16 shows the best elliptical fit from the projections of MSP points to calculate the S-plane.

Case 2—The S Plane Available in the Scan

Figure 17:
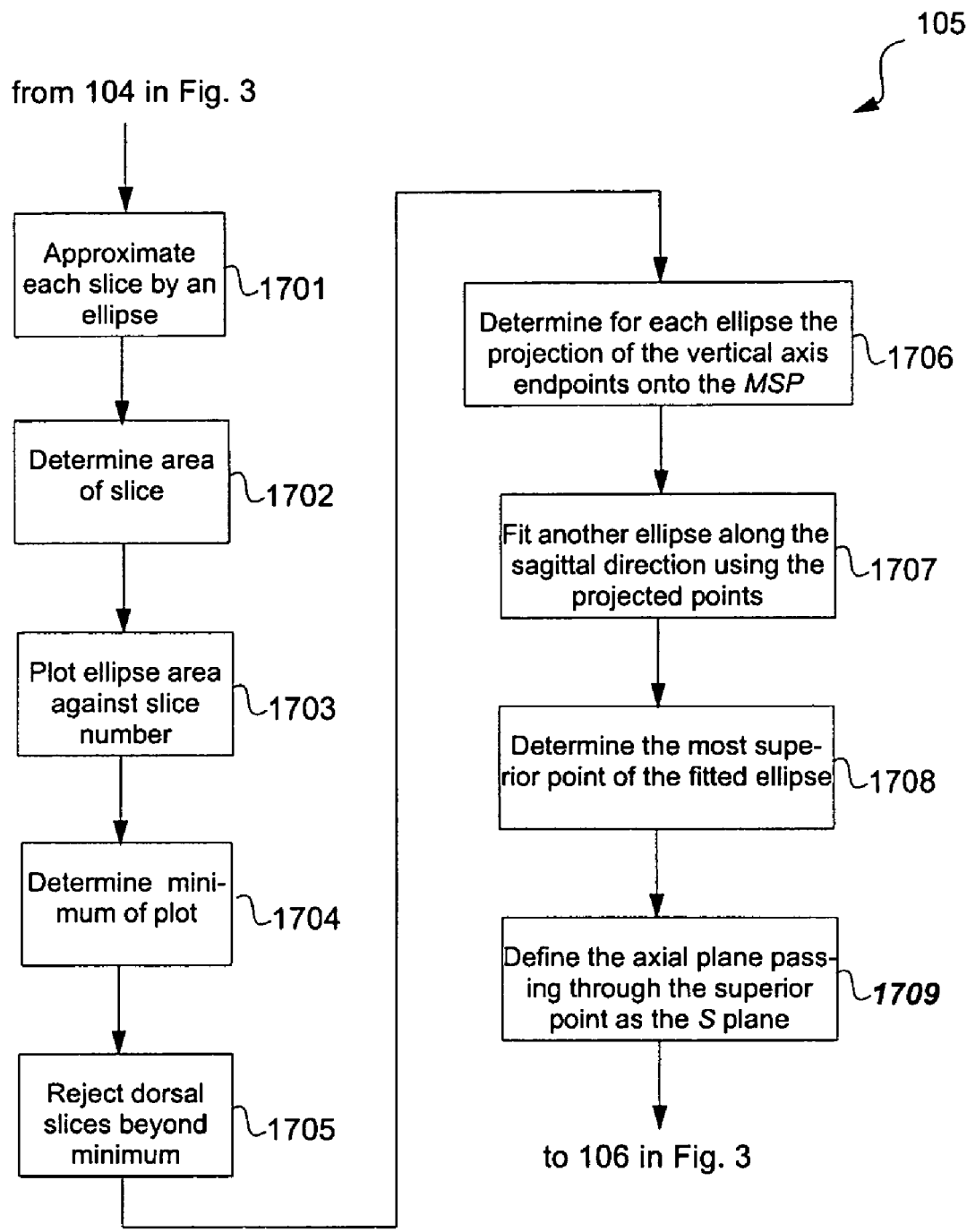
FIG. 17 shows an example of how the step 105 in FIG. 3 estimates the S plane when data associated with the S plane is explicitly available in the volume image.

FIG. 17 is a flow chart of an example of a process for estimating the S plane when the S plane is available in the volume image. In this case the location of the S plane is estimated as follows. In a first step 1701, for each axial slice the brain is approximated by an ellipse. A following step 1702 determines the area of each ellipse. Then a step 1703 plots the area of each slice against slice number. For efficiency, only the slices above the intercommissural plane are used. A subsequent step 1704 determines the minimum of the plot. Then a step 1705 rejects the dorsal slices beyond this minimum. From the remaining slices the S plane is identified by ellipse fitting on the MSP, according to steps 1706-1709, in a similar manner to that described in relation to the steps 1502-1505 in FIG. 14 for the case when the S plane is not available in the scan.

FIG. 3 Step 108—"Estimation of the Shape of the Brain for each Slice"

The extent of the brain on an individual slice is estimated, in the described arrangement, by a plurality of methods. In one example, by using a combination of methods, the solution is more robust, and increases the confidence of the neuro-radiologist. The two methods are independent and can be performed in parallel. The results can be combined interactively by the user, or automatically, for example by calculating the average values of brain extent in all six directions.

Figure 18:
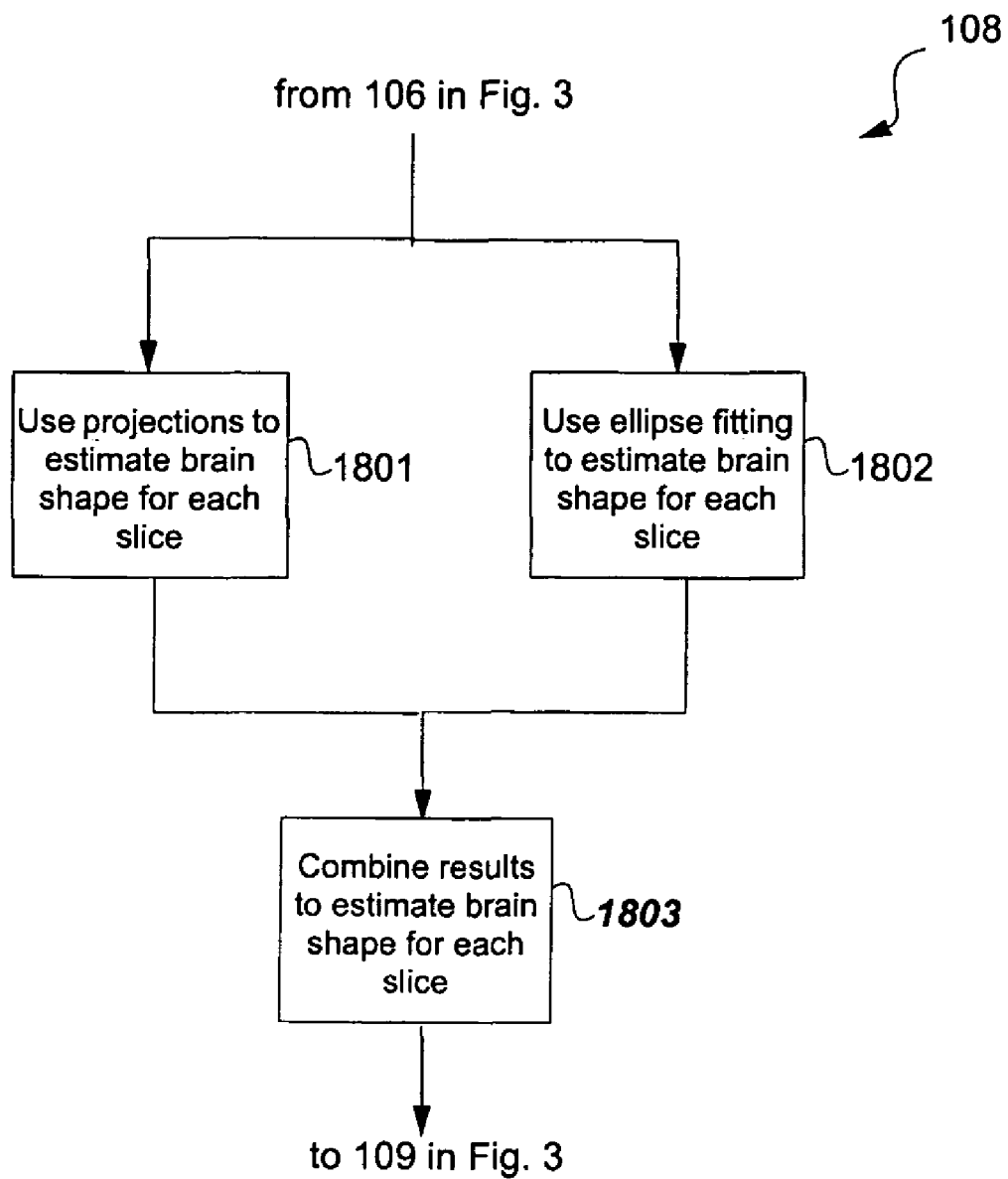
FIG. 18 shows one example of how the step 108 in FIG. 3 estimates brain shape for each slice of the volume image.

FIG. 18 shows one example of how the step 103 in FIG. 3 estimates brain shape for each slice of the image by combining the results from two methods, these methods being (a) the method of projections (which has been described in relation to the steps 1201-1205 in FIG. 4, and (b) a method of ellipse fitting (which has been described in relation to the step 1207 in FIG. 4).

A first step 1801 uses the method of projections to determine the brain shape for each slice. This process has already been performed by the steps 1201-1205 that have been described in relation to FIG. 4. Thus, this step involves segmenting the volume image (depicted in FIG. 5) into cerebrospinal fluid, gray matter and white matter regions using, for example, the fuzzy c-means algorithm. Then, using a threshold derived from the centroid values of the three regions, the volume is binarized. Thereafter, in each slice, the largest 8-neighborhood connected component is identified. Thereafter, the largest connected component (which represents the cerebrum) of each slice is made symmetric about the MSP (as depicted in FIG. 6). Finally, the bounding boxes for each of these regions are identified using the horizontal and vertical projections (to form the image set depicted in FIG. 8).

A second (parallel) step 1802 uses ellipse fitting to determine the brain shape for each slice. This method has been described in relation to the step 1207 of FIG. 4, however in that instance the method was applied to the edge map images depicted in FIG. 9. In the present case in FIG. 18, the method is applied to all slices.

A third step 1803 combines the results of the steps 1801 and 1802, either manually by the user, or automatically by, for instance, taking the average of both methods.

FIG. 3 Step 109 "Mapping the Atlases on the Cerebrum"

Any brain atlas available in a volumetric representation (stack of images) is suitable for mapping. In the present description, the Cerefy atlas (see Nowinski W L, Thirunavuukarasuu A. *The Cerefr Clinical Brain Atlas*. Thieme, New York—Stuttgart, 2004) is used for the anatomical atlas, and Kretschmann H J, Weinrich W. *Cranial Neuroimaging and Clinical Neuroanatomy.* 3rd revised and expanded edition, Thieme, Stuttgart—New York, 2004 is used for the blood supply territories atlas.

All the individual atlases are spatially pre-registered.

Figure 19:
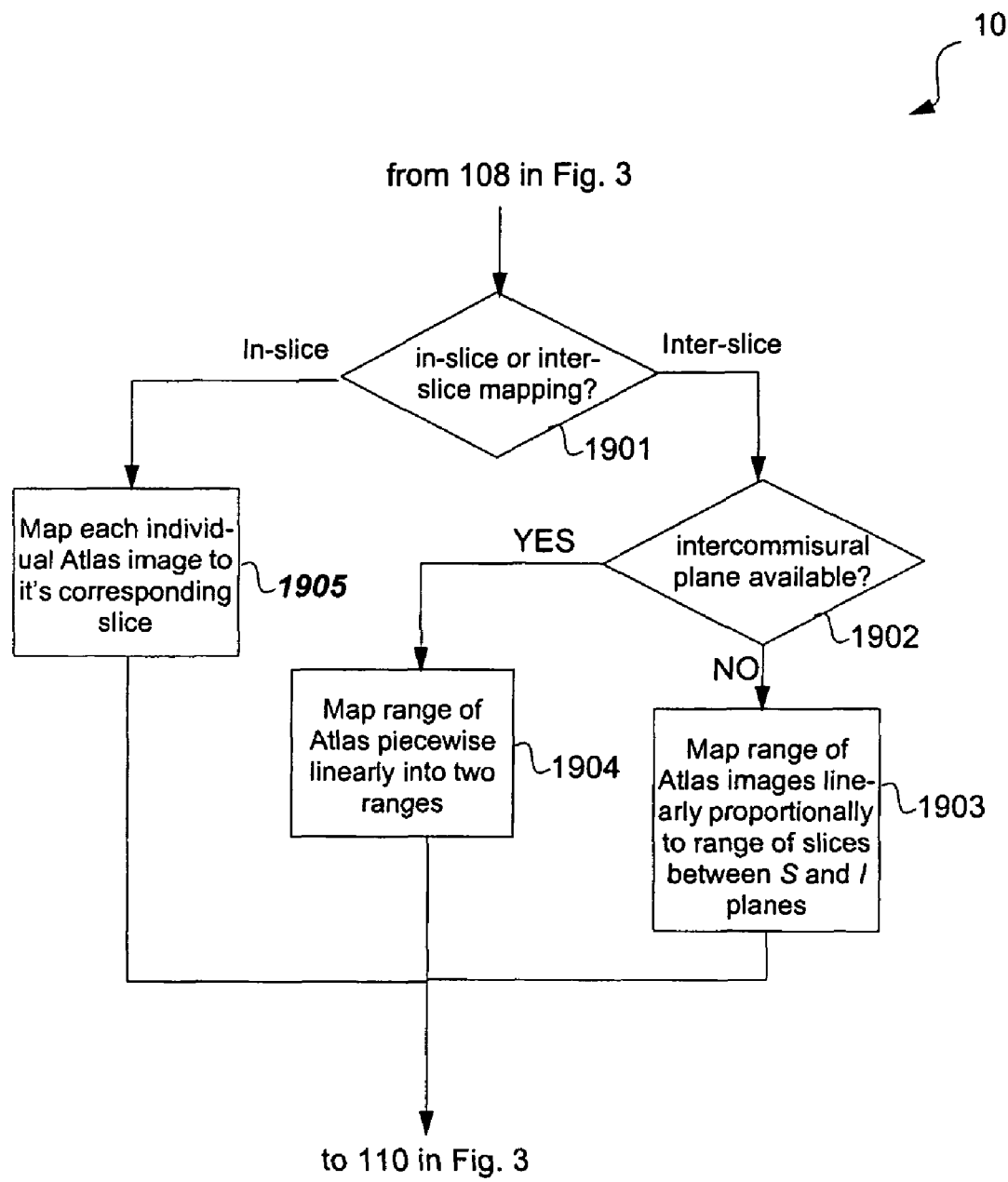
FIG. 19 shows one example of how the step 109 in FIG. 3 maps Atlases to the volume image.

FIG. 19 shows one example 108 of how the step 109 in FIG. 3 maps Atlases to the volume image. In this example, a modification of the Talairach transformation as described in Talairach J, Tournoux P. *Co-planar stereotactic atlas of the human brain*. Georg Thieme Verlag/Thieme Medical Publishers, Stuttgart—New York, 1988 is used for atlas-to-scan mapping. There are two kinds of mapping, namely "in-slice" and "inter-slice".

A first step 1901 determines which type of mapping is required. If inter-slice mapping is required, then the process 108 follows an arrow designated "inter-slice" to a step 1902. The step 1902 considers two cases of inter-slice mapping, namely (a) the case in which the intercommissural plane is available (e.g., determined from the localized image or interactively), and (b) the case in which the intercommissural plane is not available. In the case (b) the process 108 follows a NO arrow to a step 1903. The step 1903 maps the range of the Atlas images linearly proportionally to the range of the slices between the S and I planes. The process 108 is then directed back to the step 110 in FIG. 3. Returning to the step 1902, if the intercommissural plane is available, then the process 108 follows a YES arrow to a step 1904. The step 1904 maps the range of the Atlas images piecewise linearly in two sub-ranges, namely (1) proportionally to the range of the slices between the S and intercommissural planes, and (2) proportionally to the range of the slices between the intercommissural and I planes.

Returning to the step 1901, if in-slice mapping is required, then the process 108 follows an arrow designated "in-slice" to a step 1905. The step 1905 maps each individual atlas image into its corresponding slice (as determined by the inter-slice mapping).

In the simplest case, this mapping is done linearly in 2-Dimensions, by fitting the Atlas image rectangular bounding box to the slice rectangular bounding box. The Atlas typically contains bounding boxes for each image in the Atlas. The slice bounding box is determined from the slice extent calculated during brain shape estimation in the step 108 in FIG. 3. The left/right and anterior/posterior estimates of the brain extents may be additionally smoothed dorso-ventrally in three-dimensions. This can be done for each extent by fitting a spline (e.g., a cardinal one) across all bounding boxes.

In another more advanced arrangement, the Atlas image is mapped to the corresponding slice non-linearly by warping using radial functions described in Ivanov N, A S Parimal, Nowinski W L, Method and program for non-linear image warping based on specific class of radial functions. PCT/SG2005/000420.

FIG. 3 Step 110 "Getting Underlying Anatomy and Blood Supply Territories from the Individualized Atlases"

After the Atlas information has been mapped to the volume image using the step 109 in FIG. 3, each slice in the volume image is browsed interactively, and each slice is labeled with information available in the individual Atlases. In particular, for each location in the slice being considered, the underlying anatomy and blood supply territories can be provided automatically. Thus, for example, each structure and blood supply territory can be identified by a unique colour, thereby providing a one-to-one mapping between colour and name. Therefore, by obtaining the mouse position and reading the colour, the structure being pointed to can be identified.

INDUSTRIAL APPLICABILITY

It is apparent from the above that the arrangements described are applicable at least to the medical imaging industry.

The foregoing describes only some embodiments of the present invention, and modifications and/or changes can be made thereto without departing from the scope and spirit of the invention, the embodiments being illustrative and not restrictive.

Appendix A

Bhanu Prakash K N, Volkau I, Nowinski WL, *Extraction of mid-sagittal plane from MR brain volume - Entropy and energy based approaches.* US60/558,567 filed on 2 Apr. 2004

EXTRACTION OF THE MID-SAGITTAL PLANE

BACKGROUND OF THE INVENTION

Field of the Invention

The present invention relates to methods for extracting the mid-sagittal plane from brain volume data and in particular to method for extracting the mid-sagittal plane using energy or entropy measurements of the brain volume data.

Description of the Prior Art

The mid-sagittal plane is defined as the plane passing through the interhemispheric fissure of the brain and containing less cerebral structures than the rest of the brain. When a volume scan of the brain, for example an MR scan, is taken the position of the brain within the scan depends on the position of the patient's head. Identifying the mid-sagittal plane allows the brain volume to be re-oriented to a preset co-ordinate system or a co-ordinate system to be applied to the brain volume.

Previously developed systems are based on the extraction of symmetry lines in axial or coronal slices of the volume data and use *a priori* information about slice direction. Two basic classes of algorithms are those based on the interhemispheric fissure and those based on a symmetry criterion.

The basic hypothesis underlying the methods based on the interhemispheric fissure is that the interhemispheric fissure of the brain is roughly planar, and this provides a good landmark for further volumetric symmetry analysis. In these methods generally, the fissure is segmented in MR images. Then a three dimensional plane is found using an orthogonal regression from a set of control points representing the segmented curve.

The theory behind the methods based on a symmetry criterion is that the mid-sagittal plane maximizes the similarity between the brain and its reflection, i.e. the mid-sagittal plane is the plane with respect to which the brain exhibits maximum symmetry. Most of the methods based on symmetry share a common general scheme. First, an adequate parameterization is chosen to characterize any plane of the three-dimensional Euclidian space by a vector composed of a few coefficients. Then a search is completed over the set of possible planes to achieve the maximum of an adapted similarity measure between the original image and its reflection. The chosen criterion is often the cross correlation between the intensities of the two three-dimensional images.

The problems with these methods include that some *a priori* information is needed, the methods are time consuming, orientation dependent and limited to small tilts in the data.

BRIEF SUMMARY OF THE INVENTION

In broad terms one aspect of the invention comprises a method of determining the mid-sagittal plane of a brain image including the steps of defining a three-dimensional volume of interest around the mid slices of brain volume data, calculating an entropy or energy measure for each slice in the volume of interest in each of the three directions, producing a first estimate of the mid-sagittal plane as the slice with the highest energy or entropy measure in the sagittal direction, and optimizing the mid-sagittal plane using the first estimate to produce a final estimate of the mid-sagittal plane.

Preferably the brain volume data is MR brain volume data.

Preferably the energy or entropy measures are normalized and the first estimate is produced as the slice with the highest normalized energy in the sagittal direction.

Preferably the volume of interest defined about the mid slices is 40mm in each of the three dimensions.

Preferably the energy measures are a measure of the intensity of the image at each pixel of the slice.

BRIEF DESCRIPTION OF THE SEVERAL VIEWS OF THE DRAWINGS

Figure 1:
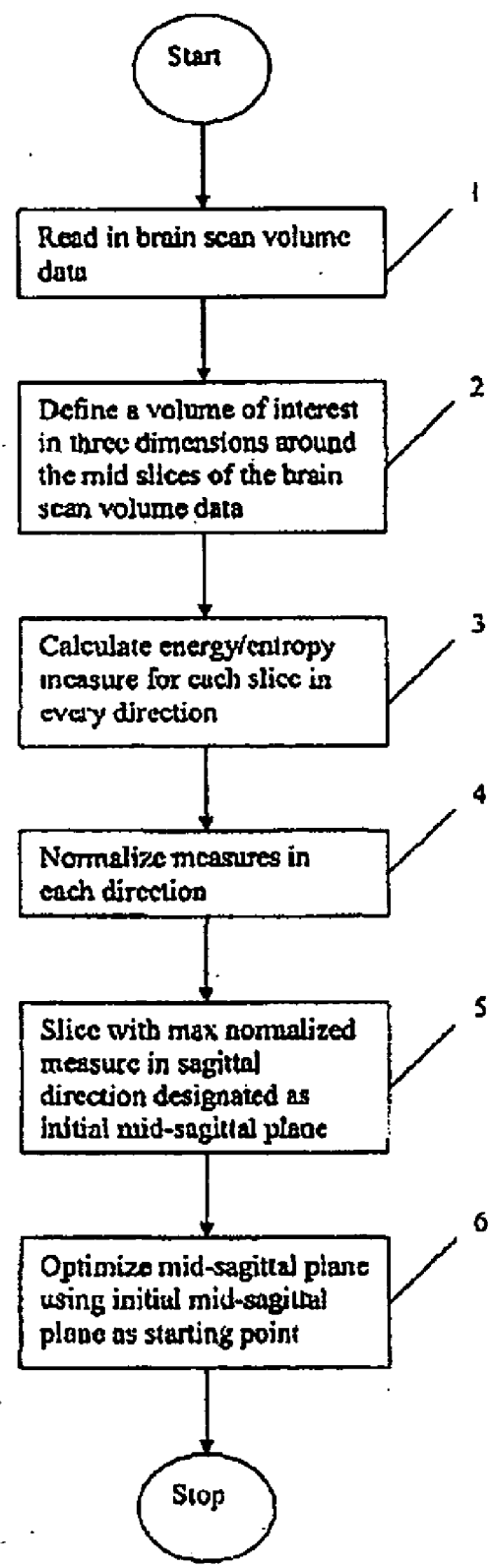
Figure 1:
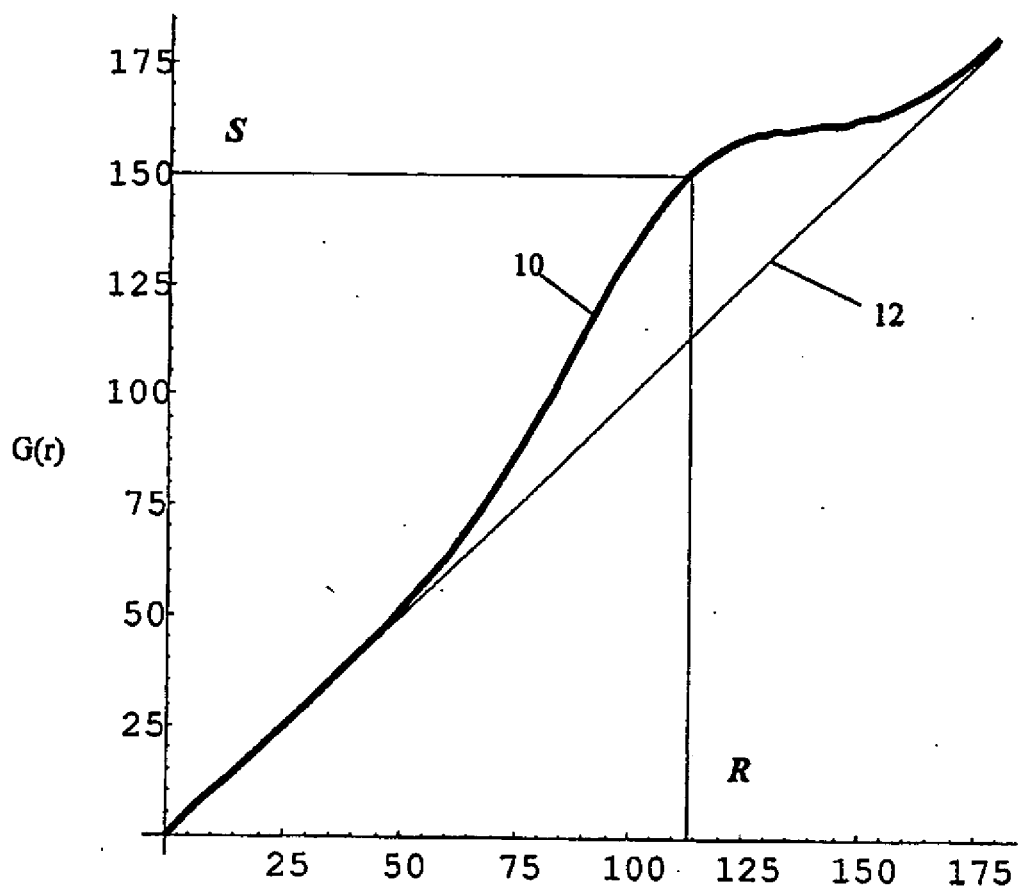
Figure 2:
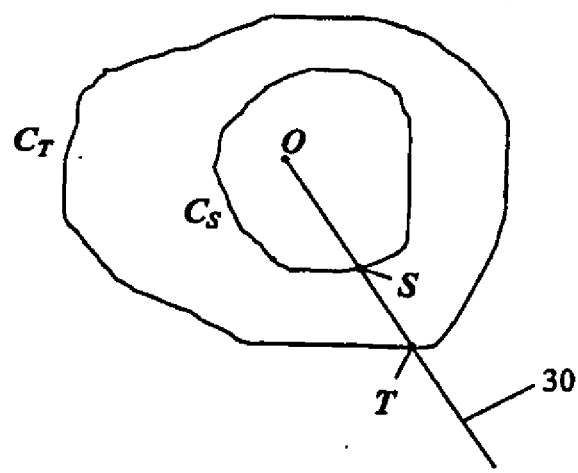
Figure 3:
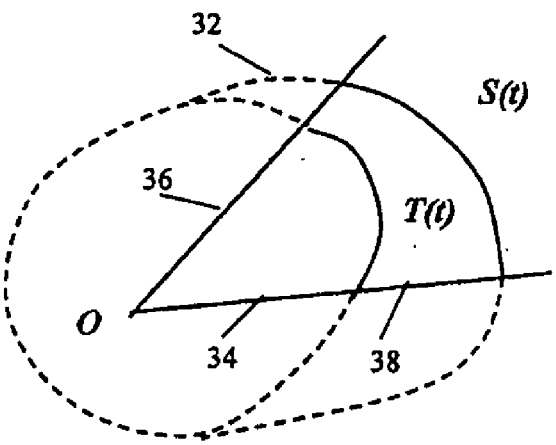
Figure 4:
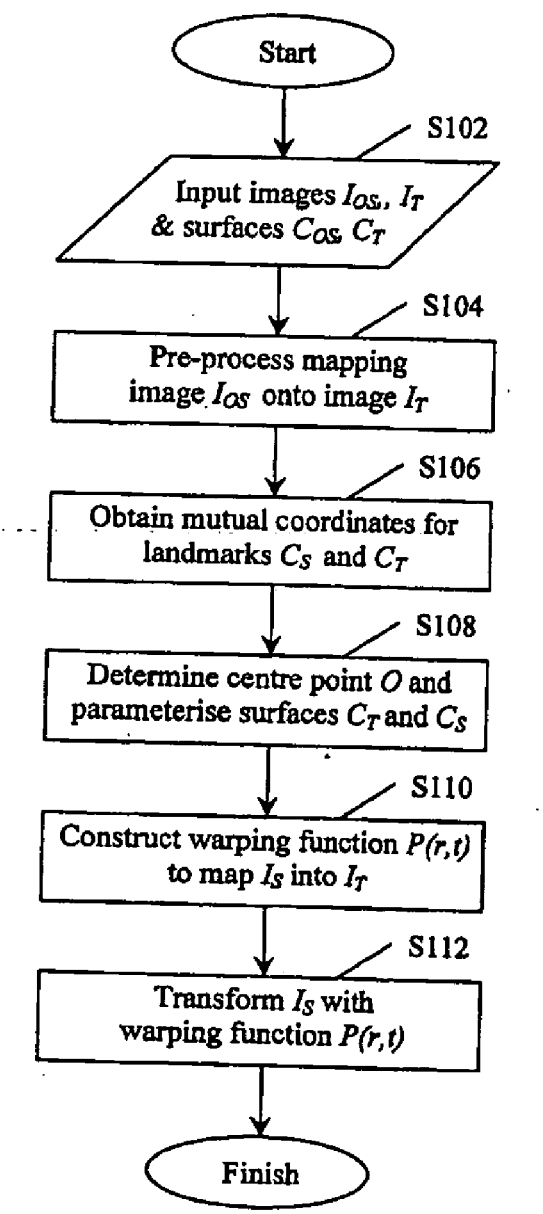
Figure 5A:
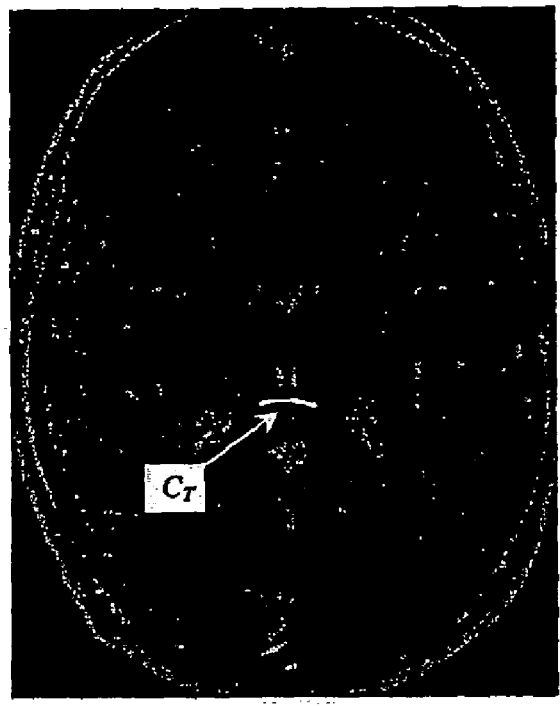
Figure 6A:
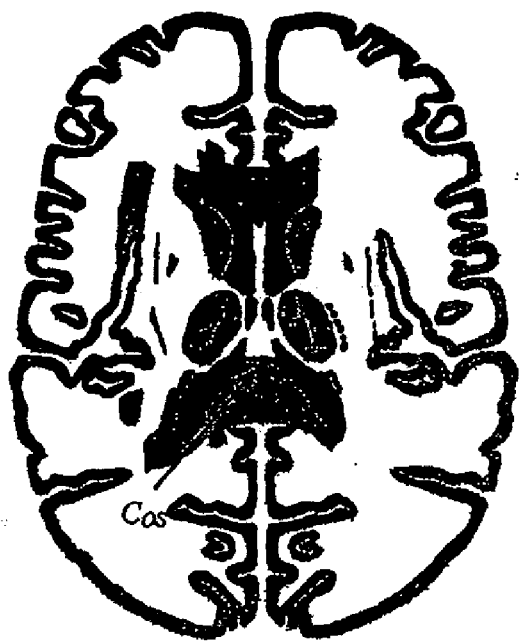
Figure 5B:
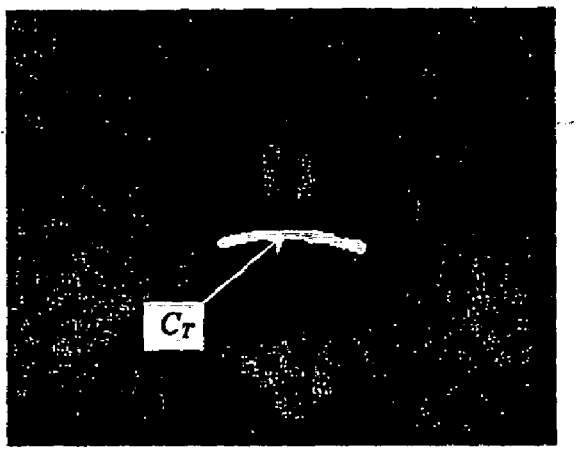
Figure 6B:
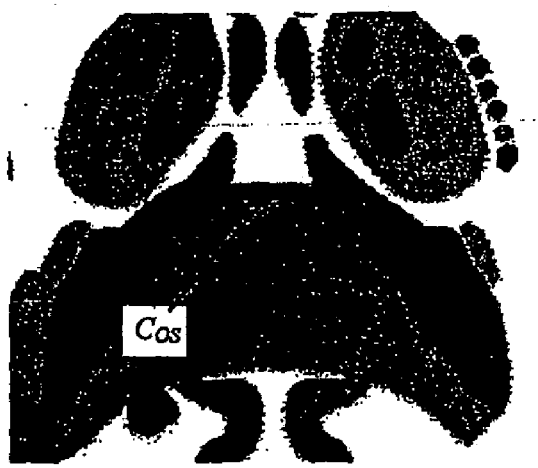

The invention will be further described by way of example only and without intending to be limiting with reference to the following drawings, wherein:

Figure 1 is an algorithm showing the method of the invention,

Figure 2 is a plot showing a normalized energy or entropy measure the three directions, Figure 3 is a plot showing the variation of normalized measure in the sagittal direction and its corresponding slices, Figure 4A shows the projection of the mid-sagittal plane on axial slices obtained by energy measure, Figure 4B shows the projection of the mid-sagittal plane on axial slices obtained by an entropy measure, Figure 5A shows the projection of the mid-sagittal plane on coronal slices obtained by an energy measure, Figure 5B shows the projection of the mid-sagittal plane on coronal slices obtained by an entropy measure, Figures 6A and 6B are plots showing responses of various measures in the sagittal direction, Figure 7A shows the starting slice for optimization, Figure 7B shows the final mid-sagittal plane obtained by using an entropy measure in Nelder-Mead optimization, Figure 7C shows the final mid-sagittal plane obtained by using an energy measure in Nelder-Mead optimization, Figure 8A shows the starting slice for optimization, Figure 8B shows the final mid-sagittal plane obtained by using an entropy measure in Nelder-Mead optimization, and Figure 8C shows the final mid-sagittal plane obtained by using an energy measure in Nelder-Mead optimization.

Figure 9A shows the MSP obtained from a volume with noise.

Figure 9B shows the MSP obtained from a volume with RF Inhomogeneity.

Figure 9C shows the MSP obtained from a volume with Partial Volume.

Figure 10 A shows MSP on the axial slice of a volume data which has artefacts.

Figure 10B shows the MSP obtained from a volume data which has artefacts.

Figure 11 shows the MSP obtained from a volume data which has artefacts.

Figure 12 shows the MSP on axial slice of a volume with head tilt during the MRI procedure and with artefacts present.

Figure 13 shows MSP on a Computed Tomography axial slice image.

Figure 14 shows MSP on an axial slice image of a volume with stereotactic surgery frame artefacts.

Figure 15 shows MSP obtained from a volume which was artificially tilted to test the robustness of the algorithm.

Figure 16 shows MSP on axial slice and MSP obtained from a volume without artefacts.

Figure 17 shows MSP on axial slice and MSP obtained from a Proton Density weighted scan.

Figure 18 shows MSP on axial slices of two different volumes with large space occupying lesions.

DETAILED DESCRIPTION OF THE INVENTION

Figure 1 is a flow chart showing the steps in the method of extraction of the mid-sagittal plane. In step 1 brain volume data is read into a processor. The brain volume data may be MR data or any other image data that is provided in slices. If the image data is not provided in slices then the image data must be provided in a form that can be rearranged into slices. The initial volume can be either isotropic or anisotropic. The data is arranged as slices in each of three orthogonal dimensions, for example labeled X, Y and Z. The number of slices in the X direction is labeled $X_{max}$, the number of slices in the Y direction is labeled $Y_{max}$, and the number of slices in the Z direction is labeled $Z_{max}$. It should be noted that there may be a different number of slices in each direction.

In step 2 a volume of interest is defined about the mid slices in all three directions X, Y, and Z. It is assumed that the mid-sagittal plane will pass through the centre of the image and therefore the volume of interest. This will always be true if the brain scan is of the whole of the brain.

The volumes of interest can be defined by defining the mid slices in the X, Y, and Z directions as mid_x, mid_y and mid_z respectively. The three volumes of interest in each direction can then be defined using the initial and final slices:

Init_x = mid_x - 20mm, Final_x = mid_x + 20mm;
Init_y = mid_y - 20mm, Final_y = mid_y + 20mm;
Init_z = mid_z - 20mm, Final _z = mid_z + 20mm;

The three volumes of interest in the three directions are:
VOI x=(slices with the x-coordinates from Init_x to Final_x, All Slices in Y & Z direction)
VOI y=(slices with y-coordinate from Init_y to Final_y, All slices in X & Z direction),
VOI_z=(slices with z-coordinate from Init_z to Final_z, All Slices in X & Y direction) from the volume data.

It should be noted that while a volume of 40mm has been chosen in each direction because in the sagittal direction the head shape does not change a lot in this range. The range is by way of example only and any suitable volume range can be chosen.

In step 3 an entropy or energy measure is calculated for each slice in every direction in the volume of interest. Examples of energy measures are $$I = -\sum_{i,j} x_{ij},$$

$$I = -\sum_{i,j} x_{ij} \log(x_{ij}),$$

$$I = -\sum_{i,j} x_{ij}^2,$$

$$I = -\sum_{i,j} x_{ij}^2 \log x_{ij}^2,$$

$$I = -\sum_{i,j} x_{ij}^3.$$

Linear combinations of the above energy measures may also be used. The above energy measures only show measurement in the X direction but can also be used for measurement in the Y and Z directions by substituting Y and Z for X. These measurements measure an energy for each slice where $x_{ij}$ is the intensity of the pixel at the location (i,j) within the slice and i,j represents the row and column index of the pixel within the slice. These energy measures produce a single value for each slice in the X, Y and Z directions.

Examples of entropy measures are $$I(p_i) = \sum_{i=0}^{255} p_i \log(p_i) \quad \text{(Shannon)}$$

$$I(p_i / p_{i0}) = \sum_{i=0}^{255} p_i \log(p_i / p_{i0}) \quad \text{(Kullback-Leibler)}$$

The above entropy measures are measures of a slice where $p_i$ is a probability for the current slice of the pixels with intensity $i$ and $p_{i0}$ is the probability for the reference slice of pixels with the intensity $i$ (where the intensity ranges between 0 and 255). The entropy measure is summed over the range of intensity values, in the equations given there are 256 intensity values. The reference slice may be the Initial slice in every direction. These entropy measures produce a single value for each slice in the X, Y and Z directions.

Once energy or entropy values have been found for each slice in each direction the values are normalized in each direction between zero and one as shown in step 4 of Figure 1. Figure 2 shows a normalized plot for slices in three dimensions with each dimension plotted on a separate graph. The normalized measure plot has a bell shaped curve only in the sagittal direction and a peak close to the mid-sagittal slice. In this way a coarse estimate of the mid-sagittal plane can be made from the three plots. In other embodiments the energy or entropy values are not normalized before being plotted. If the plots are normalized the normalization function must be an increasing function to preserve the maximum in the data. (An increasing function is one in which the bigger the value of the argument the bigger the value of that function.)

Figure 3 shows a bell shaped curve in the sagittal direction along with slices in the sagittal direction. The slice at which the peak of the bell shaped curve occurs forms the first estimate of the mid-sagittal plane and is labeled the initial mid-sagittal plane as shown in step 5 of Figure 1. The slice at which the peak occurs is now labeled N for convenience.

Now the slice of the initial mid-sagittal plane is a slice in one of the three directions (considered for convenience to be the X direction). The four corner points of the slice can be represented as:

$P1(x, y, z) = (N, 1, 1)$ $P2(x, y, z) = (N, 1, Z_{max})$ $P3(x, y, z) = (N, Y_{max}, 1)$ $P4(x, y, z) = (N, Y_{max}, Z_{max})$ In step 6 the initial mid-sagittal plane is used as the starting plane for further optimization. The coordinates of the initial mid-sagittal plane set out above are used as the input parameters for the optimization process. This optimization problem can be formed as an unconstrained optimization. Techniques that can be used to solve this optimization problem include the grid free algorithm of Nelder-Mead, exhaustive search and unconstrained optimization techniques available in Matlab™. One example of an optimization function that may be used to obtain a better estimate of the mid-sagittal plane from the first estimate is Nelder-Mead optimization. This method is commonly used in non-linear regression problems. The Nelder-Mead optimization works with a number of rules.

The starting point is used to construct a simplex, a shape with m+1 points, where m is the number of parameters. Thus for a two parameter problem there are three points, a triangle. The method calculates the objective function at each vertex of the simplex.

The Rules include:

Reflect the point with the highest value of objective function through centroid (center) of the simplex. If this produces the lowest value of objective function (best point) expand the simplex and reflect further. If this is just a good point start at the top and reflect again. If this the highest value of objective function (worst point) compress the simplex and reflect closer.

These rules are repeated until the convergence criteria are meet.

Part of the optimization includes plane rotation and translation to find the maximum value of the energy or entropy measure. This rotation and translation means that information on the pitch angle of the head is not required.

Figure 4A shows the projection of the mid-sagittal plane on axial slices obtained using one of the energy measures outlined above. Figure 4B shows the projection of the mid-sagittal plane on axial slices obtained by the Kullback-Leibler entropy measure outlined above.

Figure 5A shows the projection of the mid-sagittal plane on coronal slices obtained using one of the energy measures outlined above. Figure 5B shows the projection of the mid-sagittal plane on coronal slices obtained by the Kullback-Leibler entropy measure outlined above.

Figures 6A and 6B show responses of various energy and entropy measures in the sagittal direction. As can be seen from these plots each of the energy and entropy measures produces a peak in the curve at about the same slice or within two slices. These measures therefore all provide good starting points for the optimization algorithm the extract the mid-sagittal plane. In Figures 6A and 6B, Blue line represents Kullback-Leibler entropy measure, Red line represents the log weighted energy measure $I = -\sum_{i,j} x_{ij}^2 \log x_{ij}^2$, Black line represents the energy measure $I = -\sum_{i,j} x_{ij}^2$, Green line represents Shannon entropy measure and Cyan line represents the energy measure $I = \sum_{i,j} x_{ij}^2 - \left(\sum_{i,j} x_{ij}\right)^2$. Figures 7A to C and 8A to C show the starting slice for optimization in Figures 7A and 8A and the final mid-sagittal plane obtained using the Kullback-Leibler measure in Nelder-Mead optimization in Figures 7B and 8B and the final mid-sagittal plane obtained using an energy measure in Nelder-Mead optimization in Figures 7C and 8C. MRI is marred by the noise inherent to the procedure. The noise can occur due to various reasons. One type of noise is the statistical noise that is random and of high frequency. This noise is higher as the signal strength or the acquisition time is less (Fig 9a). Another source of this noise comes from the electronics of the system and can be due to thermal effects. Another type of noise is due to the physical structure of the coils. This is the RF inhomogeneity noise and occurs due to many physical factors affecting the magnetization field (Fig. 9b). Partial volume averaging (Fig. 9c) can also be considered as a type of noise and becomes more dominant as the slice thickness increases.

The Figures (10 to 18) and results obtained shows that the method of the invention provides an accurate method for determining the mid-sagittal plane in different brain scans. It also confirms the robustness of the algorithm as it was tested on a variety of cases.

The foregoing describes the invention including preferred forms thereof. Alterations and modifications as will be obvious to those skilled in the art are intended to be incorporated in the scope hereof as defined by the accompanying claims.

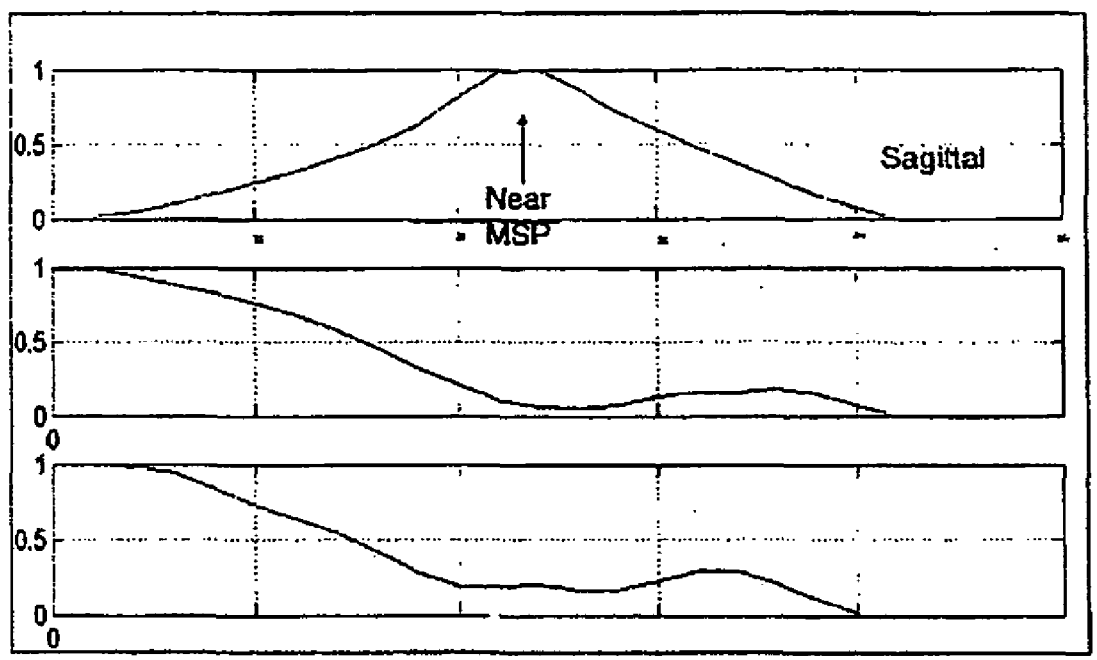
Fig. 2 Normalized energy curve across the slices in each direction.
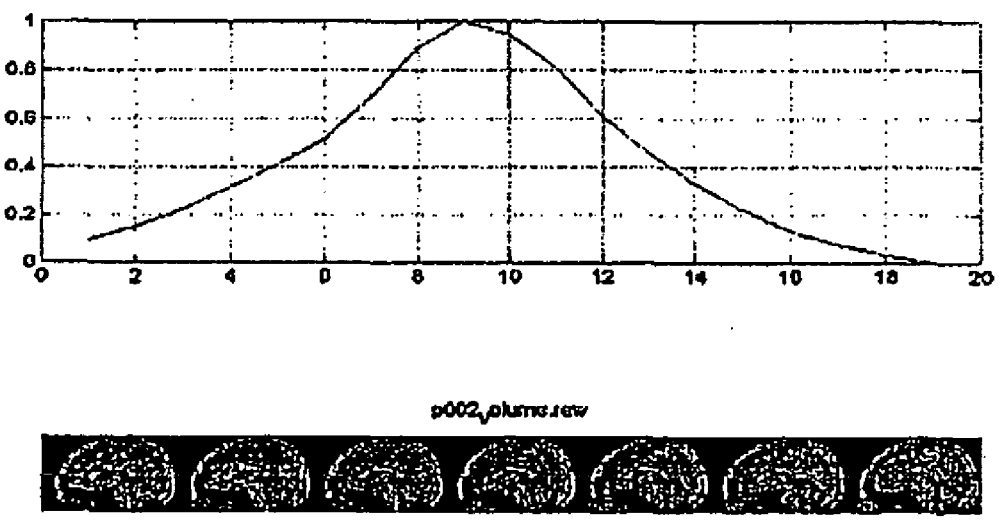
Fig. 3 Plot showing the variation of normalized measure in the sagittal direction and its corresponding slices

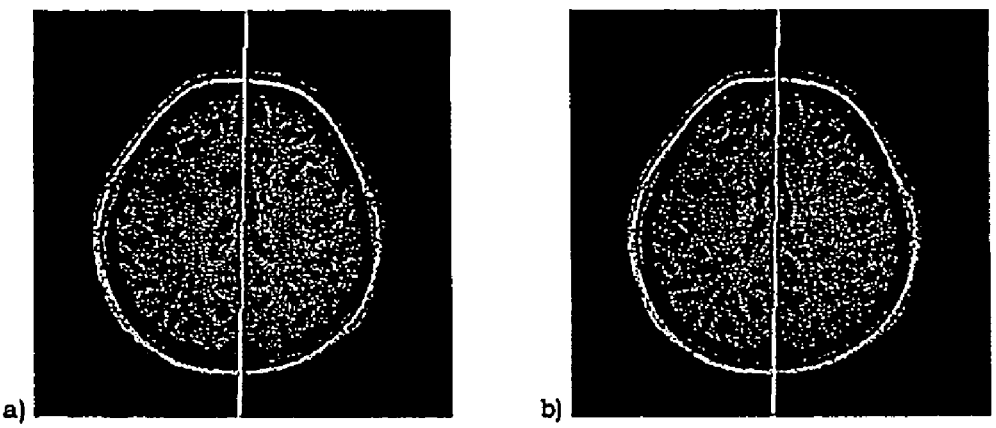
Fig 4 Projection of MSP on axial slices obtained by (a) Energy measure 1 (b) KL-measure
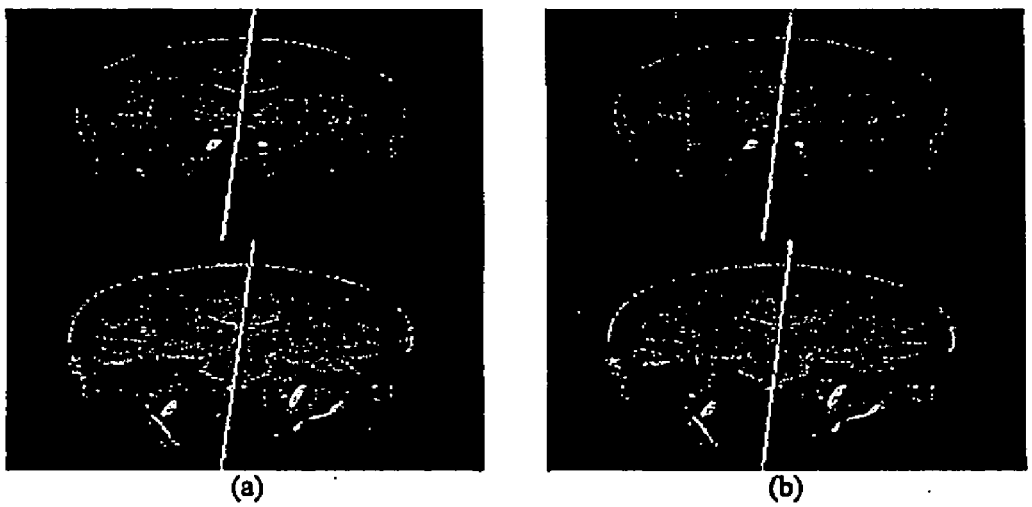
Fig 5 Projection of MSP on coronal slices obtained by (a) Energy measure 1 (b) KL-measure

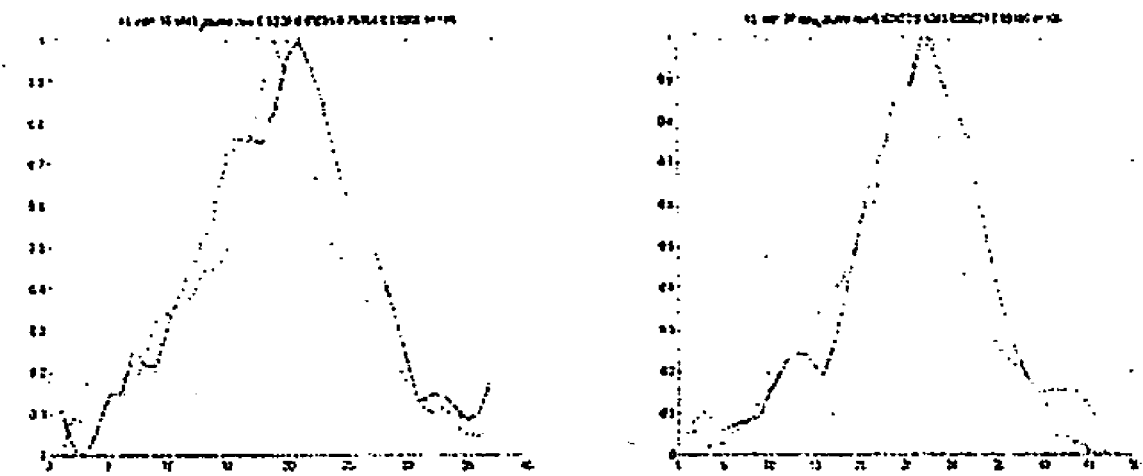
Fig 6 Plots showing responses of various measures in the sagittal direction Index:
Blue- KL,
Red – Log weighted energy $I = -\sum_{i,j} x_{ij}^2 \log x_{ij}^2$,
Black - Energy $I = -\sum_{i,j} x_{ij}^2$,
Green- Shannon entropy and
Cyan - $I = \sum_{i,j} x_{ij}^2 - \left(\sum_{i,j} x_{ij}\right)^2$

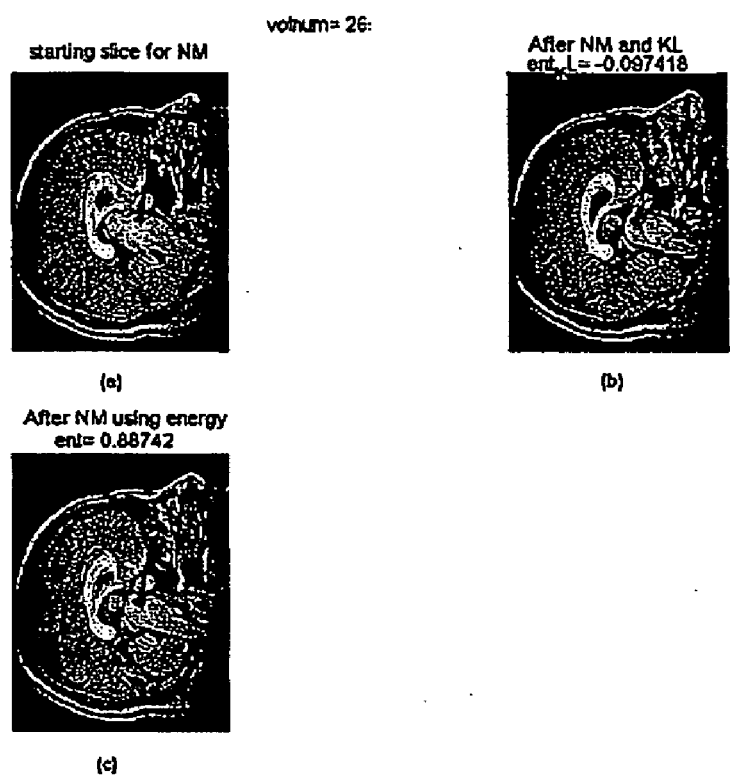
Fig 7 (a) Starting slice for optimization; (b) Final MSP obtained by using KL measure in Nelder-Mead optimization; (c) Final MSP obtained by using energy measure in Nelder-Mead optimization

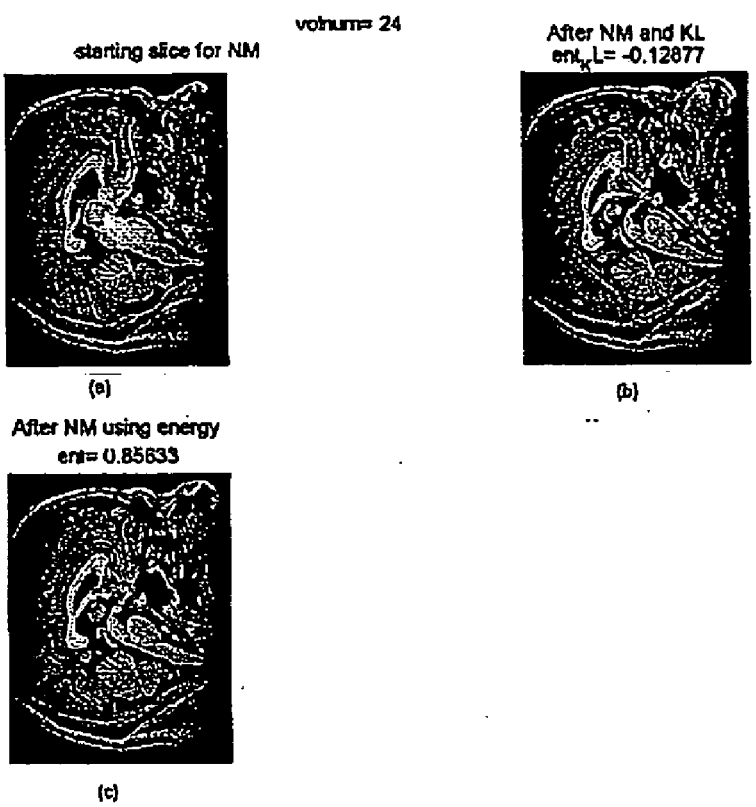
Figure 8 (a) Starting slice for optimization; (b) Final MSP obtained by using KL measure in Nelder-Mead optimization; (c) Final MSP obtained by using energy measure in Nelder-Mead optimization
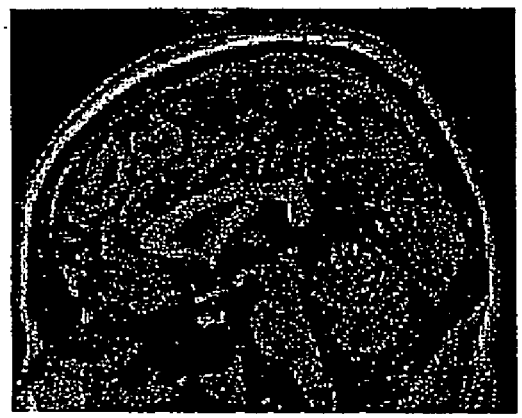
Fig. 9a Noise Case
Fig. 9b RF Inhomogeneity

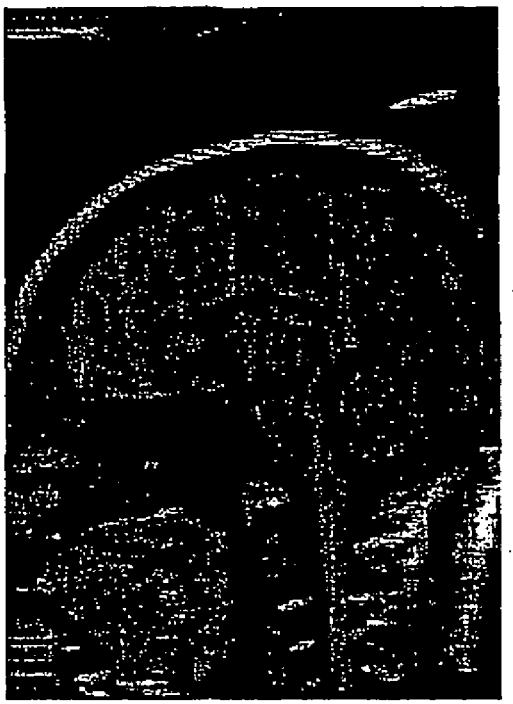
Fig. 9c Partial volume
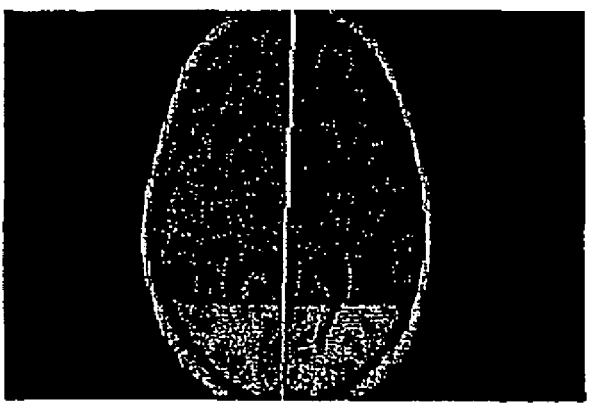
Fig. 10 a  MS Plane shown on an axial slice
Fig. 10b MSP obtained
Fig. 11 MSP obtained from a volume where artifacts are present

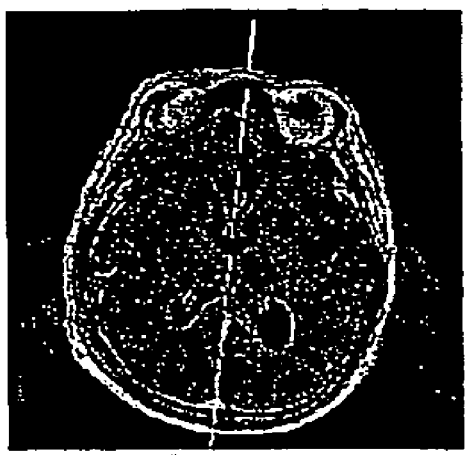
Fig. 12 Head tilt during MRI procedure and artifacts.
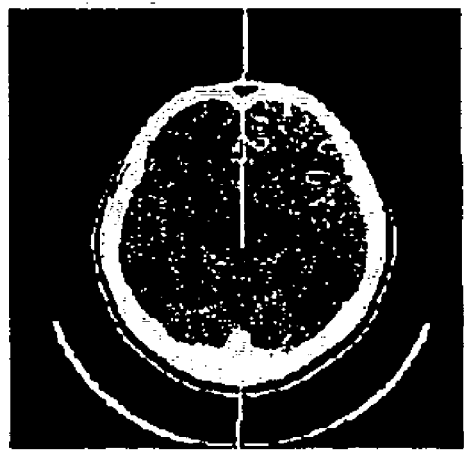
Fig 13. A Computed Tomography Image in which MSP is found.
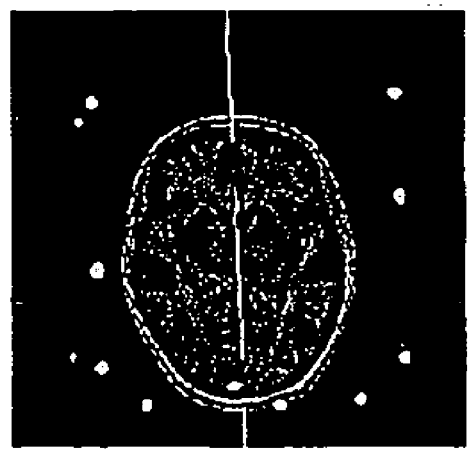
Fig 14. Artifacts due to stereotactic surgery frame

Fig 15. Head tilt produced on the image to test the robustness of the algorithm.
Fig 16. Axial slice with MSP and MS Plane
Fig.17 Axial slice showing MSP and MSP obtained from Proton Density weighted Scan

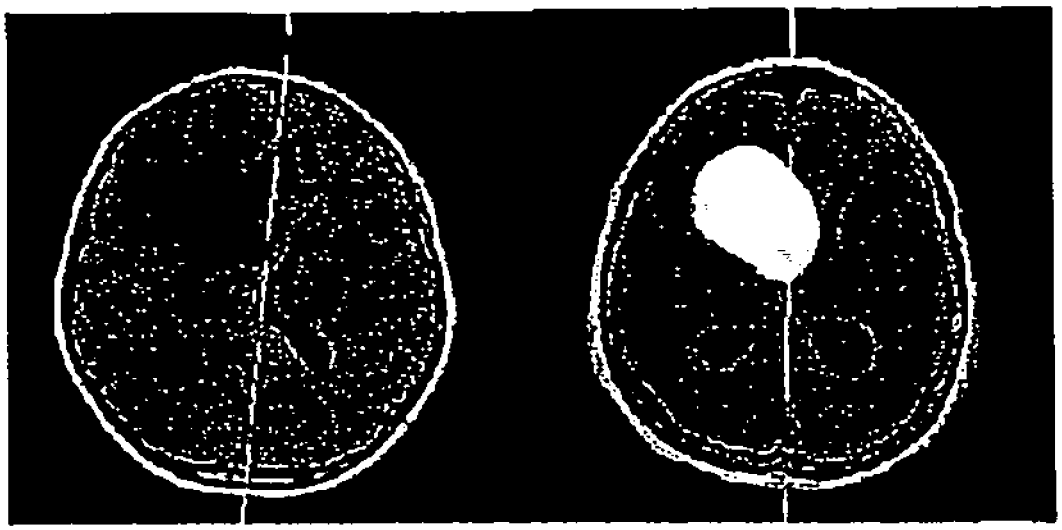
Fig 18 showing two large space occupying lesions in brain.

Appendix B

Fitzgibbon A., Pilu M., Fisher R. *Direct least-square fitting of Ellipses*, IEEE Transactions on Pattern Analysis and Machine Intelligence, 21(5), 476--480, May 1999

Direct Least Square Fitting of Ellipses

Andrew Fitzgibbon, Maurizio Pilu, and Robert B. Fisher

Abstract—This work presents a new efficient method for fitting ellipses to scattered data. Previous algorithms either fitted general conics or were computationally expensive. By minimizing the algebraic distance subject to the constraint $4ac - b^2 = 1$, the new method incorporates the ellipticity constraint into the normalization factor. The proposed method combines several advantages: It is ellipse-specific, so that even bad data will always return an ellipse. It can be solved naturally by a generalized eigensystem. It is extremely robust, efficient, and easy to implement.

Index Terms—Algebraic models, ellipse fitting, least squares fitting, constrained minimization, generalized eigenvalue problem.

✦

1 INTRODUCTION

THE fitting of primitive models to image data is a basic task in pattern recognition and computer vision, allowing reduction and simplification of the data to the benefit of higher level processing stages. One of the most commonly used models is the ellipse which, being the perspective projection of the circle, is of great importance for many industrial applications. Despite its importance, however, there has been until now no computationally efficient ellipse-specific fitting algorithm [14], [5].

In this paper, we introduce a new method for fitting ellipses, rather than general conics, to segmented data. As we shall see in the next section, current methods are either computationally expensive iterative approaches, or perform ellipse fitting by least-squares fitting to a general conic and rejecting non-elliptical fits. These latter methods are cheap and perform well if the data belong to a precisely elliptical arc with little occlusion but suffer from the major shortcoming that under less ideal conditions—nonstrictly elliptical data, moderate occlusion or noise—they often yield unbounded fits to hyperbolae. In a situation where ellipses are specifically desired, such fits must be rejected as useless. A number of iterative refinement procedures [16], [8], [12] alleviate this problem, but do not eliminate it. In addition, these techniques often increase the computational burden unacceptably.

This paper introduces a new fitting method that combines the following advantages:

1) ellipse-specificity, providing useful results under all noise and occlusion conditions;
2) invariance to affine transformation of the data;
3) high robustness to noise; and
4) high computational efficiency.

After a description of relevant previous ellipse fitting methods, in Section 3 we describe the method and provide a theoretical analysis of the uniqueness of the elliptical solution. Section 4 contains experimental results, notably to highlight behavior with

---

- *A. Fitzgibbon is with the Department of Engineering Science, University of Oxford, 19 Parks Road, Oxford, OX1 3BJ, England.*
  *E-mail: awf@robots.ox.ac.uk.*
- *M. Pilu is with Hewlett-Packard Research Laboratories, Filton Road, Stoke Gifford, Bristol, BS12 6QZ, England. E-mail: mp@hplb.hpl.hp.com.*
- *R.B. Fisher is with the Division of Informatics, University of Edinburgh, 5 Forrest Hill, Edinburgh, EH1 2QL, United Kingdom.*
  *E-mail: rbf@dai.edinburgh.ac.uk.*

*Manuscript received 4 Jan. 1999. Recommended for acceptance by R. Chin.*
*For information on obtaining reprints of this article, please send e-mail to: tpami@computer.org, and reference IEEECS Log Number 107704.* nonelliptical data, low-eccentricity bias, and noise resilience. We conclude by presenting some possible extensions.

2 PREVIOUS METHODS AND THEIR LIMITATIONS

The literature on ellipse fitting divides into two broad techniques: clustering (such as Hough-based methods [9], [19]) and least-squares fitting.

Least-squares techniques center on finding the set of parameters that minimize some distance measure between the data points and the ellipse. In this section, we briefly present the most cited works in ellipse fitting and its closely related problem, conic fitting. It will be shown that the direct specific least-square fitting of ellipses has, up to now, not been solved.

Before reviewing the literature on general conic fitting, we will introduce a statement of the problem that allows us to unify several approaches under the umbrella of constrained least squares. Let us represent a general conic by an implicit second order polynomial:

$$F(\mathbf{a}, \mathbf{x}) = \mathbf{a} \cdot \mathbf{x} = ax^2 + bxy + cy^2 + dx + ey + f = 0, \quad (1)$$

where $\mathbf{a} = [a\ b\ c\ d\ e\ f]^T$ and $\mathbf{x} = [x^2\ xy\ y^2\ x\ y\ 1]^T$. $F(\mathbf{a}; \mathbf{x}_i)$ is called the "algebraic distance" of a point $(x, y)$ to the conic $F(\mathbf{a}; \mathbf{x}) = 0$. The fitting of a general conic may be approached by minimizing the sum of squared algebraic distances $$\mathcal{D}_A(\mathbf{a}) = \sum_{i=1}^{N} F(\mathbf{x}_i)^2 \quad (2)$$

of the curve to the $N$ data points $x_i$ [7]. In order to avoid the trivial solution $\mathbf{a} = \mathbf{0}_6$, and recognizing that any multiple of a solution $\mathbf{a}$ represents the same conic, the parameter vector $\mathbf{a}$ is constrained in some way. Many of the published algorithms differ only in the form of constraint applied to the parameters. For instance, many authors suggest $\|\mathbf{a}\|^2 = 1$. Rosin [14] and Gander [5] impose $a + c = 1$ while Rosin also investigates $f = 1$ [14]. Taubin's approximate square distance [17] may also be viewed as the quadratic constraint $\|\nabla \mathbf{a}\|^2 = 1$ where $N$ is the Jacobian $[\nabla F(\mathbf{a}; \mathbf{x}_1) \ldots \nabla F(\mathbf{a}; \mathbf{x}_N)]^T$.

Note that these constraints are all either linear, of the form $\mathbf{c} \cdot \mathbf{a} = 1$ or quadratic, constraining $\mathbf{a}^T C \mathbf{a} = 1$ where $C$ is a $6 \times 6$ constraint matrix.

In a seminal work, Bookstein [1] showed that if a quadratic constraint is set on the parameters (e.g., to avoid the trivial solution $\mathbf{a} = \mathbf{0}_6$) the minimization (2) can be solved by considering rank-deficient generalized eigenvalue system:

$$D^T D \mathbf{a} = \lambda C \mathbf{a}, \quad (3)$$

where $D = [\mathbf{x}_1\ \mathbf{x}_2\ \cdots\ \mathbf{x}_n]^T$ is called the design matrix and $C$ is the matrix that expresses the constraint.

A simple constraint is $\|\mathbf{a}\| = 1$ but Bookstein used the algebraic invariant constraint $a^2 + \frac{1}{2}b^2 + c^2 = 1$; Sampson [16] presented an iterative improvement to Bookstein method that replaces the algebraic distance (2) with a better approximation to the geometric distance, which was adapted by Taubin [17] to turn the problem again into a generalized eigensystem.

Despite the amount of work, direct specific ellipse fitting, however, was left unsolved. If ellipse fitting was needed, one had to rely either on generic conic fitting or on iterative methods to "nudge" the estimation towards ellipticity. For instance, Porrill [12], Ellis et al. [2], and Rosin [14] use conic fitting to initialize a Kalman filter that iteratively minimizes some error metric in order to gather new image evidence and to reject nonellipse fits by testing the discriminant $b^2 - 4ac < 0$ at each iteration. Another iterative algorithm is that of Haralick [7, Section 11.10.7], where the coefficients $(a, b, c)$ are transformed into $(p^2, 2pq, q^2 + r^2)$ so as to keep the conic discriminant always negative. A nonlinear minimization of the algebraic error over the space $(p, q, r, d, e, f)$ is performed.

In this journal, Rosin [15] reiterated this problem by stating that ellipse-specific fitting is essentially a nonlinear problem and iterative methods must always be employed for this purpose. In the following section, we show that this is no longer true.

3 DIRECT ELLIPSE-SPECIFIC FITTING

In order to fit ellipses specifically while retaining the efficiency of solution of the linear least-squares problem (2), we would like to constrain the parameter vector $\mathbf{a}$ so that the conic that it represents is forced to be an ellipse. The appropriate constraint is well known, namely, that the discriminant $b^2 - 4ac$ be negative. However, this constrained problem is difficult to solve in general as the Kuhn-Tucker conditions [13] do not guarantee a solution. In fact, we have not been able to locate any reference regarding the minimization of a quadratic form subject to such a nonconvex inequality.

Although the imposition of this inequality constraint is difficult in general, in this case we have the freedom to arbitrarily scale the parameters so we may simply incorporate the scaling into the constraint and impose the equality constraint $4ac - b^2 = 1$ [4]. This is a quadratic constraint which may be expressed in the matrix form $\mathbf{a}^T C \mathbf{a} = 1$ as $$\mathbf{a}^T \begin{bmatrix} 0 & 0 & 2 & 0 & 0 & 0 \\ 0 & -1 & 0 & 0 & 0 & 0 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \mathbf{a} = 1. \quad (4)$$

Now, following Bookstein [1], the constrained ellipse fitting problem reduces to minimizing $E = \|D\mathbf{a}\|^2$ subject to the constraint $\mathbf{a}^T C \mathbf{a} = 1$ (5)

where the design matrix $D$ is defined as in the previous section.

Introducing the Lagrange multiplier $\lambda$ and differentiating, we arrive at the system of simultaneous equations[1]

$$2D^T D \mathbf{a} - 2\lambda C \mathbf{a} = 0$$
$$\mathbf{a}^T C \mathbf{a} = 1 \quad (6)$$

This may be rewritten as the system $$S \mathbf{a} = \lambda C \mathbf{a} \quad (7)$$

$$\mathbf{a}^T C \mathbf{a} = 1 \quad (8)$$

where $S$ is the scatter matrix $D^T D$. This system is readily solved by considering the generalized eigenvectors of (7). If $(\lambda_i, \mathbf{u}_i)$ solves (7), then so does $(\lambda_i, \mu \mathbf{u}_i)$ for any $\mu$ and from (8) we can find the value of $\mu_i$ as $\mu_i^2 \mathbf{u}_i^T C \mathbf{u}_i = 1$, giving $$\mu_i = \sqrt{\frac{1}{\mathbf{u}_i^T C \mathbf{u}_i}} = \sqrt{\frac{1}{\mathbf{u}_i^T S \mathbf{u}_i}}. \quad (9)$$

Finally, setting $\hat{\mathbf{a}}_i = \mu_i \mathbf{u}_i$ solves (6).

We note that the solution of the eigensystem (7) gives six eigenvalue-eigenvector pairs $(\lambda_i, \mathbf{u}_i)$. Each of these pairs gives rise to a local minimum if the term under the square root of (9) is positive. In general, $S$ is positive definite, so the denominator $\mathbf{u}_i^T S \mathbf{u}_i$ is positive for all $\mathbf{u}_i$. Therefore, the square root exists if $\lambda_i > 0$, so any solutions to (6) must have positive generalized eigenvalues.

Now we show that the minimization of $\|D\mathbf{a}\|^2$ subject to $4ac - b^2 = 1$ yields exactly one solution, which corresponds, by virtue of the constraint, to an ellipse [11]. For the demonstration, we will require Lemma 1.

---

1. Note that the method of Lagrange multipliers is not valid when the gradient of the constraint function becomes zero. In (5), this means $C\mathbf{a} = 0$, but then $\mathbf{a}^T C \mathbf{a} = 0$, so the constraint is violated and there is no solution.

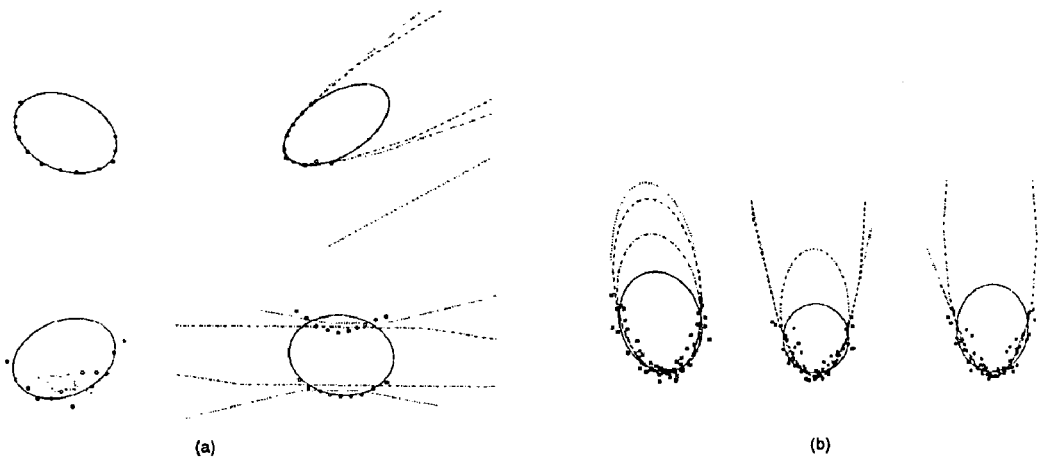

Fig. 1. (a) Fits to hand-input data to illustrate the ellipse specificity of the method. (b) Experiments with noisy parabolic data (after Sampson). Encoding is BOOK: dotted; GAND: dashed; TAUB: dash-dot; B2AC: solid.

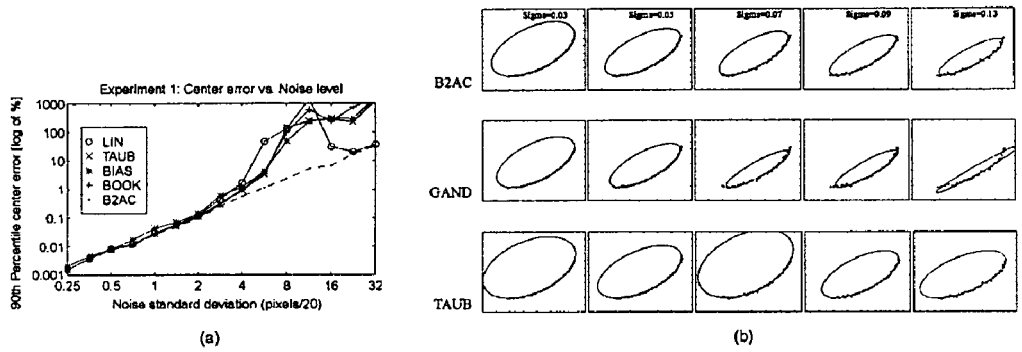

Fig. 2. (a) Variation of center position for increasing noise level when fitting to a whole ellipse. (b) Fits to arc of ellipse with increasing noise level. Notice how B2AC presents a much more graceful degradation with respect to noise.

LEMMA 1. *The signs of the generalized eigenvalues of* $Su = \lambda Cu$, *where* $S \in \Re_{n \times n}$ *is positive definite and* $C \in \Re_{n \times n}$ *is symmetric, are the same as those of the constraint matrix* $C$, *up to permutation of the indices.*

PROOF. Let us define the *spectrum* $\sigma(S)$ as the set of eigenvalues of $S$ and, analogously, $\sigma(S, C)$ the set of generalized eigenvalues of (7). Let the *inertia* $i(S)$ be defined as the set of signs of $\sigma(S)$, and let $i(S, C)$ analogously be the inertia of $\sigma(S, C)$. Then, the lemma is equivalent to proving that $i(S, C) = i(C)$. As $S$ is positive definite, it may be decomposed as $Q^t$ for symmetric $Q$, allowing us to write $Su = \lambda Cu$ as $Q^t u = \lambda Cu$. Now, substituting $v = Qu$ and premultiplying by $Q^{-t}$ gives $v = \lambda Q^{-t}CQ^{-1}v$ so that $\sigma(S, C) = \sigma(Q^{-t}CQ^{-1})^{-1}$ and thus $i(S, C) = i(Q^{-t}CQ^{-1})$. From Sylvester's Law of Inertia [18], we have that for any symmetric and nonsingular $X$, $i(S) = i(X^T SX)$. Therefore, substituting $X = X^T = Q^{-1}$, we have $i(C) = i(Q^{-t}CQ^{-1}) = i(S, C)$. □

We can now state Theorem 1.

THEOREM 1. *The solution of the conic fitting problem* (5) *subject to the constraint* (4) *admits exactly one elliptical solution corresponding to the single positive generalized eigenvalue of* (7).

PROOF. Since the eigenvalues of $C$ are $\{-2, -1, 2, 0, 0, 0\}$, from Lemma 1 we have that (7) has *exactly one* positive eigenvalue $\lambda$, $> 0$, giving the unique solution $\hat{a} = \mu_i u_i$ to (6). As $D^t D$ is positive semidefinite, the constrained problem has a minimum, which must satisfy (6), and we conclude that $\hat{a}$ solves the constrained problem. □

This unique solution has also some desirable properties in ellipse fitting:

- low eccentricity bias: An eigenvector of the eigensystem (7) is a local minimizer of the Rayleigh quotient $\frac{a^T S a}{a^T C a}$. In this case, the implicit normalization by $b^2 - 4ac$ turns singular for $b^2 - 4ac = 0$, which is a parabola. Since the minimization tends to "pull" the solution away from singularities [14], the unique elliptical solution tends to be biased towards low eccentricity.

- affine invariance: Let us represent the conic as $x^T Ax + x^T b + c = 0$. Under an affine transform $H$ the leading form becomes $A' = H^T AH$, so that $|A'| = |H|^2 |A|$. Being the Rayleigh quotient that we minimize $\frac{a^T S a}{|A|}$, the new error measure is a

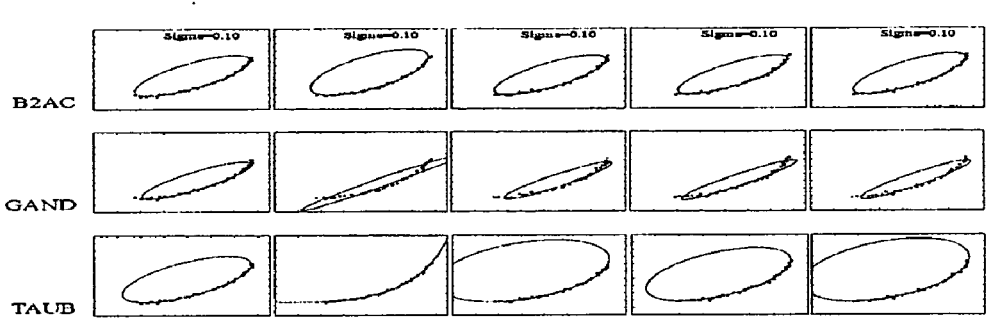

Fig. 3. Stability experiments for different runs with same noise variance (10% of data spread). The ellipse-specific method shows a remarkable stability.

scalar multiple of the original one and thus the new minimizer is transformed by $H$, which proved the affine invariance of the method.

4 EXPERIMENTAL RESULTS

This section describes some experiments that illustrate the interesting features of the new method and its noise performance compared to some of the least-squares fitting method reviewed in Section 2. In this short paper, we are not able to present a large body of results—which can be found in abundance in [3]—so we limited ourselves to those that are the most representative.

All experiments were conducted using the Matlab system [10]. Eigensystems are solved using the underlying EISPACK routines. We shall use the following abbreviations:

- LIN = linear method;
- BOOK = Bookstein method [1];
- TAUB = Taubin method [17];
- GAND = Gander method [5];
- BIAS = Kanatani bias-corrector method [8]; and finally
- B2AC = our new method.

4.1 Ellipse-Specificity

Despite the theoretical proof of the algorithm's ellipse specificity, it is instructive to observe its performance on some real data, of which Fig. 1a provides examples with hand-drawn datasets. The results of the method are superimposed on those of Bookstein and Gander. Dataset A is almost elliptical and indistinguishable fits were produced. The other sets exhibit varying degrees of nonellipticity and illustrate the potential of the method for coarse bounding of generic 2D data.

4.2 Low-Eccentricity Bias

Fig. 1b shows three experiments designed after Sampson [16] (following [6]) and basically consists of the same parabolic data but with different realizations of added isotropic Gaussian noise ($\sigma$ =

```
% x,y are vectors of coordinates
function a=fit_ellipse(x,y)
% Build design matrix
  D = [ x.*x x.*y y.*y x y ones(size(x)) ];
% Build scatter matrix
  S = D'*D;
% Build 6x6 constraint matrix
  C(6,6)=0; C(1,3)=-2; C(2,2)=1; C(3,1)=-2;
% Solve generalised eigensystem
  [gevec, geval] = eig(S,C);
% Find the only negative eigenvalue
  [NegR, NegC] = find(geval<0 & ~isinf(geval));
% Get fitted parameters
  a = gevec(:,NegC);
```

Fig. 4. Simple six-line Matlab implementation of the ellipse fitting method.

7% of data spread). Sampson's iterative fit produced an ellipse with low eccentricity that was qualitatively similar to the one produced by our direct method (solid lines) but the *total* cost of our method is the same as that of acquiring his initial estimate. As anticipated in the previous section, the low eccentricity bias of our method is most evident in Fig. 1b when compared to Bookstein's, Taubin's, and Gander's results. It must be again remarked that this is not surprising, because those methods are not ellipse-specific, whereas ours is.

4.3 Noise Sensitivity

In this section, we describe some experiments concerning the noise performance of our method compared to others.

The first experiment is concerned with the stability of the estimated ellipse center with increasing noise levels. We consider a whole ellipse centered at the origin of semi-axis 1 and 0.5 and rotated by 40 degrees. The sampled ellipse was corrupted with noise (from $2^{-3}$ to $2^3$) for 100 runs and the distance between the true ellipse center and the center of the conic returned by the fitting algorithm was recorded. Returned hyperbolae were included for the other algorithms. Fig. 2a shows the 90th percentile error in the centers as a function of noise level. At low noise levels ($\sigma < 0.5$), all algorithms can be seen to perform similarly, while at high levels, only the new (B2AC) algorithm degrades gracefully.

The good performance of the presented method is more evident when the data is occluded. In the second experiment, shown in Fig. 2b, increasing level of isotropic Gaussian was added to points on a given elliptical arc. The standard deviation of the noise varies from 3% in the leftmost column to 20% of data spread in the rightmost column; the noise has been set to a relatively high level because the performance of the three algorithms is substantially the same at low noise level of *precise* elliptical data. The top row shows the results for the method proposed here. Although, as expected, the fitted ellipses shrink with increasing levels of noise [8] (in the limit, the elliptical arc will look like a noisy line), it can be noticed that the ellipse dimension decreases smoothly with the noise level: This is an indication of well-behaved fitting. This shrinking phenomenon is evident also with the other methods but presents itself more erratically. Many more quantitative experiments on performance with occluded data can be found in [3].

The last experiment that we show here is perhaps the most interesting (although we have not seen it in related papers) and is concerned with assessing stability to *different realizations of noise* with the *same variance*. It is very desirable that an algorithm's performance be affected only by the noise level, and not by a particular realization of the noise. Fig. 3 shows five different runs for $\sigma$ = 0.1, and the results of our method, Gander's method, and Taubin's method are given. This and similar experiments (see [11], [3]) show that our method has a greater stability to noise than the other methods.

5 CONCLUSION

In this paper, we have presented a least squares fitting method which is specific to ellipses and direct at the same time. Previous methods were either not ellipse-specific or were iterative.

We have theoretically demonstrated that our method uniquely yields elliptical solutions that, under the normalization $4ac - b^2 = 1$, minimize the sum of squared algebraic distances from the points to the ellipse.

Experimental results illustrate the advantages conferred by the ellipse-specificity in terms of occlusion and noise sensitivity. The stability properties widen the scope of application of the algorithm from ellipse fitting to cases where the data are not strictly elliptical but need to be minimally represented by an elliptical "blob."

In our view, the method presented here offers the best trade-off between speed and accuracy for ellipse fitting, and its uniqueness property makes it also extremely robust to noise and usable in many applications, especially in industrial vision. In cases where more accurate results are required, this algorithm provides an excellent initial estimate.

Its simplicity is demonstrated by the inclusion in Fig. 4 of a complete six-line implementation in Matlab. (An interactive Java demonstration is available at http://vision.dai.ed.ac.uk/maurizp/ElliFitDemo/demo.html.)

Future work includes the incorporation of the algorithm into a bias-correction algorithm based on that of Kanatani [8]. We note also that the algorithm can be trivially converted to a hyperbola-specific fitter, and a variation may be used to fit parabolae.

REFERENCES

[1] F.L. Bookstein, "Fitting Conic Sections to Scattered Data," *Computer Graphics and Image Processing*, no. 9, pp. 56-71, 1979.
[2] T. Ellis, A. Abbood, and B. Brillault, "Ellipse Detection and Matching With Uncertainty," *Image and Vision Computing*, vol. 10, no. 2, pp. 271-276, 1992.
[3] A.W. Fitzgibbon, "Stable Segmentation of 2D Curves," PhD thesis, Dept. of Artificial Intelligence, Univ. of Edinburgh, 1998.
[4] A.W. Fitzgibbon and R.B. Fisher, "A Buyer's Guide to Conic Fitting," *Proc. British Machine Vision Conf.*, Birmingham, England, 1995.
[5] W. Gander, G.H. Golub, and R. Strebel, "Least-Square Fitting of Circles and Ellipses," *BIT*, no. 43, pp. 558-578, 1994.
[6] R. Gnanadesikan, *Methods for Statistical Data Analysis of Multivariate Observations*. New York: Wiley, 1977.
[7] R. Haralick and L. Shapiro, *Computer and Robot Vision*. Reading, Mass.: Addison-Wesley, 1992.
[8] K. Kanatani, "Statistical Bias of Conic Fitting and Renormalization," *IEEE Trans. Pattern Analysis and Machine Intelligence*, vol. 16, no. 3, pp. 320-326, 1994.
[9] V.F. Leavers, *Shape Detection in Computer Vision Using the Hough Transform*. New York: Springer-Verlag, 1992.
[10] The MathWorks. The Matlab Package.
[11] M. Pilu, "Part-Based Grouping and Recognition: A Model-Guided Approach," Dept. Artificial Intelligence, Univ. of Edinburgh, PhD thesis, Aug. 1996.
[12] J. Porrill, "Fitting Ellipses and Predicting Confidence Envelopes Using a Bias Corrected Kalman Filter," *Image and Vision Computing*, vol. 8, no. 1, pp. 37-41, Feb. 1990.
[13] S.S. Rao, *Optimization: Theory and Applications*, 2nd ed. New York: Wiley Estern, 1984.
[14] P.L. Rosin, "A Note on the Least Squares Fitting of Ellipses," *Pattern Recognition Letters*, no. 14, pp. 799-808, Oct. 1993.
[15] P.L. Rosin and G.A. West, "Nonparametric Segmentation of Curves Into Various Representations," *IEEE Trans. Pattern Analysis and Machine Intelligence*, vol. 17, no. 12, pp. 1,140-1,153, Dec. 1995.
[16] P.D. Sampson, "Fitting Conic Sections to Very Scattered Data: An Iterative Refinement of the Bookstein Algorithm," *Computer Graphics and Image Processing*, no. 18, pp. 97-108, 1982.
[17] G. Taubin, "Estimation of Planar Curves, Surfaces and Non-Planar Space Curves Defined by Implicit Equations, With Applications to Edge and Range Image Segmentation," *IEEE Trans. Pattern Analysis and Machine Intelligence*, vol. 13, no. 11, pp. 1,115-1,138, Nov. 1991.
[18] J.H. Wilkinson, *The Algebraic Eigenvalue Problem*. Oxford, England: Clarendon Press, 1965.
[19] H.K. Yuen, J. Illingworth, and J. Kittler, "Shape Using Volumetric Primitives," *Image and Vision Computing*, vol. 1, no. 7, pp. 31-37, 1989.

Appendix C

Ivanov N, A S Parimal, Nowinski WL, *Method and program for non-linear image warping based on specific class of radial functions*. PCT/SG2005/000420

Warping and Transformation of Images

Field of the Invention

The present invention relates to warping of images, in particular warping a source image onto a target image, based on specific landmark features, with the help of a modified radial basis function.

Background

Warping in image processing is a geometric routine that distorts an image by spatially compressing and stretching regions. The purpose of warping is to transform an image to a desired appearance.

A common problem in warping is to register an image to a different image with overlapping regions. For example, converting an image of a patient's brain to a standard brain image (brain atlas) is a problem of warping. Specific information is needed to transform one image to another one. Pairs of matching control features on images may be known. These features can either be points, open or closed curvilinear segments or surfaces. These features are referred to as landmarks and image mapping is called landmark warping.

A popular group of functions for warping of this kind are radial basis functions, as was proposed earlier by F. L. Bookstein in "Principal warps: thin-plate splines and decomposition of deformations", IEEE Transactions on Pattern Analysis and Machine Intelligence, Vol. 11, No. 6, pp. 567–585, 1989.

An example of an elementary radial basis function is:

$$f(r) = r^2 \log r^2 \qquad (1),$$

where variable $r$ stands for the distance between two points, one fixed and another varying. The fixed point is termed as a centre point $O$. The function is constant on a sphere of a fixed radius; this is the reason why such functions are referred to as "radial".

The radial basis function transforms one set of landmark points to a desired position. The number of landmarks must be finite. Let $(S^1, T^1), (S^2, T^2), \ldots, (S^N, T^N)$ be $N$ pairs of matching landmark points, where $S^i$ means the i-th point from amongst the source image points, and $T^i$ is i-th point from amongst the target image points. The map contains $N$ weighted elementary radial basis functions:

$$F_k(X) = \sum_{i=1}^{N} w_k^i f'(\|X - S^i\|) + C \cdot X + v \qquad (2).$$

An i-th term of the sum is a product of a constant weight $w_k^i$, $k = 1, \ldots, d$. Parameter $d$ stands for the dimension of the images, for the 2D case $d$ is equal to 2. The elementary radial basis function $f(x) = (f'(x), \ldots, f^d(x))$. $X$ is a varying point on the source image. The last two terms, $C \cdot X$ and $v$ terms provide mapping stabilization. The size of the matrix $C$ is $d \Box d$, and $v$ is $d \Box 1$ matrix.

The value of function $F(S^i)$ is assigned to be equal to $T^i$. This yields a system of linear equations. It is further assumed that the sum of all weights $w_k^i$ is zero for all $k$, and that the inner products of the weights $w_k^i$ with both x and y coordinates of the landmarks $S^i$ and $T^i$ are equal to zero. As a consequence, a system of simultaneous equations for finding values for the weights $w_k^i$ and the matrices $C$ and $v$ are obtained. In the 2D case the size of the system is 2*N + 6.

The above-described basic approach has been modified in various directions. F. L. Bookstein, in "Landmark methods for forms without landmarks: Morphometrics of group differences in outline shape", Medical Image Analysis, Vol. 1, No. 3, pp. 225-244, 1997, proposed correcting the positions of landmarks to reduce the binding energy. H. Chui and A. Rangarajan, in "A new algorithm for non-rigid point matching", IEEE Conference on Computer Vision and Pattern Recognition (CVPR), Vol. 2, No. 1, pp. 44-51, 2000, generalised a problem for different numbers of landmarks in the images. This approach adopted the idea from the assignment problem in the discrete mathematics domain. The objective function was extended with an assignment criterion, that is, with an expression of efficiency of matching a landmark $S^i$ with $T^j$. K. Rohr, M. Fornefett, H.S. Stiehl, in "Spline-based elastic image registration: integration of landmark errors and orientation attributes", Computer Vision and Image Understanding, Vol. 90. No. 2, pp. 153 – 168, 2003, proposed a procedure for preserving an angle with a given vertex point under radial basis transformation. N. Arad, N. Dyn, D. Reisfeld, and Y. Yeshurin, in "Image warping by radial basis functions: application to facial expressions", CVGIP: Graphical Models and Image Processing, Vol. 56, No. 2, pp. 161-172, 1994, use radial basis warping for facial expression correction. International patent application publication No. WO-A-01/01,346, published 4 January 2001 in the name of the University of Iowa Research Foundation, "Method and apparatus for generating consistent image registration", proposes using direct and inverse diffeomorphic mapping.

In general pre-existing warping techniques based on radial basis functions, the weights of terms contained in a warping function are calculated as the solution of simultaneous linear equations. However, a simultaneous linear equation system is an ill-posed problem with non-stable solutions, that is, for robust commercial applications special methods providing a reliable solution are necessary. The application of these methods becomes extremely computationally expensive as the number of landmark points increases. This obstacle imposes serious disadvantage on the method. Moreover, the position of landmarks may generate a warping function with a Jacobian that changes its sign, which means that such warping would not provide one-to-one mapping; overfolding of an image occurs.

The aim of the present invention is to provide a new approach to image warping. With preferred embodiments, there is no need for solving a linear system and the problem of overfolding can be avoided.

Summary

According to one aspect of the present invention, there is provided a method of warping a source image. The source image has a plurality of points which fall on straight line rays emitted from a fixed centre point O. The method comprises applying a modified radial basis function $P(r,t)$ to the source image, to transpose the points along the rays, where "t" defines direction and "r" defines a distance along a direction.

According to a second aspect of the present invention, there is provided a method of warping a source image into a target image. The method comprises applying a modified radial basis function P(r,t) to the source image, where "t" defines a direction from the fixed centre point, and "r" defines a distance in the direction "t".

According to further aspects, the invention provides apparatus and computer program product for operating in accordance with the method of the above aspects.

Introduction to the Drawings

The invention is further described by way of non-limitative example with reference to the accompanying drawings, in which:-

Figures 13A, 13B:
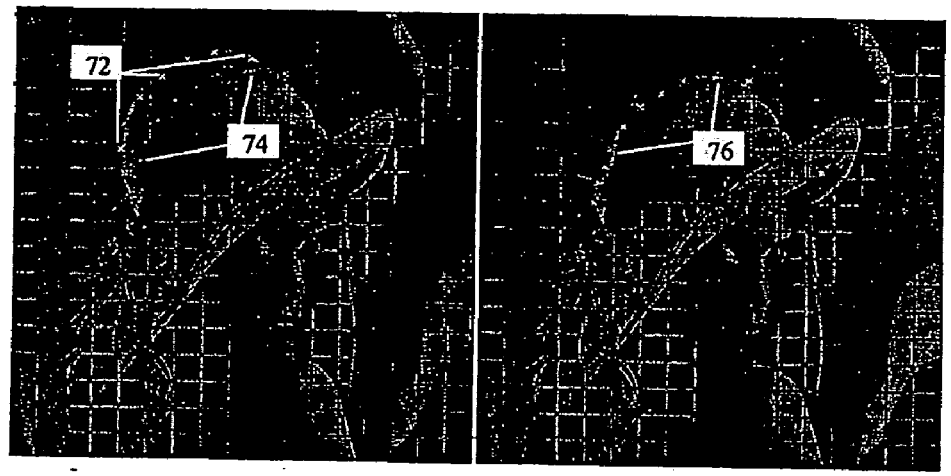
Figure 14:
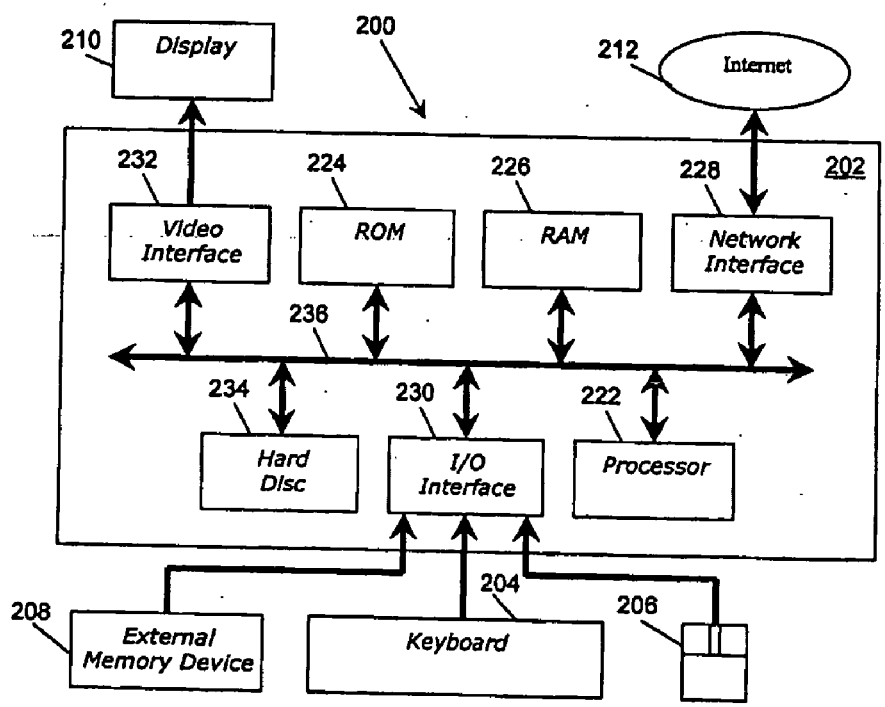

Figure 1 is a plot of warping function, as used in an exemplary embodiment, which includes the Gaussian function;

Figure 2 is a schematic view of two star-shaped contours, a centre point and a ray;

Figure 3 is a schematic view of two segments, an extension of the segments to contours, a centre point and two rays;

Figure 4 is a flowchart of various steps used in transforming a source image $I_S$ to a target image $I_T$;

Figure 5A is an MR image of a brain, showing landmarks;

Figure 5B is an enlarged view of a portion of interest of Figure 5A;

Figure 6A is an atlas image of a brain, corresponding to the MR image of Figure 5A, showing landmarks on the atlas image to be transformed to MR image landmarks;

Figure 6B is an enlarged view of a portion of interest of Figure 6A;Figure 7A is an atlas image of a brain with overlapped contour landmarks, to be transformed to MR image landmark positions;

Figure 7B is an enlarged view of a portion of interest of Figure 7A;

Figure 8A depicts the warped atlas image, with the landmarks transformed to MR image landmark positions;

Figure 8B is an enlarged view of a portion of interest of Figure 8A;

Figures 9A to 10B demonstrate transforming ventricles to a desired position by segment landmarks mapping;

Figures 11A to 12B illustrate the inverse growing of a tumour;

Figures 13A and 13B show a test image having a hat segment deformed with the help of segment landmarks; and Figure 14 is a schematic representation of a computer system which is an embodiment of the invention.

Detailed description

Embodiments of the invention may be used to warp a source image into a target image with respect to landmark features. The source image may initially be pre-processed and roughly transformed to the size of the target image. The landmark features on the target image are preserved, and the landmarks from the source image are transposed according to pre-process. The transposed landmarks from the source image are then transformed to the landmarks of the target one. The transformation may be performed on rays outgoing from an origin (the centre point) $O$. During the transformation the centre $O$ is preserved. In the 2D case any ray is described by an angle $\varphi$, in the 3D case a ray is described by two angles, $\varphi$ and $\psi$. The direction of a ray is denoted with parameter $t$, therefore, for the 2D case $t = \varphi$, for the 3D case $t = (\varphi, \psi)$. The function of transformation $P(r, t)$ depends only on the direction $t$ and the distance $r$ to the origin $O$. It shifts a point lying at a distance $r$ from the origin to distance $P(r, t)$ along the ray. The source landmarks are transformed to the target landmarks using this function. The surrounding tissues are also taken into account during the transformation. A detailed description of this method of warping using our novel function is described below.

Embodiments of the invention are able to provide a class of functions for the warping and deformation of images, specifying modified forms of radial basis functions that do not need stabilising, and summarising factors that general radial functions need. In such embodiments, the Jacobian of transformation preserves its sign, thereby implying one-to-one mapping. Figure 1 is a plot 10 of such a function, $G(r)$.

The invention can be used to deform a source image to a desired appearance or position. An example of the type of warping that may benefit from this invention is the transformation of a patient image with respect to an atlas image.

The initial data are two images, namely an original Image-source $I_{OS}$ and an Image-target $I_T$. The original Image-source $I_{OS}$ is pre-processed first to become a pre-processed Image-source $I_S$. Suitable methods of pre-processing can be found in "A Survey of Image Registration Techniques, ACM Computing Surveys, vol. 24, no. 4, December 1992" by L.Brown and in "Biomedical Image Registration by Elastic Warping (1999)" by Jan Kybic. The pre-processing aligns the coordinate systems and is an elementary step in any warping, involving basic transformation like translating, scaling and other affine transformations. The sizes of the two images are dimensionally similar after pre-processing. Source landmarks and target landmarks are obtained with the help of professional experts, in a known manner. The landmarks on the original images are defined by surfaces $C_{OS}$ and $C_T$. In pre-processing the Image-source $I_{OS}$, the two images become dimensionally similar, the Image-source lies on the Image-target, and the source landmarks $C_{OS}$ are transposed onto the Image-target as landmarks $C_S$. The result is a pre-processed image-source containing both source and target landmarks. The aim is then to deform the Image-source landmarks to the positions of the Image-target landmarks. This is achieved using novel functions of the invention.

Embodiments of the invention provide the warping of images with surfaces as landmarks for 3D images. The 2D case, with contours as landmarks, is a particular case of 3D mapping. The main distinction for the 2D case is the replacement of spherical coordinates with polar ones; that is, two angles for direction in 3D space are replaced with one angle for direction in a plane. The 3D case is a more general one; parametric representation of surfaces is constructed and a specific function similar to radial basis function is found. The base for this function may be any monotone increasing function of a single argument which maps non-negative real numbers onto themselves. For example, it may be any window filtering kernel function such as: Gaussian, Welch, Parzen, Lanczos, etc., transformed to provide monotony or any monotonic function introduced by the user. The monotone results in non-over folding during mapping.

Landmark Parameterization

The aim is to transform the surface $C_S$ and surrounding area to the surface $C_T$. The method of the preferred embodiment for determining this transform can be used if the surfaces $C_S$ and $C_T$ are star-shaped with common centre point $O$. This means that any ray (straight line) emitted from the point $O$ meets the surface $C_T$ not more than one time, and, likewise, this ray intersects the second surface $C_S$ exactly at one point only. Properties of star-shaped surfaces and algorithms for finding the centre point $O$ are given by A.Lopes-Ortiz and S.Schuierer, in "Searching and on-line recognition of star-shaped polygons", Information and Computation, vol. 185(1), pp. 66-88, 2003.

Figure 2 is a schematic view showing the source contour $C_S$ and the target contour $C_T$, a centre point $O$, and an arbitrary ray 30. The ray 30 meets the source contour $C_S$ and the target contour $C_T$ at points $S$ and $R$, respectively.

Therefore, if the surfaces $C_S$ and $C_T$ are star-shaped with a common centre point $O$, they can be represented as functions in spherical coordinates:

$$S = S(t), T = T(t), t \in \Theta \qquad (3),$$

where $S$ and $T$ are functions defined for argument $t=(\varphi,\psi)$ on the mutual domain $\Theta$, and $\Theta$ is a subset of direct product $[0,2\pi] \Box [0,\pi]$ of feasible angle values of spherical coordinates with the centre point $O$ as an origin.

The Warping Function

Spherical parameterization of the landmark surfaces with one-to one correspondence of points is a base for the desired transformation. By construction, if parameter $t$ varies over domain $\Theta$, the mapping function $P(r,t)$ transforms landmark $C_S$ onto $C_T$ and preserves the origin of spherical coordinates. It means, for each $t \in \Theta$:

$$P(0,t) = 0 \qquad (4) \text{ and}$$

$$P(S,t) = T \qquad (5),$$

where $S$ and $T$ correspond to points on $C_S$ and $C_T$, respectively. Values $S$ and $T$ depend on parameter $t$.

The constraints (5) provide shifting of all points $S$ on surface $C_S$ to position $T$ on surface $C_T$ for each feasible value of parameter $t$; therefore, the landmark surface $C_S$ is mapped onto the landmark surface $C_T$. Tissues surrounding the surface $C_S$ are shifted along with the landmark surface $C_S$. If the parameterization (3) of the landmarks is continuous, it is possible to construct a mapping function $P(r, t)$ which is continuous in total over all arguments.

This transformation briefed above shifts points on the ray outgoing from the origin. It means parameter $t$ is preserved under transformation. Functions of the coordinate transformations are $$R = P(r,t),$$
$$T = t. \quad (6).$$

If partial derivatives of the function $P(r, t)$ exist, the Jacobian of the vector-function (6) is $$J(r,t) = \begin{vmatrix} \dfrac{\partial P}{\partial r} & \dfrac{\partial P}{\partial t} \\ 0 & 1 \end{vmatrix} = \dfrac{\partial P(r,t)}{\partial r} > 0 \quad (7),$$

and the derivative is positive due to monotone increasing of the function $P(r, t)$ on $r$ over all parameters $t$. Therefore, if the function of transformation is differentiable, the transformation cannot have overfolding at any point.

The Gaussian as Transformation Function

Embodiments of this invention are built on a special class of modified radial basis functions. An instance of such a function is explained with an example of a modified Gaussian function. A Gaussian function is an analytical function used widely in various applications.

The base Gaussian is represented here as a function with three parameters $a$, $\alpha$, $\sigma$:

$$g(r) = \alpha e^{-\dfrac{(r-a)^2}{\sigma^2}} \quad (8).$$

A supplementary identity function is added to function (8) for transforming it to a monotone increasing function. The function becomes $$g(r) + r = \alpha e^{-\frac{(r-a)^2}{\sigma^2}} + r \quad (9).$$

To provide the restriction (4) above, a constant value may be subtracted from the function (9). This constant value is $$g(0) + 0 = \alpha e^{-\frac{a^2}{\sigma^2}} \quad (10).$$

Finally, the modified Gaussian is $$G(r) = \alpha(e^{-\frac{(r-a)^2}{\sigma^2}} - e^{-\frac{a^2}{\sigma^2}}) + r \quad (11).$$

The function $G(r)$ should increase, therefore, its first derivative is positive, $$G'(r) = -\frac{2\alpha(r-a)}{\sigma^2} e^{-\frac{(r-a)^2}{\sigma^2}} + 1 > 0 \quad (12).$$

Equation (12) is transcendental and has no analytical solution. Nevertheless, it is possible to find a minimal value of first derivative, which is $$r_{min} = a + \sigma/\sqrt{2} \quad (13).$$

Substituting (13) into (12) yields inequality $$\sigma > \alpha\sqrt{\frac{2}{e}} = 0.8577639 \cdot \alpha \quad (14).$$

The relation (14) guarantees monotony of the function $G(r)$ represented by formula (11).

If the parameters of function $G(r)$ are calculated for a specific ray and a point lying distance $S$ from the centre point $O$ is shifted to distance $T$ from $O$, then the restriction (5) for fixed parameter $t$ is $$T = \alpha(e^{-\frac{(S-a)^2}{\sigma^2}} - e^{-\frac{a^2}{\sigma^2}}) + S \quad (15);$$

there exist infinitely many solutions for parameters $a$, $\alpha$, $\sigma$. One of the feasible selection is $$a = S \quad (16).$$

This is a natural selection; with this selection, a landmark point is transposed on maximal (see formula (8)) shift, and points from the surrounding area are subject to less shifting. Therefore, with selection (16) in equation (15), $$T = \alpha \cdot (1 - e^{-\frac{S^2}{\sigma^2}}) + S \quad (17).$$

The second parameter α is estimated from this equation (17), $$\alpha = \frac{T-S}{1-e^{-\frac{S^2}{\sigma^2}}} \quad (18).$$

Rewriting (14), results in an inequality for parameter σ, $$\sigma > 0.8577639 \cdot \alpha \quad (19).$$

Parameters σ and α are mutually dependant. A possible way to find them is in putting σ to any feasible ratio of α, for example $\sigma = 0.9\alpha$, and solve transcendental on α equation (18), numerically.

Figure 1 is a plot 10 of the function, $G(r)$, presented by formula (11) with $R=113$, $S=150$, parameters (16), (18), (19) and $\sigma=0.9\alpha$, and of a straight line 12. The value of α, obtained from the equation (18) is 37.

A function $G(r)$, as presented by formula (11) is constructed for a fixed ray emitted from the centre point O. For varying direction of the ray the distances (points) S and T, and the parameters a, α and σ depend on direction $t=(\varphi,\psi)$. Thus, the function $G(r)$ may be written more generally as:

$$G(r,t) = \alpha(t) \cdot (e^{-\frac{(r-S(t))^2}{\sigma(t)^2}} - e^{-\frac{S(t)^2}{\sigma(t)^2}}) + r \quad (20),$$

where parameter a is replaced with its selected value, in the preferred case $a = S$ (16).

More generally, the function to be used may be in the form $$P(r,t) = \alpha \cdot f(r,t) + c,$$

where f(r,t) is a radial basis function and "α" and "c" are constants.

Non-closed Surface Landmarks

The method can be generalized to non-closed surface landmarks in the 3D case and to segment landmarks in the 2D case. Let $C_S$ and $C_T$ be parts of closed surfaces. If they are mutual star-shaped which means there exists a centre point O such that a ray emitted from O meets the surface $C_S$ not more than one time, and, if it meets $C_S$, it also meets the surface $C_T$ as well and has only one meeting point.

This treatment of non-closed landmarks can be reduced to be the same as that of closed surface landmarks described above, by extending the non-closed surfaces to closed shapes. Such extensions may be performed in any of various different ways. Figure 3 illustrates the extension of segment landmarks. Two segments, $S(t)$ and $T(t)$, parameterized with a centre point $O$, are extended to two closed contours 32, 34 (which are common for much of their extent, and two rays 36, 38 constrain the segments. S may transform to T irrespective of where S lies.

Figure 4 is a flowchart of various steps used in transforming the original Image-source $I_{OS}$ onto the Image-target $I_T$. The two original images $I_{OS}$, $I_T$ and two original landmark surfaces $C_{OS}$, $C_T$ are input (step S102). The original image-source $I_{OS}$ typically undergoes a pre-processing mapping transform into Image-source $I_S$, with landmark surface $C_S$ (e.g. a rigid mapping such as: scaling, rotating, affine-mapping, simple non-linear mapping) (step S104), so that the two images are represented in a mutual coordinate system. This results in a deformed image, $I_S$ with a deformed surface, $C_S$ in the coordinate system of the Image-target $I_T$ (step S106). The surfaces $C_S$ and $C_T$ are parameterised (step S108). The warping function $P(r,t)$ is constructed to map the image $I_S$ onto the image $I_T$ (step S110). This warping function may be designed in accordance with formulae (11), (16), (19), and (20). The function $P(r,t)$ is applied to the deformed Image-source $I_S$ (step S112).

Occasionally, the input Image-source may not need pre-processing, either because it was pre-processed already or is already in the right scale and size. In that case, the Image-source $I_S$ may be considered the original Image-source, and the process omits step S104.

An example of warping using a modified radial basis function of an exemplary embodiment is shown in Figures 5A through to 6B.

Figure 5A is an MR Image-target $I_T$ of a patient's brain and has a landmark surface $C_T$, representing the corpus callosum, marked in white. Figure 5B is an enlarged view of this portion of interest of Figure 5A. Figure 6A is a reference corresponding atlas original Image-source $I_{OS}$ having a corresponding landmark surface $C_{OS}$ marked in black. Figure 6B is an enlarged view of this portion of interest of Figure 6A.

Figure 7A shows image $I_S$ transformed and scaling onto $I_T$. Both landmark surfaces $C_S$ and $C_T$ are depicted. Figure 7B is an enlarged view of this portion of interest of Figure 7A. Figure 8A shows the warped Image-source with the landmark $C_S$ deformed to the required position 50 onto landmark $C_T$. Figure 8B is an enlarged view of this portion of interest of Figure 8A.

Figures 9A to 10B demonstrate segment landmark mapping, transforming lateral ventricles. A source segment landmark 62 and a target segment landmark 64 are shown in figures 9A and 9B, together with a number of rays 66 from a common centre point and the scope of the transformation area 68 (area showing surrounding tissues that are deformed). Figure 9B is an enlarged view of a portion of interest of Figure 9A. Deformation of the source landmark 62 to the position of target landmark 64 is shown in figures 10A and 10B. Figure 10B is an enlarged view of a portion of interest of Figure 10A.

Figures 11A to 12B illustrate shrinking of a tumour. A rectangular grid is exposed to non-linear deformation along with landmark mapping. Figure 11B is an enlarged view of the tumour portion of Figure 11A. Figure 12B is an enlarged view of the reduced tumour portion, of Figure 12A.

The present invention can also be used in photograph and image correction or alteration. For instance, Figures 13A and 13B show a test image, having a hat segment in Figure 13A deformed with segment landmarks in Figure 13B. Figure 13A shows the two landmarks surfaces. The initial landmark is shown using small white crosses 72 and the final landmarks are shown as white points 74. The initial landmarks are deformed to the position of the final landmarks and the deformation is shown in Figure 13B. The initial grid and the final deformed grid explain the result of the transformation.

The invention can be used in many, if not all areas of image manipulation, including, inter alia, also: object morphing for movie production; the metamorphosis of objects in cartoon designs; and the correction or alteration of pictures in aerophotography for LANDSAT image analysis.

Apparatus for performing the operations described above, for instance the steps of the flowchart of Figure 4 can be made up of various suitable "means", whether embodied in circuits, constructed in hardware to perform a single operation or several operations, or programmed using software modules to perform those one or more operations. Possible embodiments may be made up of dedicated hardware alone, a combination of some dedicated hardware and some software programmed hardware and software programmed hardware alone. Embodiments also include a conventional or other computer programmed to perform the relevant tasks.

A module, and in particular the module's functionality, can be implemented in either hardware or software. In the software sense, a module is a process, program, or portion thereof that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist.

Figure 14 is a schematic representation of a computer system 200 suitable for performing the operations according to the invention. A computer 202 is loaded with suitable software in a memory, which software can be used to perform steps in a process that implement the techniques described herein (e.g. the steps of Figure 4). Image data $I_{OS}$ (or $I_S$) and $I_T$ can be input, and an image obtained using such a computer system 200, mapping $I_S$ into $I_T$. This computer software executes under a suitable operating system installed on the computer system 200.

The computer software involves a set of programmed logic instructions that are able to be interpreted by a processor, such as a CPU, for instructing the computer system 200 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 200 include: the computer 202, input and output devices such as a keyboard 204, a mouse 206 and an external memory device 208 (e.g. one or more of a floppy disc drive, a CD drive, a DVD drive and a flash memory drive) and a display 210, as well as network connexions for connecting to the Internet 212. The computer 202 includes: a processor 222, a first memory such as a ROM 224, a second memory such as a RAM 226, a network interface 228 for connecting to external networks, an input/output (I/O) interface 230 for connecting to the input and output devices, a video interface 232 for connecting to the display, a storage device such as a hard disc 234, and a bus 236.

The processor 222 executes the operating system and the computer software executing under the operating system. The random access memory (RAM) 226, the read-only memory (ROM) 224 and the hard disc 234 are used under direction of the processor 222.

The video interface 232 is connected to the display 210 and provides video signals for display on the display 210. User input, to operate the computer 202 is provided from the keyboard 204 and the mouse 206.

The internal storage device is exemplified here by a hard disc 234 but can include any other suitable non-volatile storage medium.

Each of the components of the computer 202 is connected to the bus 236 that includes data, address, and control buses, to allow these components to communicate with each other.

The computer system 200 can be connected to one or more other similar computers via the Internet, LANs or other networks.

The computer software program may be provided as a computer program product. During normal use, the program may be stored on the hard disc 234. However, the computer software program may be provided recorded on a portable storage medium, e.g. a CD-ROM read by the external memory device 208. Alternatively, the computer software can be accessed directly from the network 212.

In either case, a user can interact with the computer system 200 using the keyboard 204 and the mouse 206 to operate the programmed computer software executing on the computer 202.

The computer system 200 is described for illustrative purposes: other configurations or types of computer systems can be equally well used to implement the described techniques. The foregoing is only an example of a particular type of computer system suitable for implementing the described techniques.

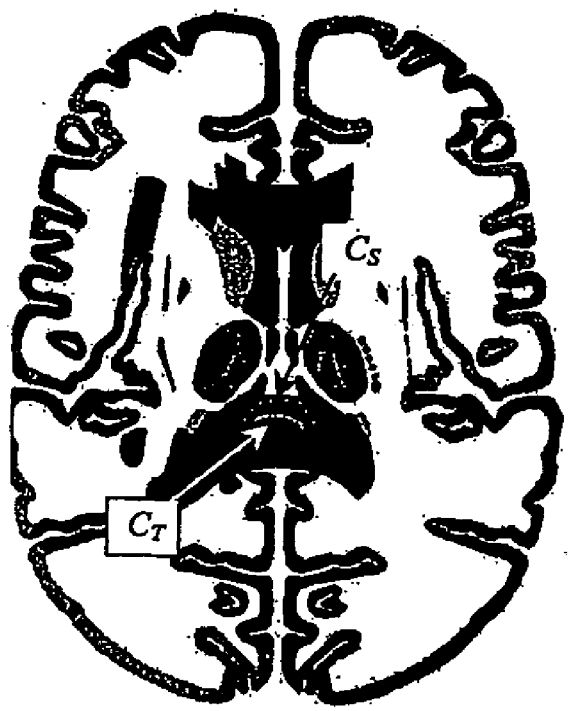
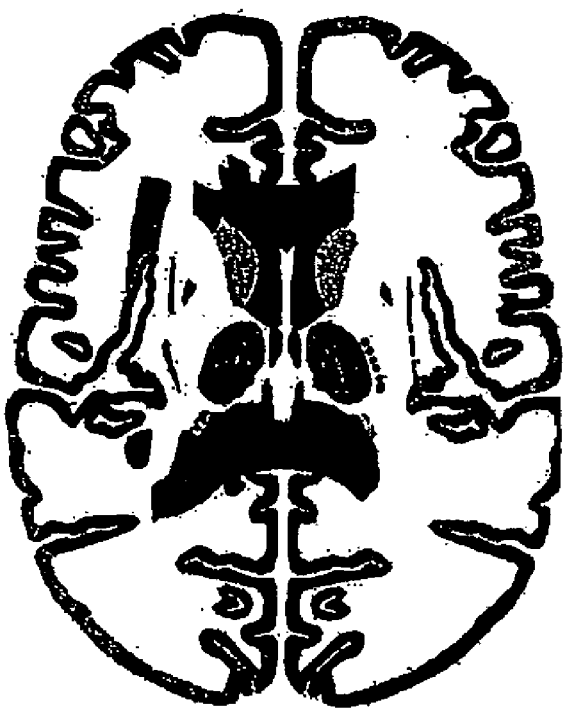
Figure 7A
Figure 8A
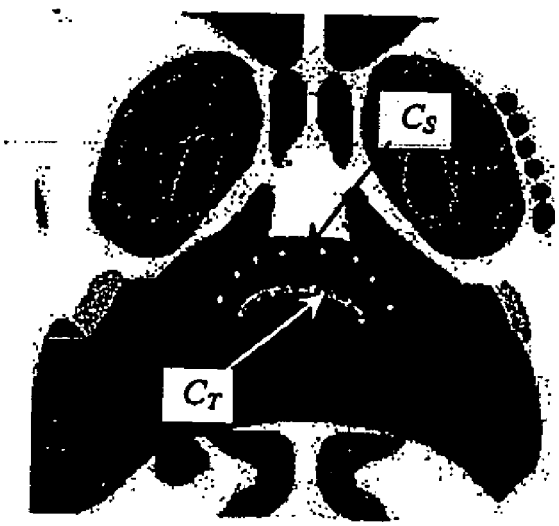
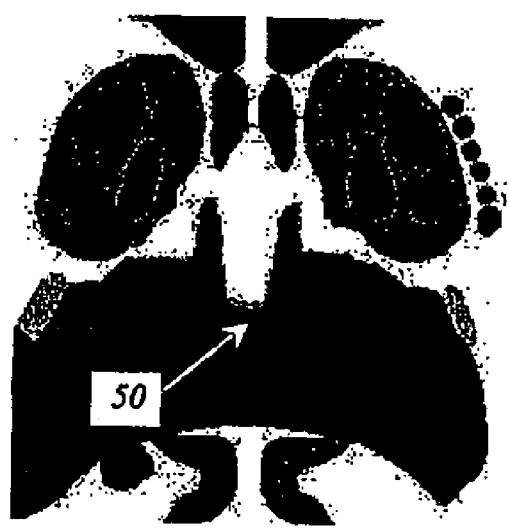
Figure 7B
Figure 8B

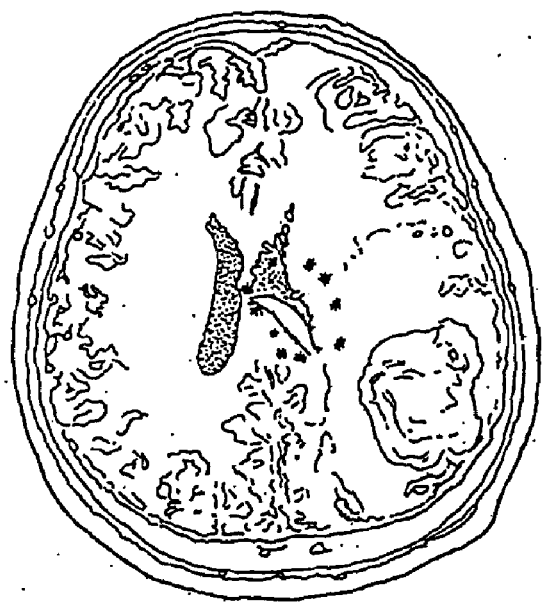 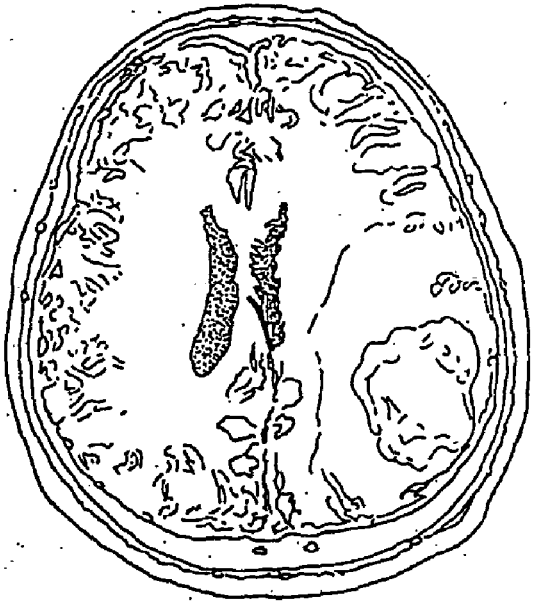
Figure 9A          Figure 10A
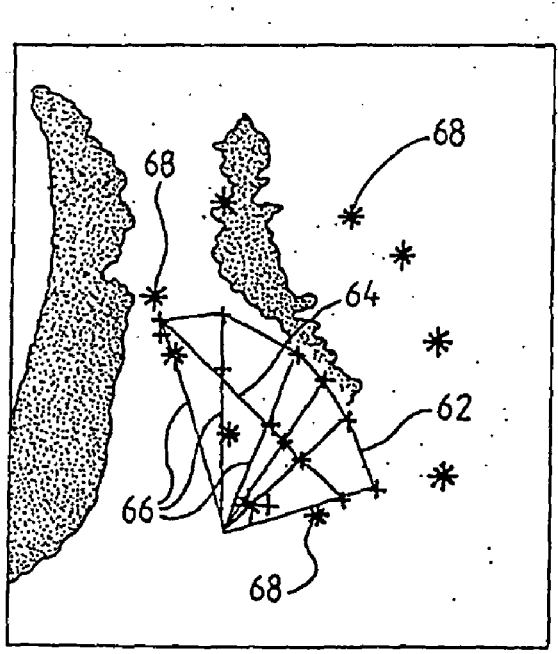 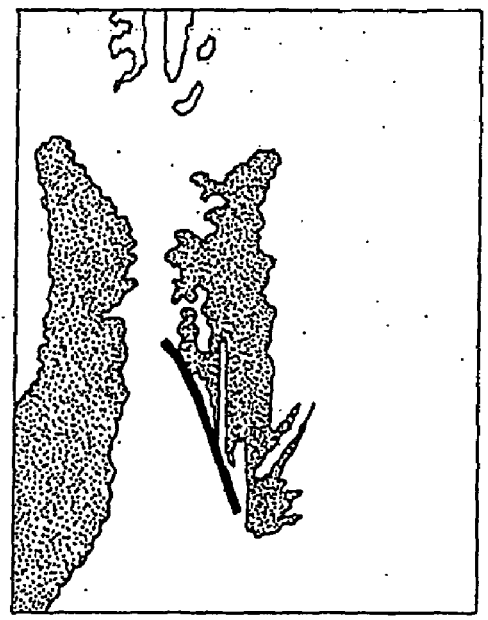
Figure 9B          Figure 10B

Figure 11A
Figure 12A
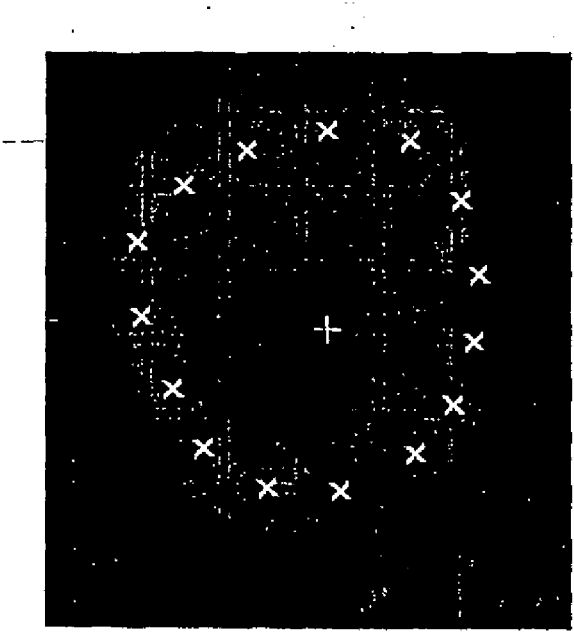
Figure 11B
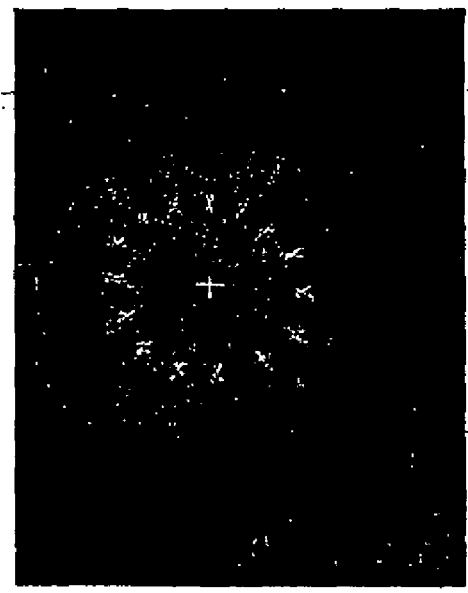
Figure 12B

We claim:

1. A method of processing a volume image comprising a plurality of slices, said method comprising the steps of:
    determining a first version of the midsagittal plane for all slices in the volume image to establish the dorsal and ventral extents of the volume image;
    defining a sub-volume of the volume image for atlas mapping using the first midsagittal plane;
    Identifying the most superior plane and the most inferior plane of the sub-volume;
    determining a second version of the midsagittal plane for all the slices in the volume image between and including the most superior plane and the most inferior plane;
    combining the first version and the second version to determine a final version of the midsagittal plane;
    defining a sub-volume of the image using the final version of the midsagittal plane;
    identifying the most superior plane and the most inferior plane of the sub-volume;
    determining for each slice between the most superior plane and the most inferior plane the shape of the corresponding sub-volume profile in the plane of the slice; and
    registering, for each slice, the determined shape of the corresponding sub-volume profile to a slice in the Atlas.

2. A method according to claim 1, comprising the further step of:
    associating information for the slices in the Atlas with the corresponding slices in the volume image.

3. An apparatus for processing a volume image comprising a plurality of slices, said apparatus comprising:
    means for determining a first version of the midsagittal plane for all slices in the volume image to establish the dorsal and ventral extents of the volume image;
    means for defining a sub-volume of the volume image for atlas mapping using the first midsagittal plane;
    means for identifying the most superior plane and the most inferior plane of the sub-volume;
    means for determining a second version of the midsagittal plane for all the slices in the volume image between and including the most superior plane and the most inferior plane;
    means for combining the first version and the second version to determine a final version of the midsagittal plane;
    means for defining a sub-volume of the image using the final version of the midsagittal plane;
    means for identifying the most superior plane and the most inferior plane of the sub-volume;
    means for determining for each slice between the most superior plane and the most inferior plane the shape of the corresponding sub-volume profile in the plane of the slice; and
    means for and registering, for each slice, the determined shape of the corresponding sub-volume profile to a slice in the Atlas.

4. A computer program product including a computer readable storage having recorded thereon a computer program for directing a processor to execute a method for processing an image, said program comprising:
    code for determining a first version of the midsagittal plane for all slices in the volume image to establish the dorsal and ventral extents of the volume image;
    code for defining a sub-volume of the volume image for atlas mapping using the first midsagittal plane;
    code for identifying the most superior plane and the most inferior plane of the sub-volume;
    code for determining a second version of the midsagittal plane for all the slices in the volume image between and including the most superior plane and the most inferior plane;
    code for combining the first version and the second version to determine a final version of the midsagittal plane;
    code for defining a sub-volume of the image using the final version of the midsagittal plane;
    code for identifying the most superior plane and the most inferior plane of the sub-volume;
    code for determining for each slice between the most superior plane and the most inferior plane the shape of the corresponding sub-volume profile in the plane of the slice; and
    code for and registering, for each slice, the determined shape of the corresponding sub-volume profile to a slice in the Atlas.

5. An apparatus according to claim 3, further comprising:
    means for associating information for the slices in the Atlas with the corresponding slices in the volume image.

6. A computer program product according to claim 4, wherein said program further comprises:
    code for associating information for the slices in the Atlas with the corresponding slices in the volume image.

7. An apparatus for processing a volume image comprising a plurality of slices, said apparatus comprising:
    a memory;
    a processor configured to carry out a program stored in the memory, the program comprising:
        code for determining a first version of the midsagittal plane for all slices in the volume image to establish the dorsal and ventral extents of the volume image;
        code for defining a sub-volume of the volume image for atlas mapping using the first midsagittal plane;
        code for identifying the most superior plane and the most inferior plane of the sub-volume;
        code for determining a second version of the midsagittal plane for all the slices in the volume image between and including the most superior plane and the most inferior plane;
        code for combining the first version and the second version to determine a final version of the midsagittal plane;
        code for defining a sub-volume of the image using the final version of the midsagittal plane;
        code for identifying the most superior plane and the most inferior plane of the sub-volume;
        code for determining for each slice between the most superior plane and the most inferior plane the shape of the corresponding sub-volume profile in the plane of the slice; and
        code for and registering, for each slice, the determined shape of the corresponding sub-volume profile to a slice in the Atlas.

8. An apparatus according to claim 7, wherein the program further comprises:
    code for associating information for the slices in the Atlas with the corresponding slices in the volume image.

* * * * *